(12) United States Patent
Sridharan

(10) Patent No.: US 10,747,994 B2
(45) Date of Patent: Aug. 18, 2020

(54) IDENTIFYING VERSIONS OF A FORM

(71) Applicant: Captricity, Inc., Oakland, CA (US)

(72) Inventor: Ramesh Sridharan, Oakland, CA (US)

(73) Assignee: Captricity, Inc., Oakland, CA (US)

( * ) Notice: Subject to any disclaimer, the term of this patent is extended or adjusted under 35 U.S.C. 154(b) by 281 days.

(21) Appl. No.: 15/838,905

(22) Filed: Dec. 12, 2017

(65) Prior Publication Data

US 2018/0181808 A1 Jun. 28, 2018

Related U.S. Application Data

(60) Provisional application No. 62/439,842, filed on Dec. 28, 2016.

(51) Int. Cl.
| | |
|---|---|
| G06K 9/00 | (2006.01) |
| G06K 9/34 | (2006.01) |
| G06K 9/68 | (2006.01) |
| G06K 9/62 | (2006.01) |

(52) U.S. Cl.
CPC ..... *G06K 9/00483* (2013.01); *G06K 9/00449* (2013.01); *G06K 9/342* (2013.01); *G06K 9/6269* (2013.01); *G06K 9/6273* (2013.01); *G06K 9/685* (2013.01)

(58) Field of Classification Search
CPC ........... G06K 9/00483; G06K 9/00449; G06K 9/6269; G06K 9/6273; G06K 9/685; G06K 9/342

USPC .......................................................... 382/209
See application file for complete search history.

(56) References Cited

U.S. PATENT DOCUMENTS

| | | | |
|---|---|---|---|
| 2004/0042651 A1* | 3/2004 | Ii | G06K 9/6292 382/159 |
| 2016/0148074 A1* | 5/2016 | Jean | G06F 16/5838 382/190 |
| 2017/0039469 A1* | 2/2017 | Majumdar | G06N 3/0445 |

\* cited by examiner

*Primary Examiner* — Amandeep Saini
(74) *Attorney, Agent, or Firm* — Perkins Coie LLP; Brian Coleman

(57) ABSTRACT

Disclosed are a method and apparatus for identifying versions of a form. In an example, clients of a medical company fill out many forms, and many of these forms have multiple versions. The medical company operates in 10 states, and each state has a different version of a client intake form, as well as of an insurance identification form. In order to automatically extract information from a particular filled out form, it may be helpful to identify a particular form template, as well as the version of the form template, of which the filled out form is an instance. A computer system evaluates images of filled out forms, and identifies various form templates and versions of form templates based on the images.

18 Claims, 40 Drawing Sheets

(a) Template class one  (b) Instance class one  (c) Version - different class

Dashed lines indicate operations that can occur after visual vocabulary has been generated.

Input: Query image $Q$

Output: Retrieval set $\{c_1, \ldots, c_h\}$

From $Q$ extract vectors $X = (X_s, X_o, X_w)$ $X \to Y = (Y_s, Y_o, Y_w)$ $Y \to C = (C_s, C_o, C_w)$ $C \to J = (J_s, J_o, J_w)$ $J_{sow} = J_s \cup J_o \cup J_w$ $Y_{so} = Y_s + Y_o$ $Y_{so} \to C_{so}$ if $|J_{sow}| == 1$ return $J_{sow}$ else if $|J_{sow}| == 2$ return $\{c_h \in C_{so} \mid 1 \leq h \leq H\} \cup J_{sow}$ else return $\{c_h \in C_{so} \mid 1 \leq h \leq \mathcal{T}(H)\} \cup J_{sow}$ end

Dashed lines indicate operations that can occur after training the RLM.

IDENTIFYING VERSIONS OF A FORM

CROSS-REFERENCE TO RELATED APPLICATIONS

This is a non-provisional application filed under 37 C.F.R. § 1.53(b), claiming priority under U.S.C. Section 119(e) to U.S. Provisional Patent Application Ser. No. 62/439,842 filed Dec. 28, 2016, the entire disclosure of which is hereby expressly incorporated by reference in its entirety.

BACKGROUND

Filling out paper forms is a part of life. A trip to a doctor's office, to the department of motor vehicles (DMV), to an office of a potential new employer, etc., often involves filling out a paper form. Such forms have fields for people to provide information, such as a field for a person's name, another for his address, yet another for his phone number, etc. The forms can also include a table, and the fields that people fill in can be fields in the table. An employee of the doctor, the DMV, etc. often electronically captures the information entered on the form by manually entering the information into a computer. Once electronically captured, the information can be added to a database, a spreadsheet, an electronic document, etc., where the information can be stored for future reference.

BRIEF DESCRIPTION OF THE DRAWINGS

One or more embodiments are illustrated by way of example in the figures of the accompanying drawings, in which like references indicate similar elements.

FIG. 17 is a listing of a summary of a topmost h retrieval algorithm for Retrieval, Learning, and Matching (RLM), consistent with various embodiments.

FIG. 19 is an illustration of a screenshot of Shreddr (pipelined paper digitization for low-resource organizations) document classification dashboard integration with RLM, consistent with various embodiments.

DETAILED DESCRIPTION

Figure 1:
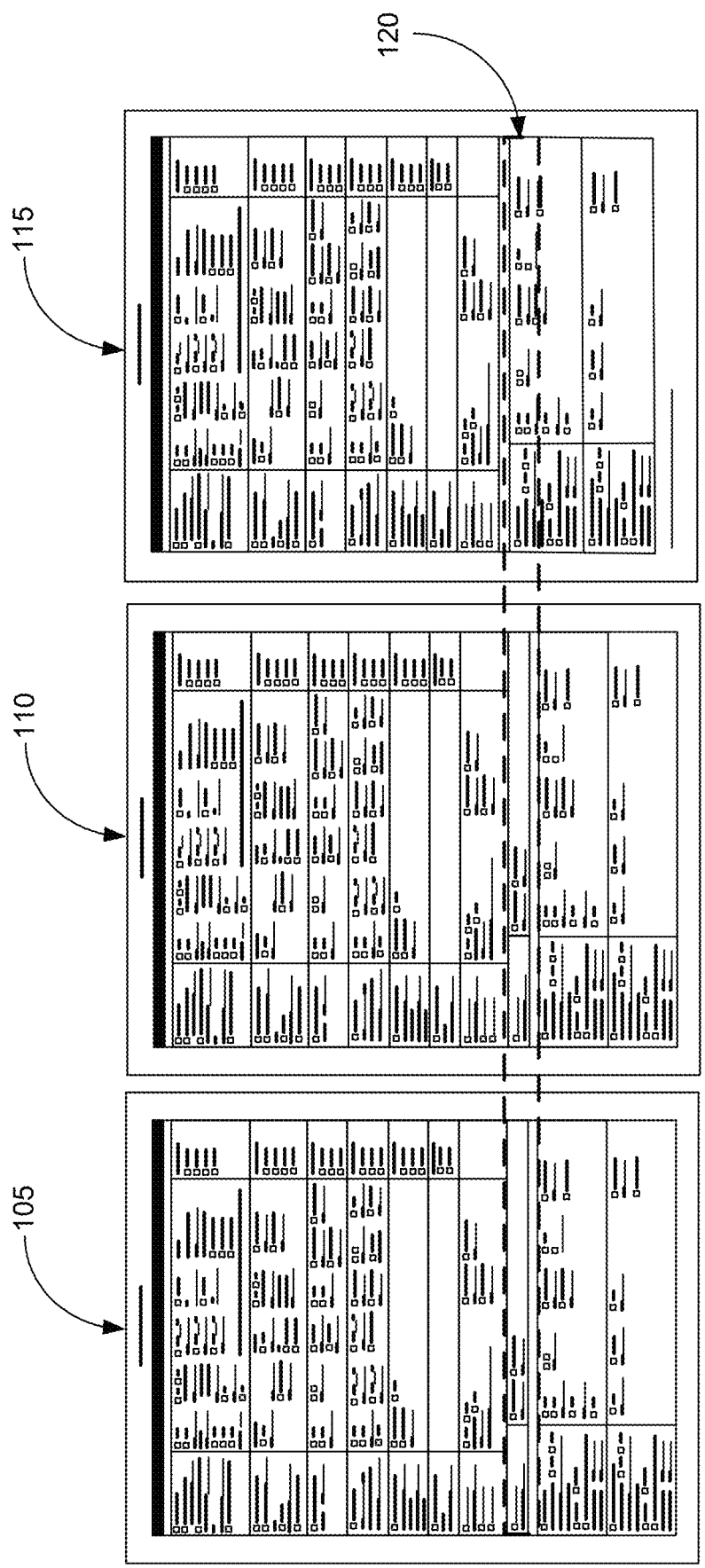
FIG. 1 is an illustration of three forms including a form that is a template class, an instance of the form, and a version of the form, consistent with various embodiments.

Introduced here is technology related to automatically identifying versions of a form. A form is a piece of material, such as a piece of paper, plastic, fabric, cardboard, etc., on which data/information/graphics/etc. that defines the form is printed, written, etc. For example, a form can be a piece of paper which on which a client intake questionnaire for a doctor's office is printed, can be a piece of paper on which an information data sheet for the Department of Motor Vehicles (DMV) is printed, can be a piece of plastic for an overhead projector on which a teacher draws a table for gathering student preferences for a field trip, can be a cardboard box for a cereal on which a contest entry sheet is printed, etc.

The data/information/graphics/etc. that defines a form can be applied in any of various ways to the piece of material of the form, such as by being manually written on the piece of material, by being printed on the piece of material, etc. When the data/information/graphics/etc. of a form is printed on a piece of material, the data/information/graphics/etc. can be printed by running an application program, such as a word processor or a spreadsheet program (among others), opening a source file which contains the data/information/graphics/etc., and printing the data/information/graphics/etc. on the material. For example, a person can execute a word processor application, can enter data/information/graphics/etc. that defines a particular questionnaire using the word processor, and can write the data/information/graphics/etc. to a source file for the word processor. Anyone else with access to the source file can open the source file using the word processor application, and can print the data/information/graphics/etc. on a piece of paper, turning the piece of paper into a form that contains the particular questionnaire. The form can include graphics, such as boxes, tables, lines, etc., that help define fields where information can be entered by users of the form.

A company, office, or other organization or group may have a number of different forms. In order to automatically extract information from a particular form, such as extracting the name of a person from a filled in NAME field of a form, it may be helpful to identify a particular form template of which the particular form is an instance. In order to accomplish such an identification, it can be useful to generate a library of templates of the various different forms, and of versions of the various different form templates. If a library of form templates includes form templates where the fields of the form templates have been pre-identified, this pre-identification of the fields can be used to help automate or accelerate extraction and recognition of the data entered by users in these fields.

A template of a form, also referred to herein as a form template, is a version of a form that is used as a reference, such as for a comparison to an image of a selected form to determine whether the selected form is an instance of the form template, or is a different version of the form template, etc. A form template can be in any of various forms or formats from which an image of the form template can be generated. For example, a form template can be a piece of material, such as a piece of paper, plastic, fabric, cardboard, etc., on which data/information/graphics/etc. that defines the form template is printed, written, etc. In such a case, an image of the form template can be generated by taking a photo of the form template, by scanning the form template, etc. Additionally, a form template can be a source file from which an image of the form template can be generated by use of an application program that is compatible with the source file. In such a case, the application program can open the source file, and can generate an image of the form template. In an example, a form template is stored in a source file for a word processor. A user executes the word processor application, accesses the source file, and uses the application program to generate an image of the form template, such as by generating a JPEG (Joint Photographic Expert Group) file, TIFF (Tagged Image File Format) file, etc.

A challenge arises when attempting to identify a particular form template which corresponds to an image of a form when the form, rather than being a duplicate of the form template, is a version of the form that differs in some way compared to the form template. For example, a form can have a version that varies based any of various factors, such as location (an organization may use different forms from one state to another, from one county to another, from one city to another, etc.), organization (an organization, such as an insurance company, may have different versions of a form for a customer to fill out depending on the customer's employer), time (an organization may change its forms from year to year depending on requirements), etc. In order to successfully digitize a customer's data across many use cases, accurate identification of a form template, and of the version of the form template, helps to greatly improve efficiency of being able to digitize customer's data across versions of the form.

A human, computer software, computer software coupled with human assistance, etc., can generate a library of images of form templates and can, in some embodiments, pre-identify fields of the form templates. Images of various form templates can be generated in any of various ways, such as by scanning a first form template when the first form template is a piece of material, by taking a photo of a second form template when the second form template is a piece of material, by running a word processor application to open and generate an image of a third form template when the third form template is a source file for the word processing application, etc. In addition to generating the images of the form templates, fields of the various form templates can be identified, such as by a human, by software, etc. For example, a human can draw a rectangle that identifies the location of a first field of a form template, or software can analyze an image of the form template and can identify the location of the first field, and the human or software can analyze the field and label the first field as, e.g., the "NAME" field. The human or software can similarly identify the location of a second field of the form template, and can label the second field as the "ADDRESS" field. The worker or software can continue this process until all of the fields of the various form templates are identified.

Introduced here is technology that, once a template of a form is identified, enables versions of the form template to be automatically identified. Identifying that a particular form is a version of a form template can be challenging, as the position and meaning of information at different locations on a form may vary from one type or version of a form to another. For example, an extra line of text, such as "to the best of your knowledge", added to satisfy a legal requirement in a particular region, may shift downwards all the information in the form below the extra line of text. Identifying the existence of this variant, as well as accurately detecting when it comes up, are important for efficient digitization. Given a large collection of filled-in forms that have many different types and many different versions, this technology can enable the automatic identification of all types and versions of a form present in the collection, and for each version of each type, can enable the synthesis of a "blank" copy of the form that can be used as a template for digitization.

Two forms of different types usually look entirely different. Two forms of the same type, but of different versions, can have differences that affect digitization: for example, the location of two pieces of information could be swapped from one version to another, part of the information on the form could be shifted relative to other information due to extra text, etc. Two filled-in forms of the same type and the same version will be visually different, due to the differing filled-in content on the two forms.

One approach for identifying different versions of a form can be based on obtaining blank copies of every version of each form type. This may not be practical, as a customer may not be aware of the diversity of form versions present in their data. This can cause problems when digitizing. For example, when a new form type/version is detected midway through processing, generation of a new blank form template may be required before data can be digitized from a filled in version of the new form type/version. This can delay the process of digitization, and hamper efficiency and productivity.

An accurate technique for identifying different form types and different versions of a particular form type generally needs to be capable of detecting distinctions between types and versions of forms, and of translating subtle differences in visual similarity into a way of determining when images of two forms, e.g., indicate different versions of a form rather than different types of forms.

Further, the technique should be scalable. For example, when presented with thousands or tens of thousands of forms, a computer implementing the technique should be able to perform the task above in a reasonable amount of time. Accordingly, one of the goals of the technique is speed, and the technique should be able to work efficiently when analyzing filled-in forms to determine whether a particular image of a form is, e.g., an image of a particular form template, an image of a particular version of the form template, etc. A goal of scalability rules out many methods whose compute time is proportional to the square or even the cube of the number of forms, as the compute times of such methods do not scale well as the number of forms to be analyzed increases.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) means that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

As used herein, unless specifically stated otherwise, the term "or" can encompass all possible combinations, except where infeasible. For example, if it is stated that data can include A or B, then, unless specifically stated otherwise or infeasible, the data can include A, or B, or A and B. As a second example, if it is stated that data can include A, B, or C, then, unless specifically stated otherwise or infeasible, the data can include A, or B, or C, or A and B, or A and C, or B and C, or A and B and C.

FIG. 1 is an illustration that includes three forms, consistent with various embodiments. Unlike general image retrieval applications, paper forms, such as forms 105-115, exist in a more specific document subspace. In some embodiments, though form templates of the same class are structurally and conceptually identical, non-empty instances can differ in content. In that sense, instances of the same class can loosely be seen as duplicates. Duplicates can be either exact, indicating the images are perfect replicas, or near-duplicates, indicating the images are not identical but differ slightly in content. In this disclosure, we characterize the instances of a template as near-duplicates. Near-duplicates are images of the same form filled with a different set of information.

For example, forms 105 and 110 are two instances of the same template filled with different sets of information. Accordingly, forms 105 and 110 are near-duplicates. Near-duplicate forms can have identical static content and the same input field regions. This definition does not account for situations where forms could be of different versions. Different versions of a form may be, e.g., two or more forms based on a same template form, but with the same or similar input fields and with slightly different visual structure or static regions. For example, forms 105 and 115 are versions, as they are different version of the same form. Forms 105 and 115 differ in the region indicated by dashed-line box 120. Further, forms 105 and 115 have the same input fields, but have slightly different visual structure and static regions.

In paper form digitization, in some embodiments, form class detection is a prerequisite to information extraction. When classes are identified, subsequent processing for local geometric correspondence between instances and templates can play a role, or even enable, an accurate cropping out of regions of interest in form images. Some embodiments of a practical system for addressing the problem of form types classification in a digitization pipeline can include the following:

1) High recall. This is the degree to which the system finds the right template for a given form instance. High recall helps facilitate an accurate detection all form types so that subsequent digitization of form patches through optical character recognition (OCR) or manual input can occur. Recall is measured as follows:

$$recall = \frac{true\ positives}{true\ positives + false\ negatives}$$

2) High precision. This is the extent to which the system can consistently predict the class label of an instance. High precision helps facilitate minimizing search effort and can have substantial impact on performance time. Precision is measured as followed:

$$precision = \frac{true\ positives}{true\ positives + false\ negatives}$$

3) Training with near-duplicate examples. Sometimes, in real-world situations, it may not be practical to only use empty forms as training examples. Some embodiments of the system allow filled forms to be used as templates for defining form classes.
4) Rejection handling. In a digitization pipeline, fully processing every image that is fed to the system can be costly. In situations where instances of an unknown class (not included in the training set, which is a set of reference forms/documents) are being submitted for classification, some embodiments of the system gracefully reject these cases.
5) Efficiency. In some embodiments of the system, the time needed to classify an instance is fast and invariant to the number of available template classes, enabling the system to scale to very large datasets.

The problem of detecting form types can be approached with one of the following three perspectives, among others. One could employ content-based image retrieval (CBIR) techniques to search a database for the most similar template for a query form image. However, some CBIR techniques begin by calculating and storing global statistics for each training image, which is efficient but may be insufficiently accurate for the case of template retrieval. Precision and recall can suffer when new input content perturbs global statistics. Although various similarity techniques for relating geometrical structure between documents can be used, they may show poor recall and precision in training sets with near duplicate images. In some embodiments, training consists of creating a template form library by storing training images and their associated descriptors and/or class types. The training images can include form templates.

Another route one could consider is image classification in which an input image is transformed into a vector and then fed to a multi-label classification algorithm. Similar to CBIR, those systems can compute local feature descriptors for an image and concatenate all the information into a single vector for describing the content of the image. When used with machine learning and data mining algorithms, the sparsity of information in the vector can make it highly susceptible to changes occurring in the image. In very high dimensions, vectors become less distinctive due to the curse of dimensionality. This approach can lack robustness, and minor changes in the query image could degrade accuracy.

Yet another route one could consider is to choose the path of duplicates detection. In this scenario, the task would be to match an input form to a known template and label them as identical at the structure and content level. As we have previously mentioned, form instances may not be exactly duplicates. Establishing a strong similarity measure between form images can require a thorough and contextual analysis of the correspondences occurring between images. Robust registration (also referred to as alignment) techniques for comparing nearly duplicate images can be used, but image registration is computationally expensive and could introduce bottlenecks in large digitization jobs.

Considering the limitations previously expressed, we have identified a need for an improved form type detector. We further discovered that a system that exploits ideas from all these techniques could provide the necessary improvements. In some embodiments, images in a collection of form templates are first converted into a specific statistical representation and stored in memory. When a new form instance is submitted, the system can use the numerical structure to retrieve similar images and restrict the search to only the top h possible templates, where h is significantly less than the total number of templates in the database. In this process, a similarity measure can rank each candidate template according to how closely it resembles the query image. A matching threshold can then be applied to determine which of the candidate images is the right template or whether to reject the submitted form instance. Additionally, using the estimated matching threshold value, machine learning can be utilized to train the retrieval to provide better candidates for future instances.

Figure 2:
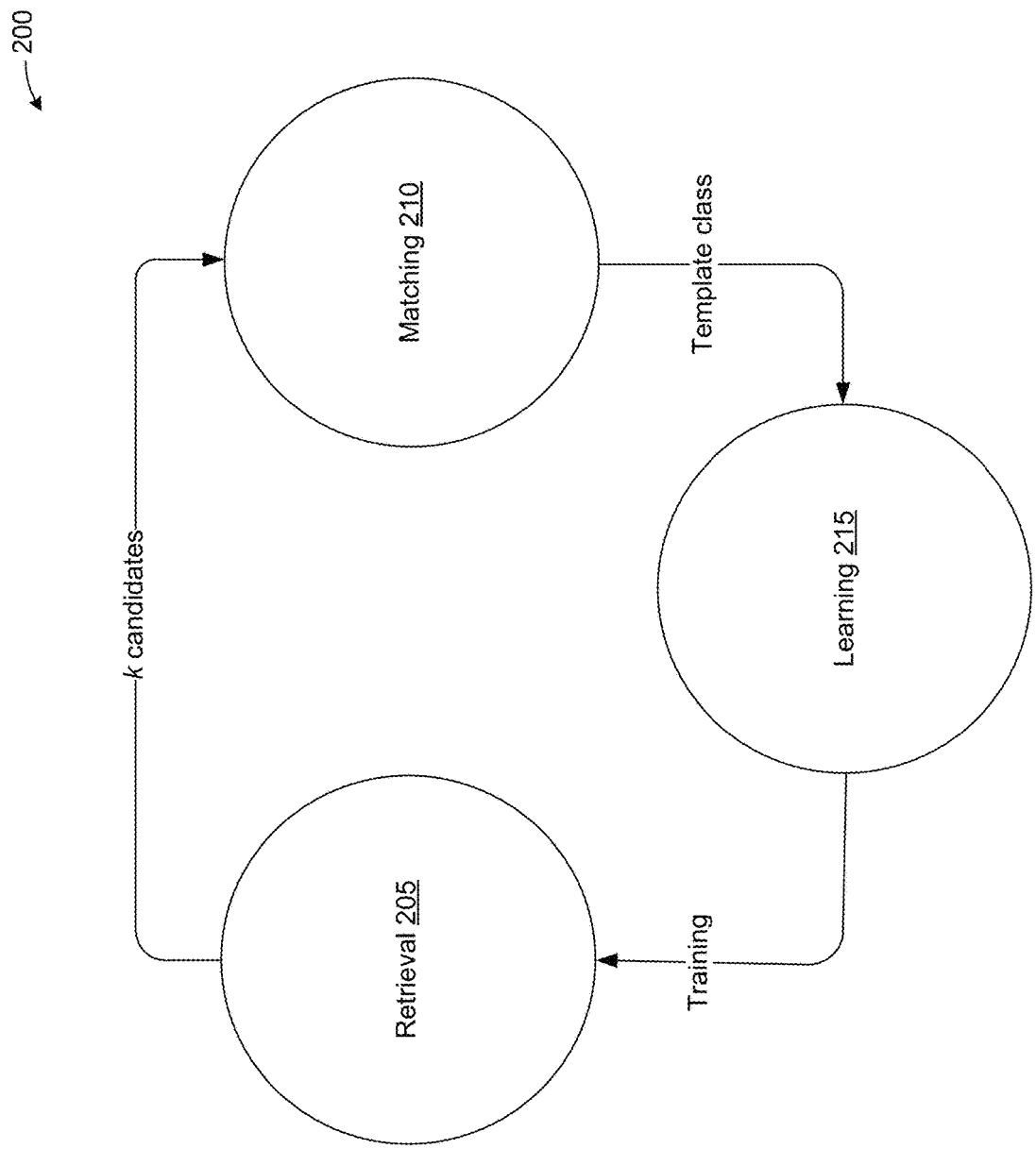
FIG. 2 is an illustration of a RLM classification framework for form type detection, consistent with various embodiments.

FIG. 2 is an illustration of a RLM classification framework for form type detection, consistent with various embodiments. RLM classification framework 200 decomposes the task of identifying form classes into three sub-tasks: retrieval 205, learning 215, and matching 210 (RLM). In some embodiments of an RLM framework, such as RLM classification framework 200, an image retrieval system can cooperate with a matching algorithm to detect the template of form instances. Matching can make use of a robust alignment thresholding mechanism to assess the level of similarity between form instances and templates. To improve the performance of retrieval at recommending templates, some embodiments of a learning algorithm can look at the matcher's final ranking, estimate the retrieval error, and update the algorithm to avoid the same future mistakes.

In some embodiments, any retrieval mechanism can be used, including, for example, CBIR. At a high-level, CBIR can be thought of as consisting of three main steps: document storage (or indexing), query formulation, and similarity computation with subsequent ranking of the indexed documents with respect to the query. Many retrieval approaches can be described on the basis of these three components, and the main difference between many retrieval mechanisms is the level at which the similarity computation occurs. Similarity computation approaches can be divided into categories, such as optical character recognition (OCR) based algorithms and image feature based algorithms. OCR based techniques can produce very accurate results, but they can require heavy computation and can be highly dependent on image text resolution, language and image quality. Feature-based methods, however, do not rely on textual content. They can be more versatile and can be better suited for our application. Indeed, bag-of-features (BoF), also known as bag-of-visual-words (BoVW), a technique used for representing images as vectors, has been used extensively in computer vision research over the past decade, and is known by persons of ordinary skill in the art. The BoVW model is described in more detail below.

This application further introduces a similarity computation technique for form template retrieval based on image feature classification. In some embodiments, we move away from the conventional CBIR framework. For the purpose of detecting form types, retrieval can be achieved without indexing and database storage. In some of these embodiments, instead of using a single feature vector to describe the entire visual content of an image, we can independently classify a large number of local features extracted from the form image. In such embodiments, features can be more distinctive and resistant to image variations. We can use multiple image feature descriptors to characterize images at a local level. At a structural level, we can recursively divide the form into increasingly smaller horizontal and vertical partitions to account for, e.g., geometrical bias that may be present in the image. We can then combine descriptors from each region to generate multiple BoVW vectors for a single image. Once an image has been transformed into a collection of vectors, we can use an ensemble of classifiers to predict the form class by assigning a class label to each vector found in the image. Similarity can be computed based on levels of feature and structure classification achieved by the ensemble of classifiers. To retrieve similar form templates, we can aggregate the classifiers' predictions and use a majority voting mechanism to generate a list of strongly ranked candidates.

1.1 Matching

Image matching, also referred to as image registration or alignment, is the process of establishing one-to-one spatial correspondences between the points in one image to those in another image. Image matching can be a step in a variety of applications including remote sensing, autonomous navigation, robot vision, medical imaging, etc. In paper digitization, matching can be applied for reasons such as: (1) to assess the level of similarity between form instances and templates, (2) to extract regions of interest (ROI) from form images based on predefined templates, etc.

1.1.1 Area-Based Alignment

Area-based alignment searches for a mapping where the respective pixels of two images are in optimal or substantially optimal agreement. In some embodiments, the approach first establishes a pixel-to-pixel similarity metric (e.g., distance or intensity) between a reference template image $I_0$ and query image $I_1$ and then solves an optimization problem by minimizing a cost function. One solution for alignment is, e.g., to shift one image relative to the other and minimize the sum of squared differences (SSD) based function 1.1

$$E_{SSD}(u) = \sum_i [I_1(x_i + u) - I_0(x_i)]^2 = \sum_i e_i^2, \quad (1.1)$$

where u=(u+v) is the displacement and $e_i = I_1(x_i+u) - I_0(x_i)$ is called the residual error. To make the SSD function more robust to outliers, one could introduce a smoothly varying differentiable function $\rho(e_i)$ to normalized equation 1.1.

$$E_{SRD}(u) = \sum_i \rho(I_1(x_i + u) - I_0(x_i)) = \sum_i \rho(e_i). \quad (1.2)$$

We can use equation 1.3 for $\rho(e_i)$.

$$\rho_{GM}(x) = \frac{x^2}{1 + x^2/a^2}, \quad (1.3)$$

where a is a constant that helps moderate the influence of outliers. One solution uses this function in the implementation of registration, which is discussed below.

In place of pixel position, one can also use pixel brightness for comparison as part of a registration method that exploits the exposure differences in images. To model intensity variation between two images, a bias and gain model, such as equation 1.4, can be used.

$$I_1(x+u) = (1+\alpha)I_0(x_i) + \beta, \quad (1.4)$$

where β is the bias and α is the gain. Equation 1.1 then becomes $$E_{BG}(u) = \sum_i [\alpha I_0(x_i) + \beta - e_i]^2. \quad (1.5)$$

Calculating the cross-correlation, $$E_{CC}(u) = \sum_i I_0(x_i) I_1(x_i + u). \quad (1.6)$$

rather than the intensity differences between the two images generally can result in a more efficient computation.

1.1.4 Feature-Based Alignment

In contrast to direct alignment, which uses image pixels, feature-based alignment uses a sparse set of feature points, also referred to as keypoints, to search for a geometric transformation bringing two images into a common frame of reference. Feature keypoints are stable interest points that can be repeatedly recognized under differing views of the same scene. They are invariant to scale and rotation. Feature descriptors can be used to represent keypoints in a manner that makes them identifiable even in the case of various degrees of local shape distortion and change in illumination. There exist many different techniques for detecting scale and rotation invariant features in images. Two such techniques, the Scale Invariant Feature Transform (SIFT) and the Speed Up Robust Feature (SURF) algorithms, which are known by those of ordinary skill in the art, can be used for registration. In the next section, we also discuss using the Oriented FAST Rotated BRIEF (ORB) feature detector, which is also known to those of ordinary skill in the art.

The SIFT and SURF algorithms can employ a continuous function of scale known as scale space to search for scale-invariant feature keypoints across all or substantially all possible scales. Detected feature keypoints can then be assigned a rotation-invariant descriptor computed from the gradient distribution in their surrounding pixel neighborhood. By analogy, descriptors are like fingerprints, and the more distinct they are, the easier it is to find their corresponding keypoints in other images. SIFT feature descriptors can be represented by 128-dimensional vectors, whereas two modes can be used to represent SURF descriptors. In a regular mode, a 64-dimensional descriptor vector can describe a SURF keypoint. In an extended mode, the descriptor length can be 128-dimensional. In some embodiments, SURF is used in the normal mode. ORB, on the other hand, fuses the features from Accelerated Segment Test (FAST) algorithm for keypoint detection and the Binary Robust Independent Elementary Features (BRIEF) algorithm for keypoint description. Its keypoints are represented by a 32-dimensional descriptor. In this disclosure, feature detectors are treated as black boxes.

Returning to feature-based registration, once features have been respectively extracted from a template and query image, a matching mechanism can find correspondences between keypoints across two images based on the similarity of their descriptors. Initially, one could compare all features in one image against all the features in the other image, but this approach may be ineffective for feature matching. Some embodiments use a form of indexing for accelerated retrieval, such as the Fast Library for Approximate Nearest Neighbors (FLANN) for fast nearest neighbor search in large collections of high dimensional features.

Using a nearest neighbor based strategy, putative matches can be found between pairs of keypoints. We use the term putative to indicate that keypoints could have multiple matches due to having very similar or identical descriptors that could be used for multiple keypoints of the same image. These bad correspondences, referred to as outliers, can impede registration. To remedy this problem, in some embodiments, a technique called Random Sample Consensus, referred to as RANSAC, can be applied. RANSAC begins by randomly selecting a subset of putative matches for estimating the homography transformation, which is an isomorphic mapping between the two images. The term isomorphic, as used here, implies that the mapping only finds matches where individual keypoints in the source image have one and only one corresponding keypoint in the destination image. RANSAC repeatedly optimizes the following difference function $$r_i = \tilde{x}'_i(x_i;p) - \hat{x}'_i, \quad (1.7)$$

where $\tilde{x}'_i$ are the estimated (mapped) locations, and $\hat{x}'_i$ are the sensed (detected) feature point locations. RANSAC then computes the number of inliers that fall within a specific threshold, $\varepsilon$, of their detected location $\|r_i\| \leq \varepsilon$. $\varepsilon$ depends on the application, but can be approximately 1-3 pixels. After optimization, the homography that yielded the maximum number of inliers can be kept for registration.

1.1.5 Area-Based Vs. Feature-Based

Feature-based matching, in general, performs fairly well on images with significant geometric and lighting discrepancies, though it can fail to detect features in weakly textured images. Additionally, establishing true one-to-one correspondence between keypoints can be difficult in images with repetitive patterns. On the other hand, direct alignment methods may be able to overcome the shortcomings of feature-based matching, but good initialization may be required when the perspective difference between images is strong. In some embodiments, we combine both methods to achieve better results. Using the Matlab Image Alignment Toolbox (IAT), we experimented with both families of algorithms. Our extensive evaluation of these techniques (not included in this disclosure) on images of forms in the document space of this disclosure demonstrated that feature-based alignment followed by an error scoring function can be well suited to handle a need for fast and robust alignment.

1.1.6 Error Scoring Metrics

The quality of alignment can be evaluated using a score that reflects the fraction of correctly aligned pixels between a registered image and its reference template. This score is useful for discriminating between the levels of mismatch between form instances and templates. Thus, the alignment score can be used as an effective metric for selecting the most probable template for a specific form instance after it has been registered against all templates in the database. Various methods can be used to score registration. One direct and simple approach is to consider the loss or error value after RANSAC optimization. Although this value can indicate that the best geometric mapping was found, it may not convey how well each pixel coincides with its correspondence. Another approach is to find the image difference between the template and registered image. However, in the case of paper forms, pixels in the entire image may not be able to be considered. The content of field regions in form instances may contribute additional noise to the error measure. Noise can also come from image distortions left by a bad registration. To factor out this noise, a support area marked by a binary image, also referred to as a mask, can be used to designate pixels where the error should be computed. In some embodiments, we employ this technique to score the registration between form instances and templates. We find the alignment score using the following weighted average function:

$$S = 0.25\sigma + 0.25 \sum_i (I_i \times M_i) + 0.5 \sum_i (I_i \times L_i), \quad (1.8)$$

where $\sigma$ is the residual loss after finding the best mapping with RANSAC. I is the registered instance converted to a binary image. M is a binary mask, another image, that localizes the overall static region of the template while L localizes the lines of the template. The subscript i is used to denote the same region in the images. The multiplication sign is used to denote the operation between corresponding pixel pairs.

1.1.7 Experiments with Forms

Objective.

In this experiment, our goal is to get a baseline performance for how well feature-based registration with subsequent error scoring can accurately identify the template of the form images in our datasets. To this end, we perform N×M alignments to determine the best template for each form instance. N is the number of form instances, and M is the total number of templates in our dataset.

Setup.

We base our registration algorithm on the SURF feature detector. The algorithm begins by extracting and encoding keypoints in both template and query image. Extracted features are then matched across the two images using the nearest neighbor strategy. We use equations 1.2 and 1.3 to set up the objective function for finding the best transformation that warps the query image into the coordinate frame of the reference template. To find the best possible mapping with the highest number of inliers, we employ RANSAC as previously discussed. Matching is implemented partly in the Python and C++ programming languages. We make use of the Open Computer Vision (OpenCV) library for image processing. The library is open source. We make use OpenCV's GPU module for enhanced computational capabilities during feature extraction and matching.

To evaluate precision and recall, we have labeled training set and test set images using the following file naming convention: classX_Y.png. X denotes the ground truth template class, and Y is unique identifier for the specific image.

Data Sets.

The first dataset is the National Institute of Standards and Technology (NIST) structured forms database, also known as the NIST Special Database 2. It consists of 5590 pages of binary, black-and-white images of synthesized tax documents. The documents in this database are 12 different tax forms from the IRS 1040 Package X for the year 1988. These include Forms 1040, 2106, 2441, 4562, and 6251 together with Schedules A, B, C, D, E, F, and SE. Eight of these forms contain two pages or form faces; therefore, there are 20 distinct form classes represented in the database. The images in this dataset exhibit very consistent layout. They are rich in texture, and their classes are highly dissimilar.

Figure 3:
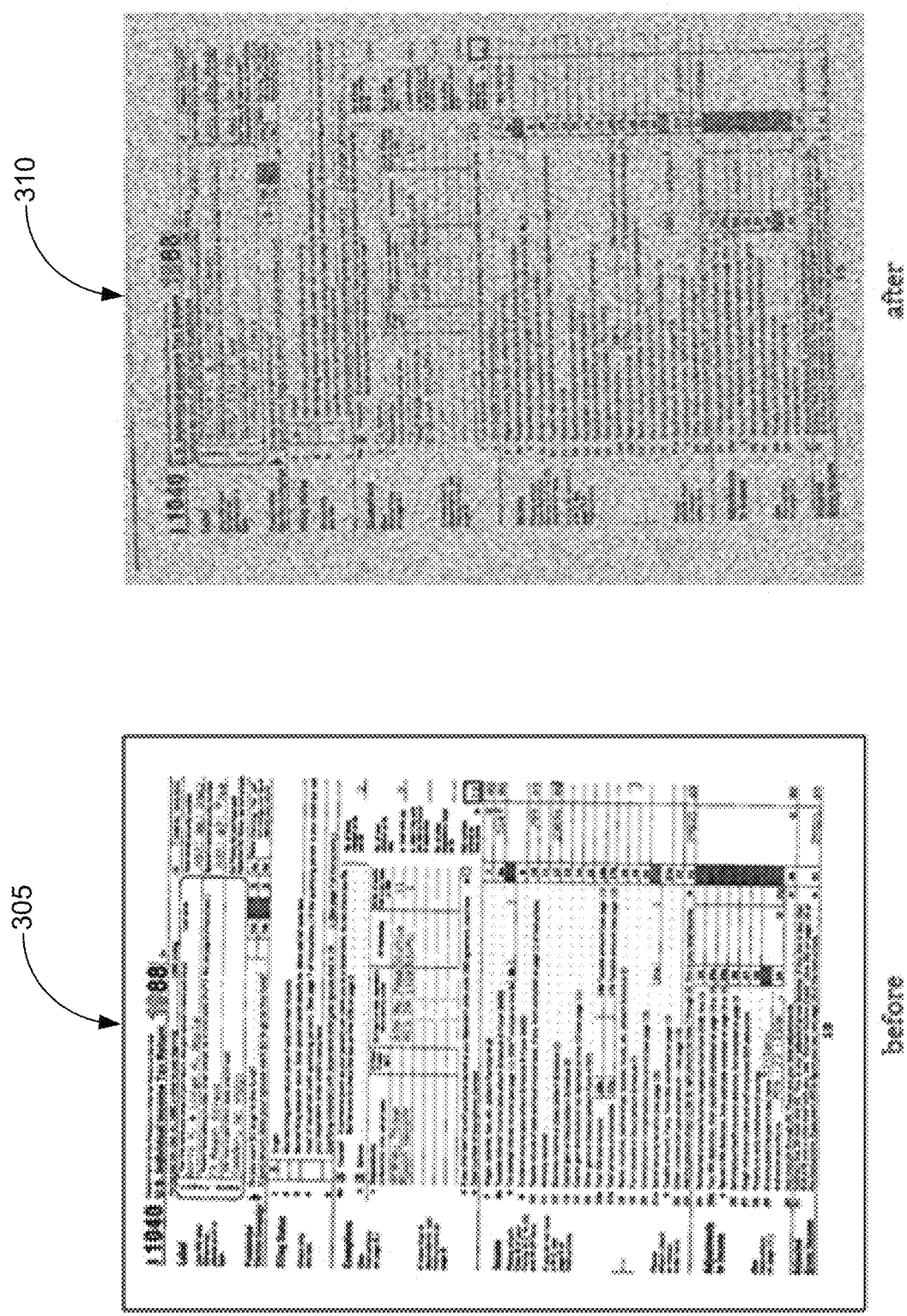
FIG. 3 is an illustration of a National Institute of Standards and Technology (NIST) form, and the form after random noise is applied, consistent with various embodiments.

NIST NOISY. To obtain a dataset that is more representative of the kind of images one might capture on a mobile phone or similar imaging device in resource-constrained environments, we synthetically added random noise to the images in our collection of NIST forms. We used two statistical noise models to simulate the effects of two conditions often encountered in rural developing regions. We first used a Gaussian distribution with a local variance at each pixel to model poor illumination. We then supplemented another layer of salt-and-pepper noise with a Poisson distribution to model poor paper handling and other artifacts caused by dirt and poor transmission bandwidth. An example of a form instance after applying random noise is shown at FIG. 3 where form 305 is a NIST form, and form 310 is the NIST form after random noise is applied.

BRC.

The second dataset consists of images of business reply cards (BRC). In this dataset, there are a total of 5300 scanned images with 25 different types of reply cards. All the forms in this dataset were filled out by hand. Three of the classes are very similar. Many of the instances are partially occluded with a portion of the form missing.

LAPP.

The third dataset is a large collection of life insurance applications (LAPP). It consists of 8000 faxed images of 40 distinct form faces. Many of these form faces are versions of other templates.

Figure 4:
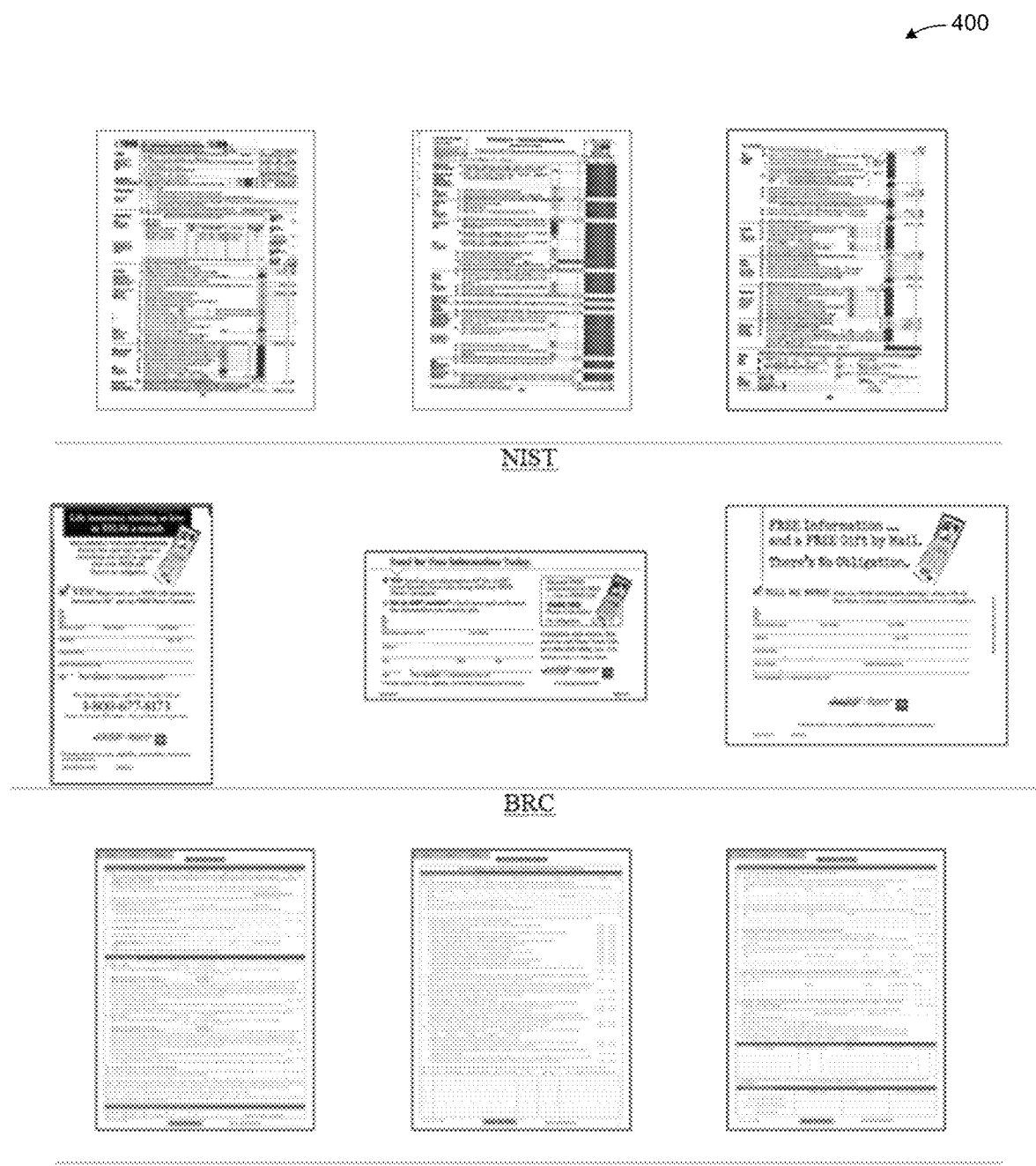
FIG. 4. is an illustration of nine example forms including three example forms from a NIST dataset, three example forms from a Business Reply Cards (BRC) dataset, and three example forms from a Life Insurance Applications (LAPP) dataset, consistent with various embodiments.

Forms 400 of FIG. 4 includes 3 form class examples from each of the NIST, BRC, and LAPP datasets. The document images in all the datasets appear to be real forms prepared by individuals, but the images have been automatically derived and synthesized using a computer.

Results and Discussion.

Figure 5:
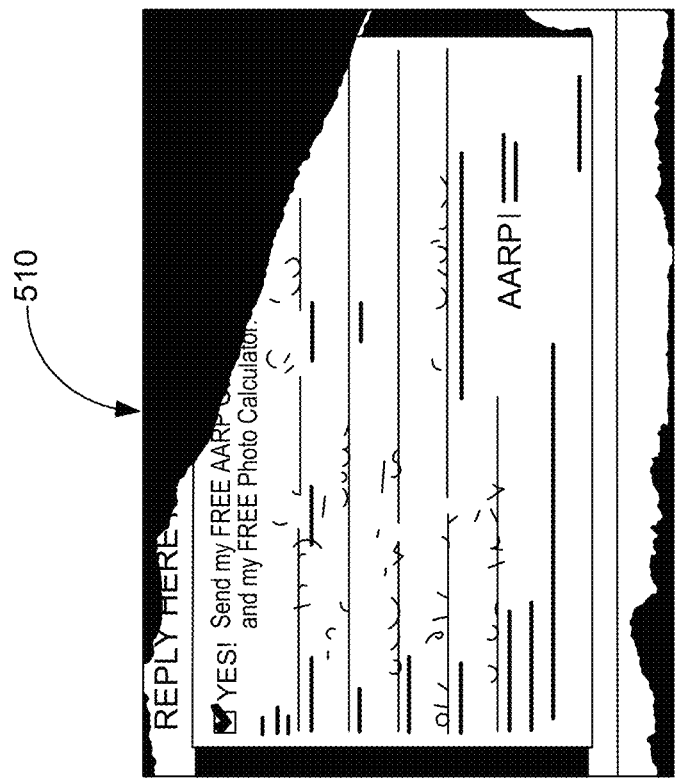
FIG. 5 is an illustration of two partly occluded instances of a form, consistent with various embodiments.
Figure 5:
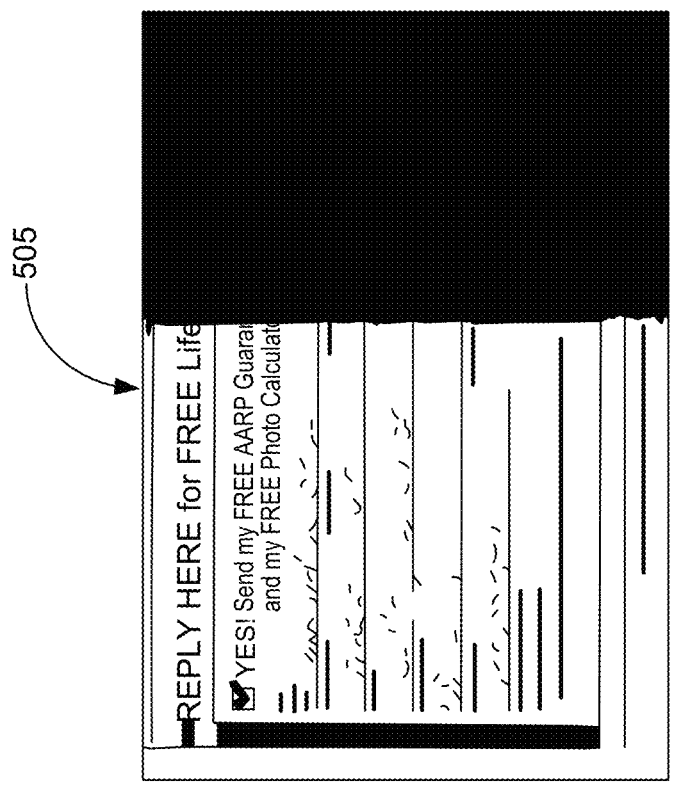
Figure 6:
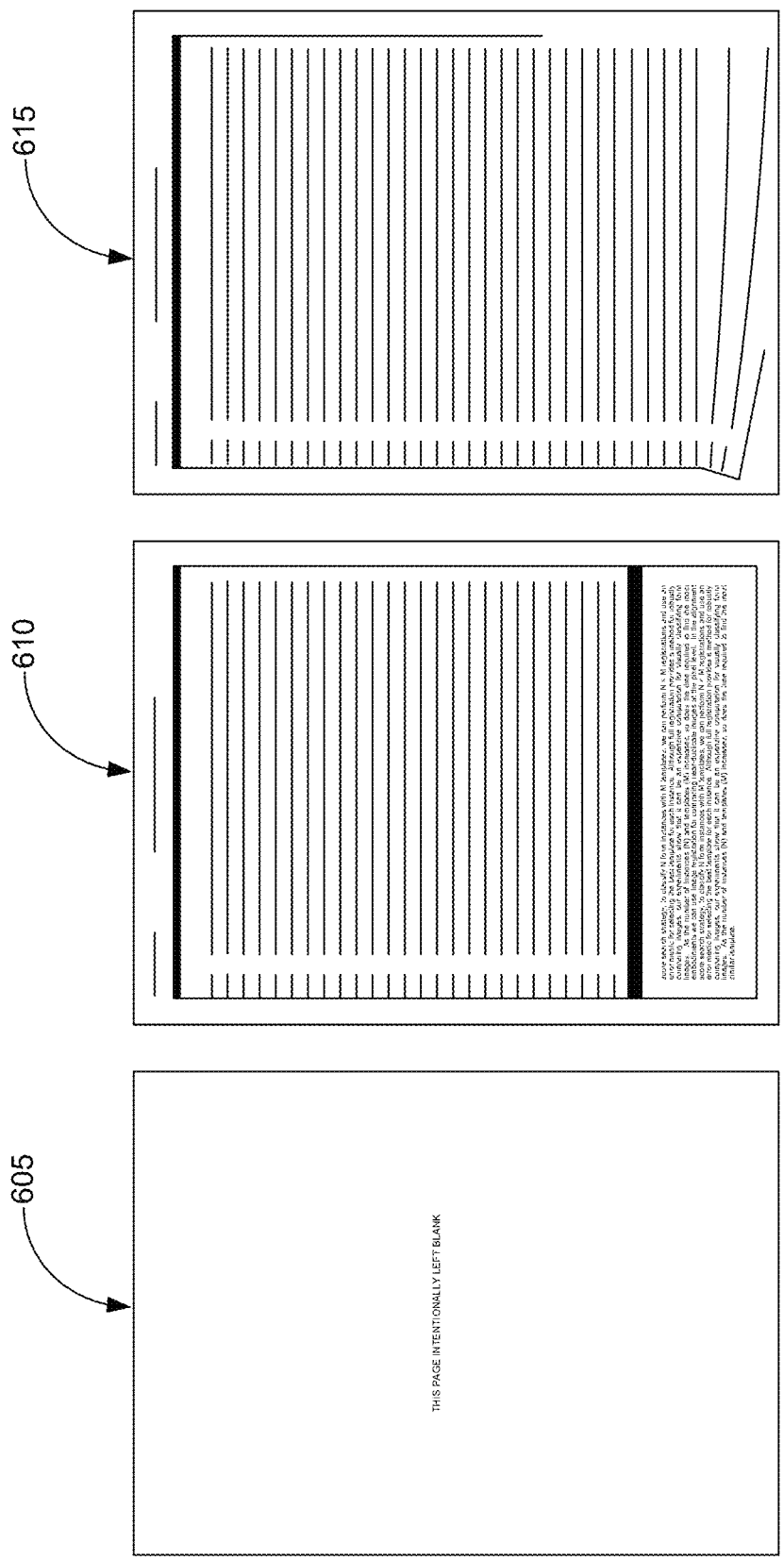
FIG. 6. is an illustration of three forms, including an example of a weakly textured template, and two examples of similar templates with small defects, consistent with various embodiments.

Table 1.1 shows our results in terms of precision, recall and F1 score. Here, we discuss these measures in the classification context, and we calculate precision and recall. As can be seen from the table, the registration with the highest alignment score is highly effective at identifying the template class of registered form instances. In both NIST and NIST NOISY datasets, we achieve an F1 measure of 1.0. In the BRC dataset, F1 drops slightly to 0.99 and continues to fall marginally in the LAPP dataset where we record a value of 0.98. The small decrease in classification performance underscores some limitations in classifying form instances by template matching. One problem, which we observed in the BRC dataset, is poor image quality. Bad scans and severe occlusions in images, as shown in images 505 and 510 of FIG. 5, cause the alignment score to drop significantly. In poor image quality scenarios, such as images 505 and 510, though registration accurately aligns the image patch with its correct template, the proportion of intersecting pixels between the image pair is not large enough to adequately score their alignment. In the LAPP dataset, we noticed that weakly textured form pages did not produce enough features for registration to be considered. A weakly textured template could be a cover page or ruled page for note writing (see image 605 of FIG. 6). Also, small defects in extremely similar templates (versions), as shown by images 610 and 615 in FIG. 6, can negatively impact the matching decision when scores are very close.

The classification results recorded in this experiment will be regarded as the reference standard for all other classification performance throughout this disclosure. Although matching achieved high accuracy on all datasets, it can be highly inefficient due to processing cost and time. For example, to classify the LAPP dataset, we executed 7957×37=294,409 alignments. On a GPU, we recorded an average image registration time of 5.0 seconds. Considering this time, on a machine running a single task, it would require approximately 409 hours to process the entire batch. Experiments were conducted on Amazon Elastic Compute Cloud (Amazon EC2). Amazon EC2 is a web service that provides resizable computing capacity in the cloud. For the current matching experiment, we employed a cluster of 8 graphics processing unit (GPU) powered computing instances (also called nodes) to parallelize processing. Each instance contains 8 virtual processing cores. Therefore, we ran 64 tasks in parallel to reduce the total processing time to about 6.4 hours.

TABLE 1.1

Results of template classification by exhaustive matching.

| Dataset | # of templates (M) | Support (N) | Precision | Recall | F1-measure |
|---|---|---|---|---|---|
| NIST | 20 | 5590 | 1.00 | 1.00 | 1.00 |
| NIST NOISY | 20 | 5590 | 1.00 | 1.00 | 1.00 |

TABLE 1.1-continued

Results of template classification by exhaustive matching.

| Dataset | # of templates (M) | Support (N) | Precision | Recall | F1-measure |
|---|---|---|---|---|---|
| BRC | 21 | 5300 | 0.99 | 0.99 | 0.99 |
| LAPP | 37 | 7957 | 0.99 | 0.98 | 0.98 |

RLM was developed to improve the computational efficiency of template type detection, such as by decreasing the number of alignments required for matching templates to instances and improving the performance time of classification without sacrificing accuracy.

1.2 Retrieval by CBIR

To find the right template for a particular form instance, in some embodiments we can use image registration for comparing near-duplicate images at the pixel level. In the alignment score search strategy, to classify N form instances with M templates, we can perform N×M registrations and use an error metric for selecting the best template for each instance. Although full registration provides a method for robustly comparing images, our experiments show that it can be an expensive computation for visually classifying form images. As the number of instances (N) and templates (M) increases, so does the time required to find the most similar template. In situations where N and M are large, this approach can become highly inefficient and can pose a significant bottleneck in a digitization pipeline. A need exists to substantially reduce the cost of classifying instances in a batch of form pages by first retrieving a list of visually similar document images and providing the best h templates for alignment, where h is significantly less than the total number of M possible templates.

1.2.1 Visual Vocabulary

Data mining can include discovering new patterns or hidden information in large databases. In the case of digital text documents comprising words and sentences, certain constraints may prevent the raw data from being fed directly to the algorithms themselves. For example, some algorithms expect numerical feature vectors with a fixed size rather than a sequence of symbol and text with variable length. To get around this issue, in some embodiments, one can count the number of occurrences of specific words in a document to provide an adequate algebraic model for quantitatively representing the content of the document. This technique is called the vector space model, and is sometimes referred to as Bag-of-Words (BoW). The BoW (i.e., vector space model) technique is known by persons of ordinary skill in the art.

A BoW technique can be used to search for images based on their visual content, making it possible to use a digital picture to efficiently query large (e.g., much greater than a million images) databases of images for pictures with similar visual content. To apply text mining techniques to images, a visual equivalent of a word can be created. This can be done using image feature extraction algorithms like SIFT or SURF to find feature descriptors (as seen in registration) in a set of images and to enumerate the descriptor space into a number of typical examples. By analogy, we refer to these examples as visual words. They are the equivalent of the words of a text document and can enable the application of data mining techniques to images. Consequently, the set of all words comprises a visual vocabulary, also referred to as a visual codebook.

1.2.2 Visual Vocabulary Construction

Figure 7:
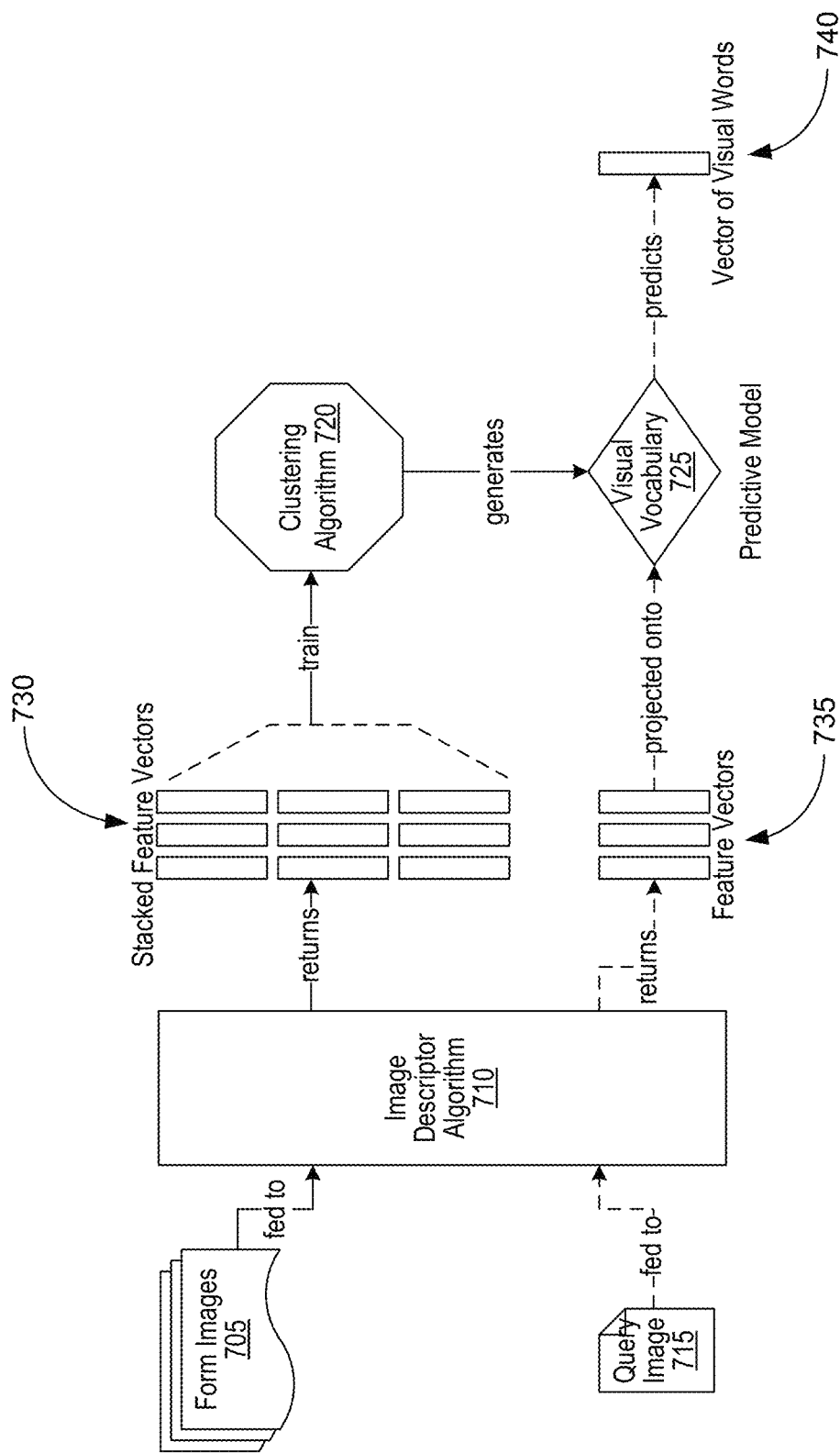
FIG. 7 is a flow diagram illustrating an example process for constructing Bag of Visual Words (BoVW) vectors with a visual vocabulary, consistent with various embodiments.

FIG. 7 is a flow diagram illustrating an example process for constructing BoVW vectors with a visual vocabulary, consistent with various embodiments. In the example process of FIG. 7, form images 705 are fed to image descriptor algorithm 710, which returns stacked feature vectors 730. Stacked feature vectors 730 are used to train cluster algorithm 720, which generates visual vocabulary 725. In some embodiments, a visual vocabulary, such as visual vocabulary 725, is part or all of a template form library. In some embodiments, once visual vocabulary 725 has been generated, query image 715 is sent to image descriptor algorithm 710, which returns feature vectors 735. Feature vectors 735 are projected onto visual vocabulary 725, and vector of visual words 740 is generated.

In some embodiments, image description algorithm 710 is a SURF feature detector, and clustering algorithm 720 is an unsupervised learning algorithm. The unsupervised learning algorithm, which in some of these embodiments is an algorithm in which templates are automatically discovered and used as examples to train an RLM algorithm, can be k-means, which is a clustering algorithm known to those of skill in the art.

In such embodiments, to create visual vocabulary 725, we begin by extracting SURF feature descriptors, via the SURF feature detector, from a set of representative template images, such as representative template images from form images 705. Prior to feature extraction, images, such as form images 705, can be scaled down to limit feature points to a manageable number. The SURF feature detector can create stacked feature vectors, such as stacked feature vectors 730. Stacked feature vectors 730 can be used by the k-means algorithm, which can generate k clusters. The points in feature descriptor space that represent the center of clusters are called centroids. A feature descriptor is assigned to its nearest centroid, and centroids are moved to the average location of all the descriptor vectors assigned to their cluster. Using an index for each centroid, we can create a visual codebook, such as visual vocabulary 725, for representing images in term of these indexes. Once the full visual vocabulary has been trained, each example template is transformed into a histogram of visual words. This histogram is termed the bag-of-visual-words model (BoVW), and it denotes the frequency of each visual word or cluster index in a document image.

1.2.3 Indexing

Figure 8:
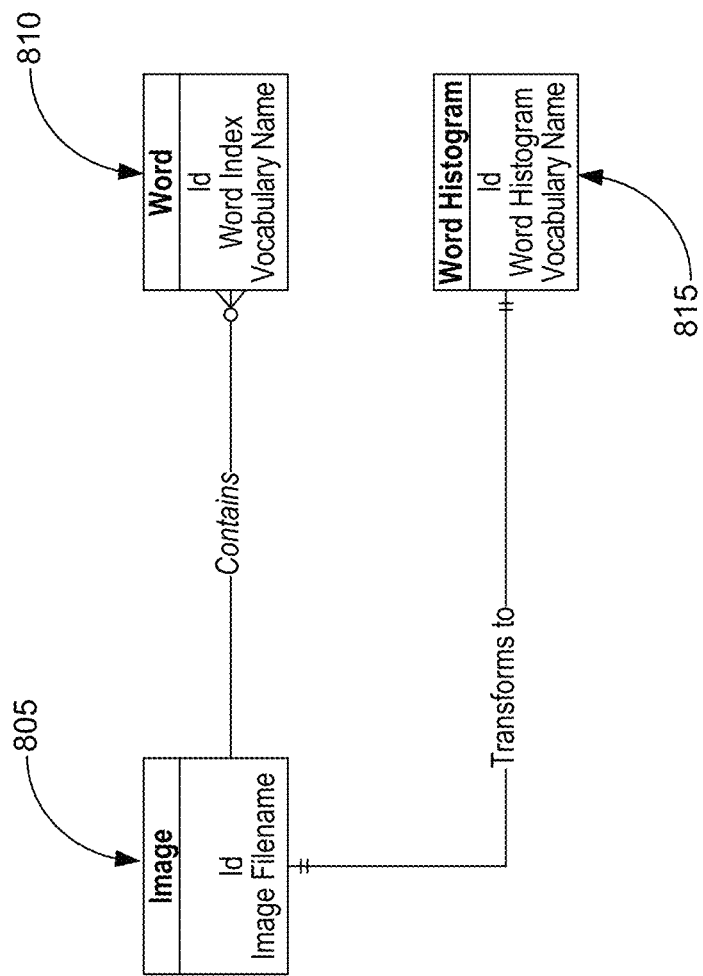
FIG. 8 is a block diagram illustrating a schema for indexing BoVW, consistent with various embodiments.

FIG. 8 is a block diagram illustrating a schema for indexing BoVW, consistent with various embodiments. To start indexing images we can first set up a database. Indexing images in this context means extracting descriptors from the images, converting them to visual words using the visual vocabulary and storing the visual words and word histograms with information about which image they belong to. This makes it possible to query the database using an image and get the most similar images back as search result. In some embodiments, a simple database schema of three tables is used. Table Image 805 includes the filenames of all indexed images. Word table 810 includes the index number of visual words and the image in which the words appear. Additionally, Word Histogram 815 includes the full word histograms for each image.

Figure 9:
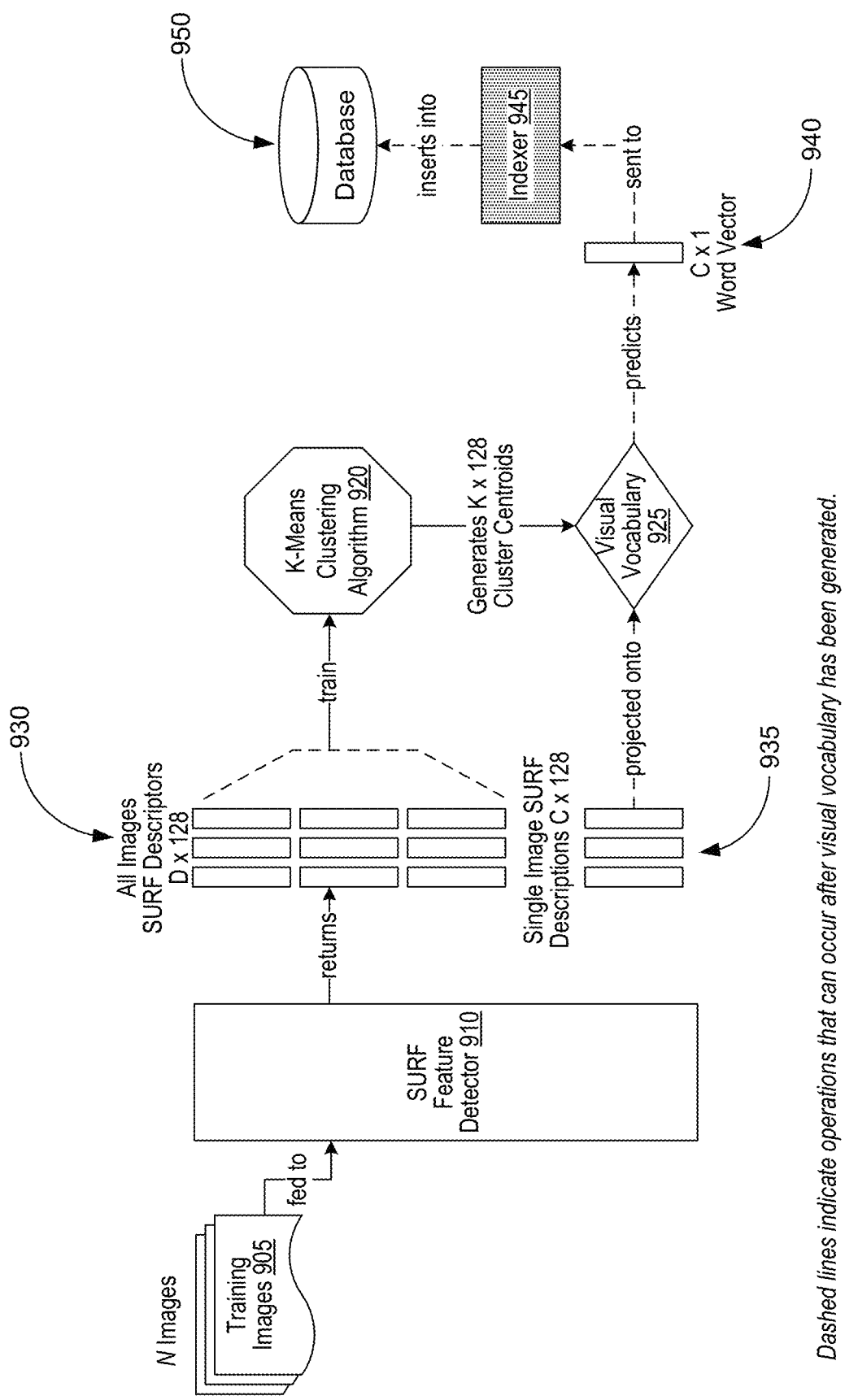
FIG. 9 is an illustration of an example process for indexing BoVW vectors, consistent with various embodiments

FIG. 9 is an illustration of an example process for indexing BoVW vectors, consistent with various embodiments. In FIG. 9, training images 905 can be form images 705 of FIG. 7, SURF feature detector 910 can be image descriptor algorithm 710, all images SURF descriptors 930 can be stacked feature vectors 730, single image SURF descriptors 935 can be feature vectors 735, k-means clustering algorithm 920 can be clustering algorithm 720, visual vocabulary 925 can be visual vocabulary 725, and word vector 940 can be vector of visual words 740.

In the example process of FIG. 9, with the database tables in place (e.g., table image 805 and word table 810 of FIG. 8), images can be stored and indexed for retrieval. Using the same SURF descriptors previously extracted for each image during the vocabulary construction process (e.g., all images SURF descriptors 930 of FIG. 9), we can transform each representative template to a BoVW vector. This can be done by mapping descriptors for a particular image to the index number of their nearest cluster centroids. Counting occurrences of each visual word in the image produces a histogram of visual words (e.g., word histogram 815).

1.2.4 Searching

Figure 10:
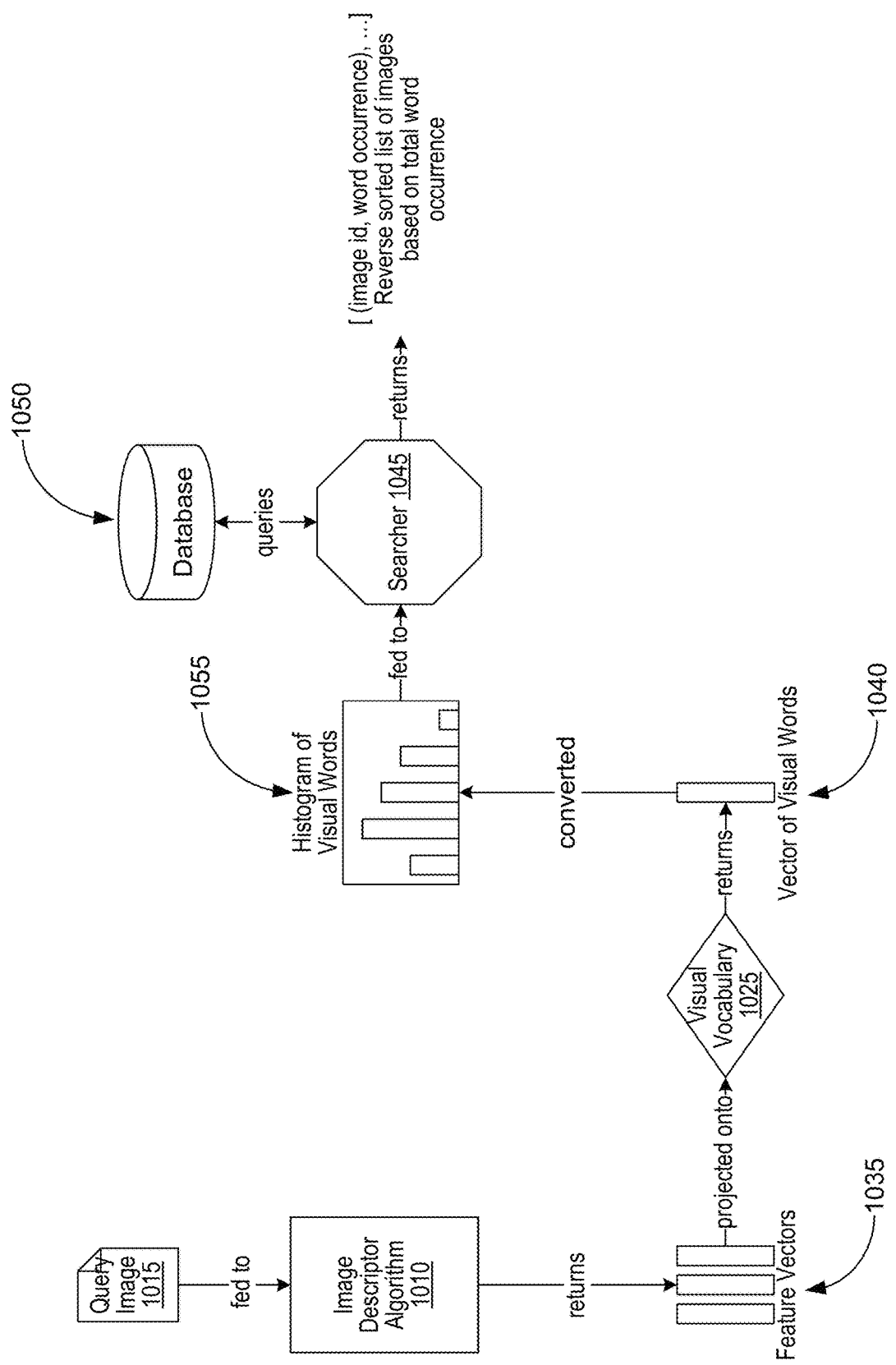
FIG. 10 is an illustration of an example process for BoVW query formulation, consistent with various embodiments.

FIG. 10 is an illustration of an example process for BoVW query formulation, consistent with various embodiments. In FIG. 10, query image 1015 can be query image 715 of FIG. 7, image descriptor algorithm 1010 can be image descriptor algorithm 710, feature vectors 1035 can be feature vectors 735, visual vocabulary 1025 can be visual vocabulary 725, and vector of visual words 1040 can be vector of visual words 740.

In the example process of FIG. 10, once all the training images have been indexed (e.g., per the process of FIG. 9), we can begin searching the database for similar images. Searching the database, such as by searcher 1045 (which can be indexer 945 of FIG. 9), consists of representing a query image, such as query image 1015, as a BoVW, and for each visual word in histogram of visual words 1055 finding all images in the database that contain that particular word. Images retrieved by searcher 1045 can then be sorted in descending order based the number of words they have in common with the query image, and can be stored in database 1050 (which can be database 950 of FIG. 9). This search can return a preliminary list of candidate images for the query. We can still calculate the similarity measure between the query image and these preliminary candidates for a secondary ranking. To achieve this, we can compute the distance between the query image and retrieved templates using their BoVW vectors weighted with the term frequency-inverse document frequency (referred to as "tf-idf").

1.2.5 Vector Space Model

The tf-idf is a weight factor that can be used in information retrieval and text mining. This weight is a statistical measure used to evaluate how important a word is to a document in a corpus. The importance of a word increases proportionally to the number of times a word appears in the document but is offset by the frequency of the word in the corpus. Search engines can use variations of the tf-idf weighting scheme to score and rank a document's relevance given a user query. Tf-idf can be used for stop-word filtering in various subject fields including text summarization and classification. The tf-idf weight can be composed by two terms: the first computes the normalized Term Frequency (tf), the number of times a word appears in a document, divided by the total number of words in that document; the second term is the Inverse Document Frequency (idf), computed as the logarithm of the number of the documents in the corpus divided by the number of documents where the specific term appears. We have the following variation for images.

The term frequency, $\Omega_{TF}$, measures how frequently a visual word occurs in a form image. Since form images can be of varying shape and produce different numbers of visual words, it is possible that a visual word would appear more times in more complicated forms than simpler ones. Thus, the term frequency is often divided by the total number of visual words in the image as a way of normalization:

$$\Omega_{TF}(v) = \frac{\text{number of } v \text{ in the image}}{\text{total visual words in the image}}, \quad (1.8)$$

where v is a specific visual word.

The inverse document frequency, $\Omega_{IDF}$, measures how important a visual word is to the image. In computing $\Omega_{IDF}$, all visual words can be considered equally important. However, some visual words may appear a lot more frequently than others. Thus we can weigh down the frequent terms while we scale up the rare ones by computing $\Omega_{IDF}$ as follows, $$\Omega_{IDF}(v) = \ln\left(\frac{\text{total number of images}}{\text{number of images with } v}\right). \quad (1.9)$$

It should be noted that the term "visual word" in the setting of the disclosed CBIR system need not account for the textual content of a form image, meaning, a SURF descriptor obtained in a region of a form image containing the text "home" may not qualify as an effective identifier for the word "home" in other forms. A visual word can imply a list of, for example, 128 or 64 integers describing a SURF feature found in the image.

1.2.6 Similarity Measures

A distance-based similarity metric can be used to decide how close one BoVW vector is to another BoVW vector. Various functions can be used to find the distance between the two vectors.

1.2.7 Experiments with Forms

Objective.

Our goal in this experiment is to evaluate the effectiveness of an embodiment of a CBIR system in retrieving the template of a form instance using various distance measures. We measure the average recall and average time per query on each dataset.

Setup.

To perform the experiments in this section, we first apply the aforementioned principles and architectures to build a CBIR system. Similarly to registration, we use SURF for feature extraction. Using k-means, we build the visual codebook for our template collection. Templates from all datasets are merged into a unified training set comprising 78 distinct classes. Only one example per class is indexed for retrieval. We carry out two experiments. They are described and discussed below.

In the first experiment, we retrieve the top 3 templates for a query image and measure the average recall as we change the distance metric for computing image similarity. In the second experiment, using one of the distance metrics evaluated, we measure the average recall as a function of the topmost h results returned by the system for a given query image, where 1<h<20. In both experiments, we define a query as successful if the relevant template falls within the first retrieved item and the cut-off rank, h. In our first experiment h=3. We sample 1000 images from each dataset and evaluate each batch separately.

Result and Discussion.

Table 1.2 shows the average recall performance for the 12 different distance metrics. NIST and BRC illustrate that CBIR can achieve high recall with fairly clean and structurally distinctive form classes regardless of the similarity metric employed. However, the inclusion of noise reduces recall substantially. Reviewing the retrieval performance in the LAPP dataset, we can infer that the degree of similarity between templates can have a negative effect on recall. In this dataset, form classes share a lot of similar content, and the sum of their visual words constitutes a feeble vocabulary for retrieving relevant templates.

TABLE 1.2

Average recall for different similarity measures.

| Similarity Metric | NIST | NIST NOISY | BRC | LAPP |
|---|---|---|---|---|
| Bhatttacharyya | 1.00 | 0.58 | 0.96 | 0.15 |
| Bray-Curtis | 1.00 | 0.01 | 0.99 | 0.15 |
| Canberra | 1.00 | 0.00 | 0.95 | 0.38 |
| Chebyshev | 1.00 | 0.00 | 0.82 | 0.20 |
| Correlation | 1.00 | 0.39 | 0.94 | 0.29 |
| Cosine | 0.99 | 0.29 | 0.94 | 0.26 |
| Earth Mover Distance | 0.89 | 0.00 | 0.61 | 0.10 |
| Euclidean | 1.00 | 0.00 | 0.94 | 0.26 |
| Hamming | 0.84 | 0.00 | 0.60 | 0.45 |
| Manhattan | 1.00 | 0.00 | 0.98 | 0.34 |
| Minkowski | 1.00 | 0.00 | 0.94 | 0.26 |

Figure 11:
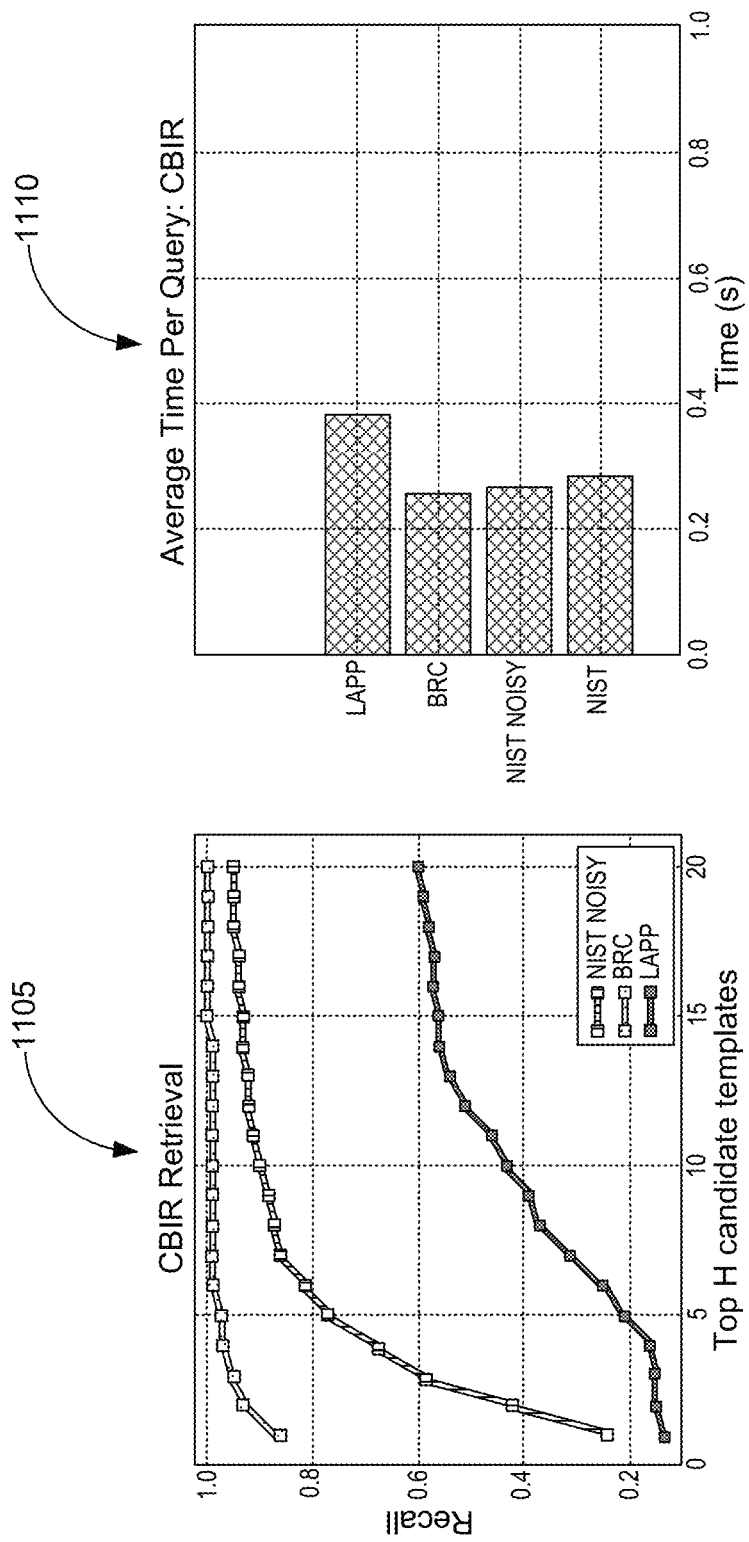
FIG. 11 is an illustration of a plot and a histogram that depict Content Based Image Retrieval (CBIR) retrieval performance results, consistent with various embodiments.

The left plot in FIG. 11 (plot 1105) shows the change in recall as we increase the number of retrieved images, while the plot on the right (plot 1110) shows the average time per query. A query, in this context, takes into account feature extraction and visual word formulation. On NIST we attain a recall of 1.0 at the first retrieved candidate. For this reason, it is omitted in the recall plots. Although we see a rise in recall for higher values of h, the large gaps in retrieval accuracy for different image conditions do not support the idea of using CBIR as a dependable approach for restricting alignment choices.

1.3 Retrieval by Feature Classification Levels

One of the advantages of using distance measures is that the computation is relatively fast and simple, but as we have seen in the previous section, distance-based similarity measures can fail in various circumstances. They may not provide a reliable method for template retrieval within a fixed interval of topmost candidates. In high dimensional spaces, distance metrics fall victim to the curse of dimensionality. As a result, they may fail to capture where the true differences and similarities appear in images. Since BoVW can generate highly sparse vectors, visual words may be poor detectors of co-occurring feature points located relatively far away from cluster indexes. Therefore, in some embodiments, instead of using distance to establish similarity, we turn to classification to define a retrieval method that identifies features and regions that are co-occurring between the images of form instances and templates. The levels of feature and region classification in a query instance are used to generate a sorted list of template candidates. In the following, we elaborate on the intuition that inspired this approach. We drive the development of our model through a series of experiments and gradually adjust our expectations. Finally, we arrive at an embodiment of a model for the retrieval component of RLM and discuss its performance on our datasets.

1.3.1 Image Classification

In image classification, similarly to CBIR, an image is transformed into a vector. This vector could be a BoVW or some other technique for quantizing visual content. Once the vector is obtained, a classifier can be trained to recognize future images belonging to the same class. In contrast to some embodiments of image retrieval, a classifier trained with a dataset where images are represented with a single vector can provide a single answer. In our context, image classification may defeat the purpose of comparing templates through matching since no other template may be identified for consideration. A more desirable method can provide an initial classification with the option of some viable substitutes. One way to achieve this may be by classifying multiple vectors per image, and in predictions where the classification of these vectors is not unanimous, the label disagreements may lead to visually similar images. As we have seen in previous sections, feature detectors, e.g., SIFT or SURF, can provide a convenient way for defining multiple descriptor vectors for an image. These descriptor vectors can be classified with the class label of the template that contains them. Experimental results for such a system are provided below.

1.3.2 Feature Classification

Figure 12:
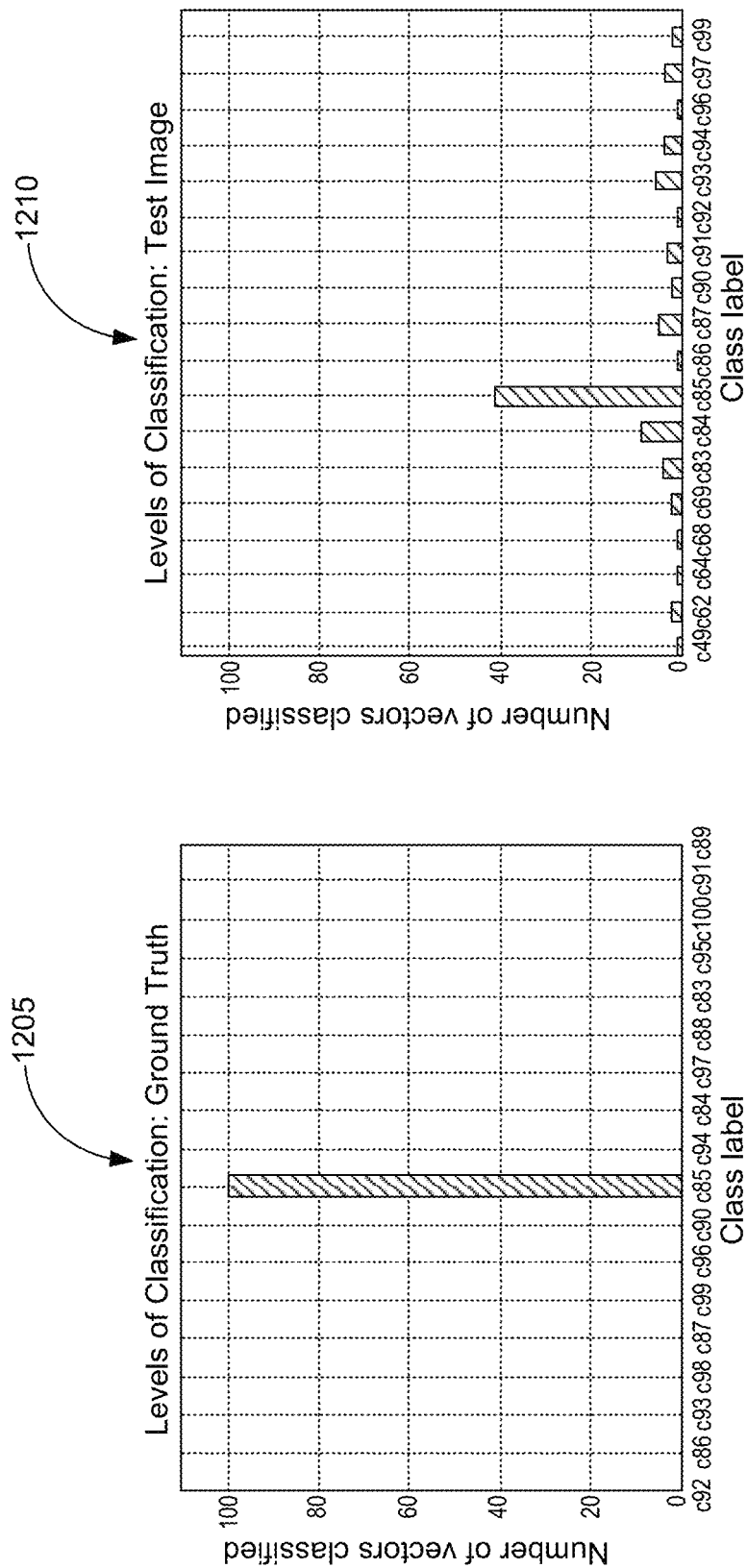
FIG. 12 is an illustration of two histograms that depict levels of feature classification results, consistent with various embodiments.

We begin by illustrating the idea of feature classification levels with an example. Consider the NIST dataset. In an experiment, using SIFT, we extract 100 keypoints from one example in each form class. We then create a training set where the SIFT descriptors represent the features and the form classes represent the labels. After training a classifier on this training set of example forms, which contain the ground truth descriptor vectors, a unanimous classification may be achieved. The bar chart on the left in FIG. 12 (chart 1205) shows the result of predicting the ground truth descriptors for form class c85. All 100 vectors are assigned the same label. However, for images not included in the training set, the classification is not so clean. The image on the right (chart 1210) shows the levels of descriptor disagreement for an unknown form of the same class. Though the classification is not perfect, the most frequent classification result indeed depicts the right class. Given the nature of many classification algorithms to search for similarities in features, it is highly plausible that the levels of misclassification are coming from templates with very similar features. In fact, through manual error analysis, we observed that classification mistakes returned labels for visually similar templates. Therefore, we determined that sorting the predicted descriptor labels based on frequency of occurrences should provide an ordered list of visually similar templates. We formalize this determination as follows.

Feature classification can be posed as a labeling problem. Suppose $\mathcal{L}$ denotes the set of M possible form class labels $$\mathcal{L} = \{l_1, \ldots, l_m\} \quad (1.10)$$

and $X=(x_1, \ldots, x_N)$ denotes the sequence of N vectors, x, extracted from an image. Using a classifier function $f: X \rightarrow Y$, we find the sequence of N predictions, Y, such that $$Y=(y_1, \ldots, y_N), y_h \in \mathcal{L} \quad (1.11)$$

In our experiments, we use the k nearest-neighbor (kNN) algorithm to train and predict the form class of a vector. In these experiments, training the algorithm consists of storing every training vector, x, with its corresponding class label, y. To predict a test vector, kNN computes its distance to every training vector. Using the k closest training examples, where $\{k \in \mathbb{N} | k \geq 1\}$, kNN looks for the label that is most common among these examples. This label is the prediction for the test vector. In kNN, the value of k, and the distance function to use may need to be chosen. In our experiments, we employ standard Euclidean distance with k=1. Using the same set notation as above, we can therefore define the kNN classification criteria function in terms of the Cartesian product of test example, X, and training example, $X_{train}$ $$f_{kNN}:(X_{train} \times Y_{train})^n \times X \rightarrow Y \quad (1.12)$$

where n is the cardinality of the training set and $X \times X \rightarrow \mathbb{R}$ is a distance function. We can now add the following to equation 1.11

$$Y = f_{kNN}(X) = (y_1, \ldots, y_N), y_h \in \mathcal{L} \quad (1.13)$$

Prior to generating an ordered list of candidate templates, we can first poll the predictions in Y and sort them in descending order. To this end, we define the function, $\mathcal{N}$, such that $$\mathcal{N}(y) = \text{number of occurrences of } y \text{ in } Y \quad (1.14)$$

Using the above equation, we obtain the ordered set of candidate templates as follows $$C = \{c \in Y | \mathcal{N}(c_h) \geq \mathcal{N}(c_{h+1})\} \quad (1.15)$$

To verify our determination, we replicate the CBIR experiment of FIG. 11. The experiment considers the independent performance of three distinct feature descriptors: SIFT, SURF and ORB.

Using equation 1.11, we set N=100 and extract 100 SIFT and 100 ORB keypoints from the query image. In the case of SURF, a threshold is used to control the Hessian corner detector used for interest point detection inside the inner workings of the algorithm. This threshold determines how large the output from the Hessian filter must be in order for a point to be used as an interest point. A large threshold value results in fewer, but more salient keypoints, whereas a small value results in more numerous but less distinctive keypoints. Throughout our experiments, the SURF Hessian threshold is kept at a constant 1600. This conservative threshold value is strong enough to generate up to 1000 keypoints. After classification, we obtain the set of labels for each descriptor sequence according to equation 1.13 and apply equation 1.15 to compute the ordered list of candidates.

Figure 13A:
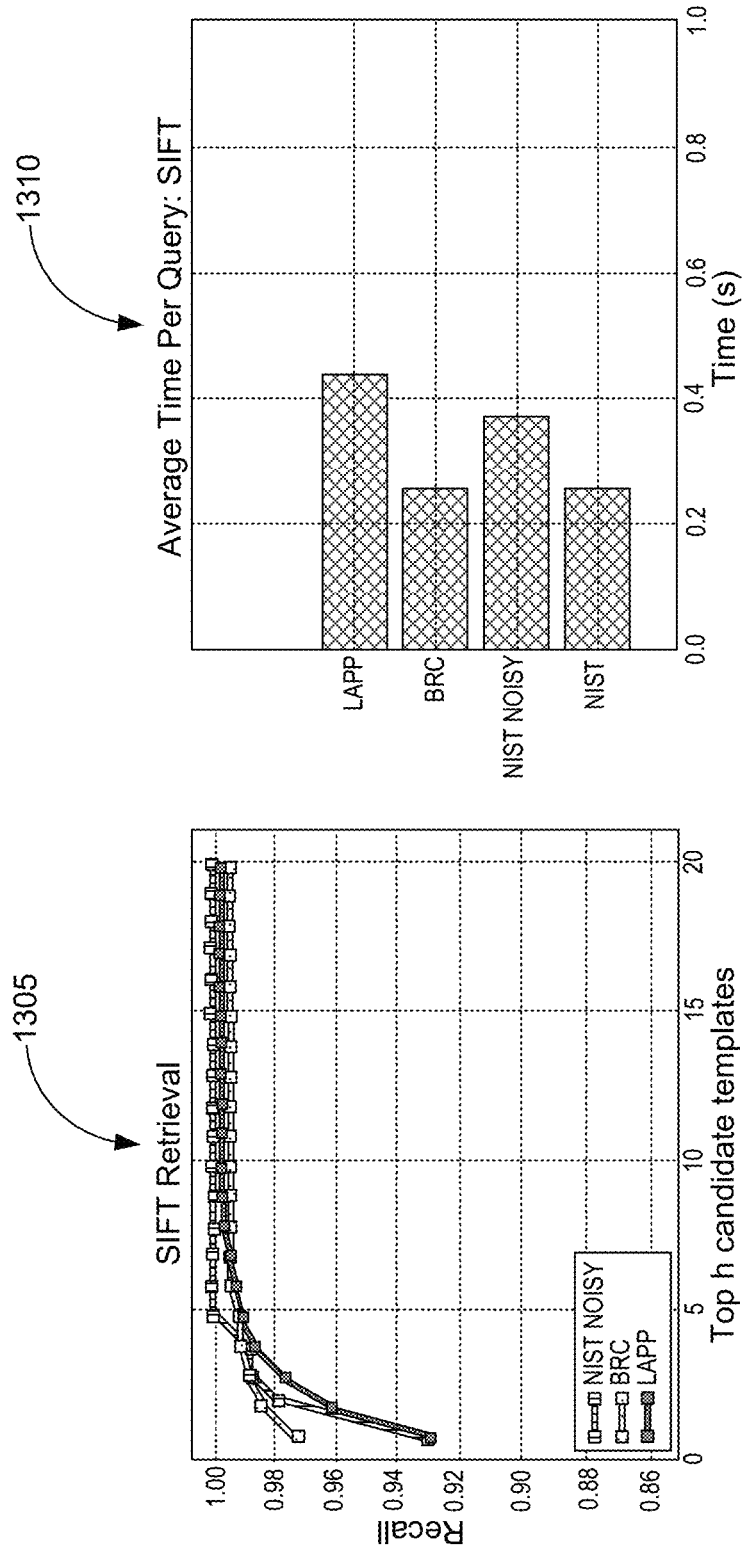
FIGS. 13A, B, and C are illustrations of three plots and three histograms that depict Scale Invariant Feature Transformation (SIFT), Oriented FAST Rotated Brief (ORB), and Speed Up Robust Feature (SURF) template retrieval results, consistent with various embodiments.
Figure 13B:
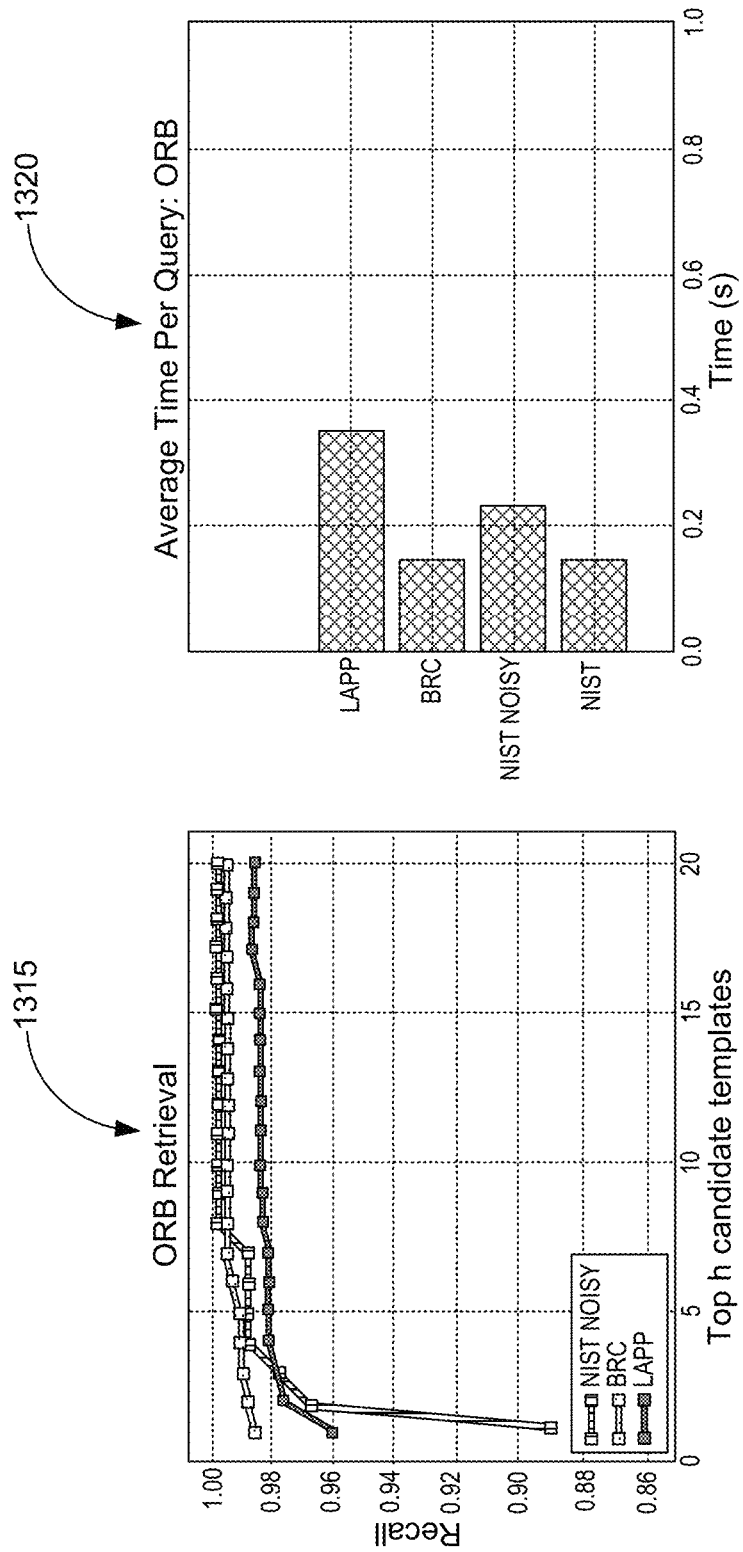
Figure 13C:
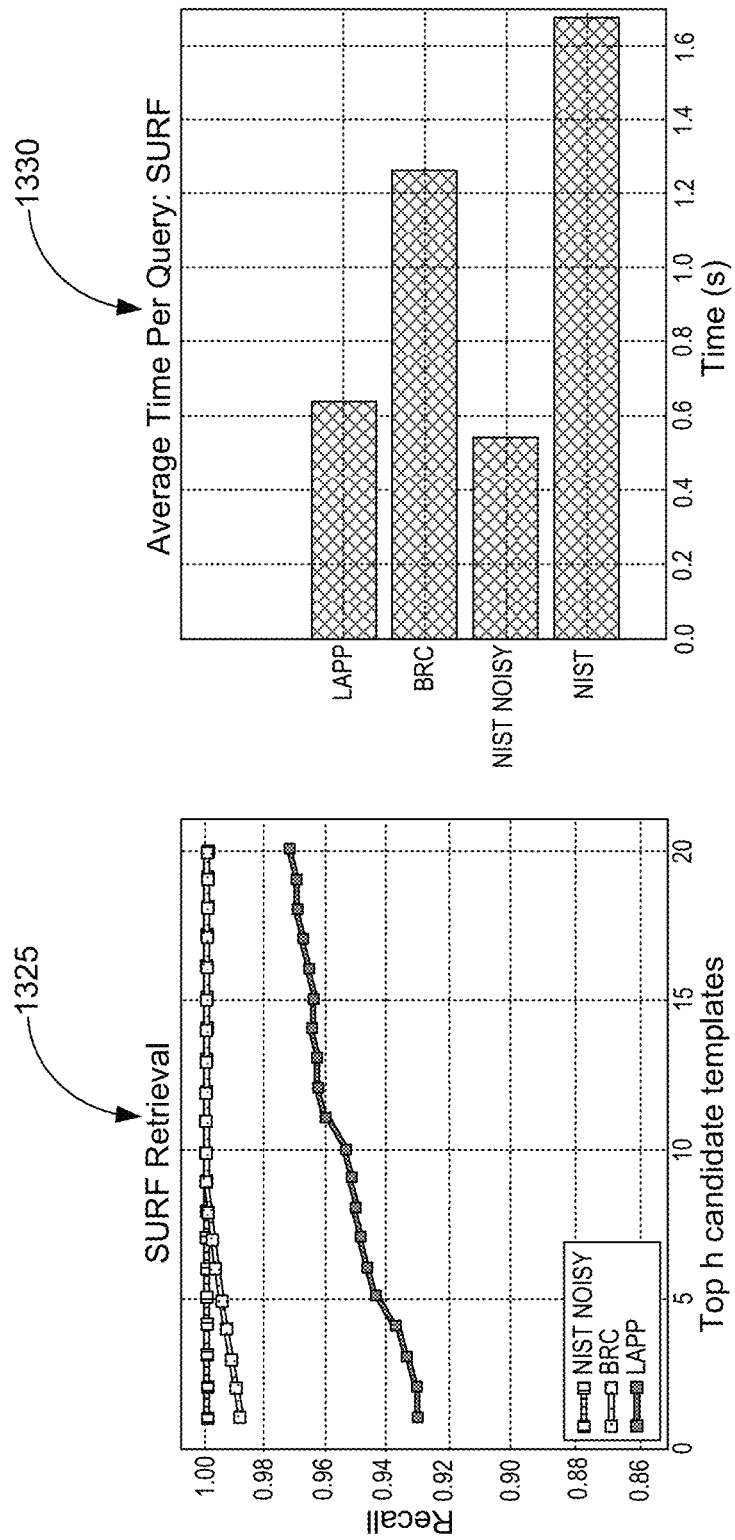

For evaluation, we sample 1000 images from each of our datasets and measure the retrieval accuracy as a function of the top h candidates returned by the classifier. The plots on the left in FIGS. 13A-C (plots 1305, 1315, and 1325) show the average recall as a function of h, while the right plots (plots 1310, 1320, and 1330) show the average query time for the corresponding classifier. The rate of increase in accuracy for all classifiers is much faster than what we observed in CBIR. ORB achieved faster query times on all datasets since its descriptor size is smaller than that of SIFT and SURF.

Though it is clear that feature classification provides a method for retrieving similar documents, in some cases it has limitations. Returning to the experiment of FIGS. 13A-C, on both the BRC and LAPP datasets, after a certain h the recall of all classifiers begins to plateau and never reaches 100% even when we consider all the candidates in the list of retrieved templates. In the corresponding CBIR experiment, we observed a similar effect where the lack of features in a query image caused visual words of interest to go unnoticed, thereby failing to retrieve the correct template. This performance saturation in retrieval by feature classification is also a consequence of failing to retrieve the right template for a query instance, but the cause of these faulty retrievals differs meaningfully from that of CBIR. The reason is as follows. In datasets where templates are extremely similar, the descriptors of a form instance may be assigned the class label of its next most similar template. Both the BRC and LAPP datasets contain templates with extremely similar form faces. This type of misclassification introduces a substitution in the sequence of descriptor labels where the majority of the descriptors are assigned the label of the next most similar form class, thereby causing the relevant class to go undetected. We will revisit this issue later as this is directly related to our learning algorithm.

Later, we introduce technology for mitigating the problem of faulty retrieval by combining predicted labels across classifiers into a single histogram. Prior to diving into that discussion, we continue our analysis of feature classification by applying the technique to BoVW vectors.

1.3.3 Region Classification

Figure 14:
FIG. 14 is an illustration of region partitioning for generating multiple BoVW vectors for an image, consistent with various embodiments.

To apply the same classification technique to BoVW vectors, one should first decide on a method for representing an image as a collection of BoVWs. Above, we discussed how an image could be represented as a single vector using a visual vocabulary. In some embodiments, clustering descriptors for a group of templates, assigning the closest cluster index to each descriptor detected in an input image and tallying common indexes into a histogram constitute steps to form the vector. In CBIR, the final vector can take into account visual words occurring throughout the entire image. In some embodiments, to obtain multiple BoVWs for a single image, we partition the image into 9 separate regions, as shown at 1400 of FIG. 14.

Figure 15:
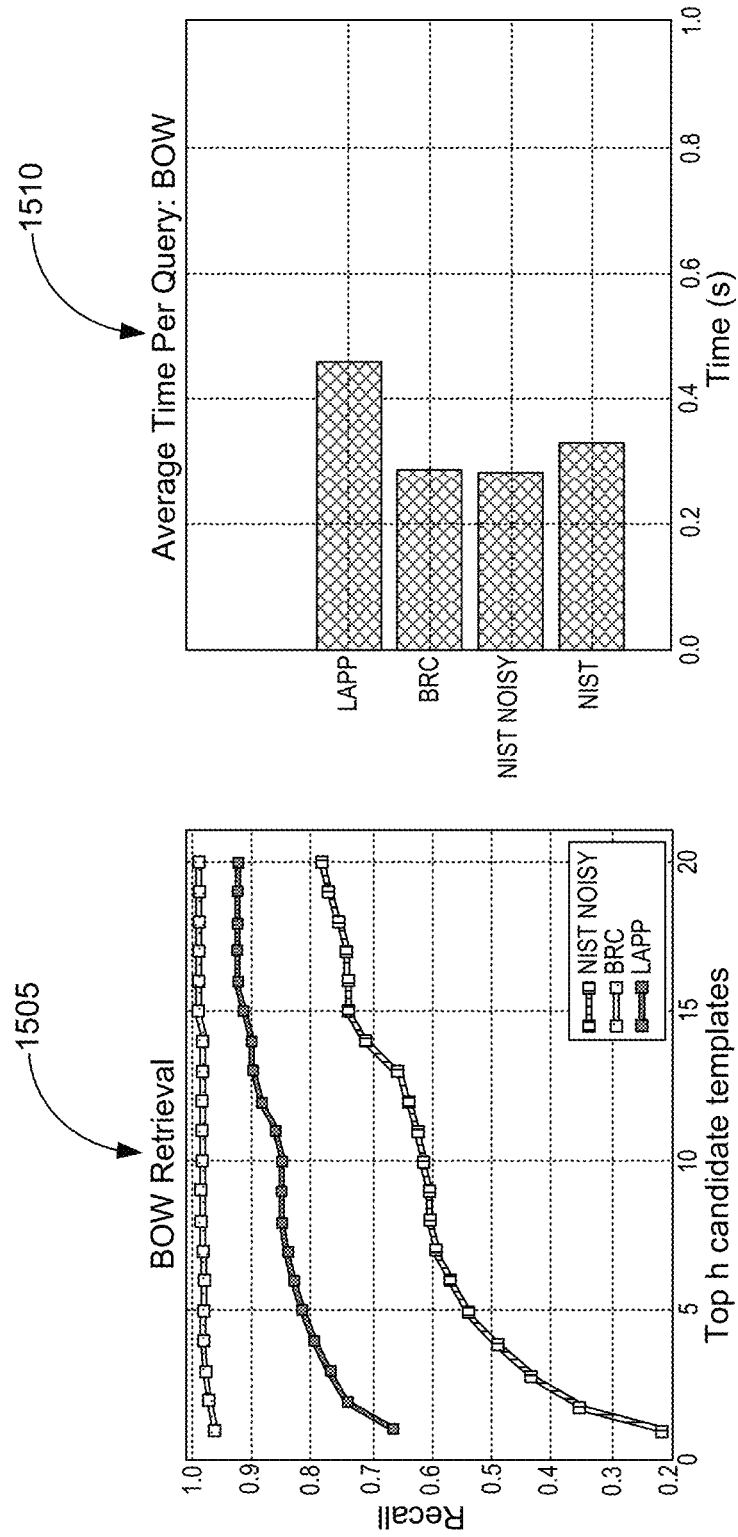
FIG. 15 is an illustration of a plot and a histogram that depict Bag of Words (BOW) template retrieval performance results for region classification, consistent with various embodiments.

We can use the features enclosed in each region to generate a BoVW. Additionally, we can triple the number of vectors by employing three different visual codebooks based on SIFT, SURF and ORB. Using the definition in Equation 1.11, we can represent the BoVW region classification, $Y_w$, as follows $$Y_w = (y_1, \ldots, y_R), y_h \in \mathcal{L} \quad (1.16)$$

where R=27 for some applications. To assess the potential of the multi-part BoVW representation for retrieval, we perform our usual retrieval experiments. Our recall results are shown in plot 1505 of FIG. 15, while the average time per query is shown on histogram 1510. On the NIST dataset (not shown in the figure), in which forms are highly distinctive and fairly clean, we achieve 100% recall. This is not surprising since CBIR and the various feature classifiers perform equally well. In the LAPP and BRC datasets, though recall accelerates much faster than CBIR, we see the same flattening effect above the 90% mark. In the presence of noise, the BoVW representation struggles with finding the most relevant visual words to express image content. We can see this in the case of NIST NOISY where recall is significantly less than the two other datasets. BoVW vectors are not as salient as feature vectors and may not be able to handle the high variation in visual appearance.

Although region classification provides, in some cases, a weaker retriever than feature classification, it has some benefits. In performing manual error analysis, we noted that region and feature classifiers made very different mistakes, and in situations where the feature classifiers failed, that the region classifier would often find the right template. We observed this situation with templates that were highly uniform with scattered areas of variability in their instances. Below, we investigate embodiments of ensemble architectures in which we leverage the strength and weakness of both kinds of classifier to (1) improve recall and (2) restrict the retrieval list to a small list of strong candidates.

1.3.4 Combining Classifiers

In some embodiments, we combine the predictions of all classifiers we have previously evaluated. Our goal is to improve the overall recall and robustness of retrieval. We use the term SIFT, SURF and ORB to refer to the feature classifier using the corresponding descriptor. The term WORD is used to refer to the region classifier presented above. In some embodiments, each predictor is built independently of each other, that is, in those embodiments we do not combine SIFT, SURF and ORB feature vectors. In some embodiments, classifiers are trained to predict features within their respective descriptor vector space. Below, we analyze two paradigms—ensemble prediction and classifier agreement—in which the models can cooperate to improve the overall reliability of retrieval.

Ensemble Prediction by Majority Voting.

An ensemble of classifiers is a set of classifiers whose individual predictions are merged in some fashion. Prior to combining classifier predictions, one can ensure that base predictors are not randomly guessing. We can also ensure diversity in classifier predictions in order to increase the effectiveness for an ensemble. Two classifiers that always predict the same values will not experience any gain in recall. Building on the formulation presented above, we can define the SIFT-ORB ensemble as the concatenation of predictions $Y_s$ and $Y_o$. The equation below shows this definition.

$$Y_{so} = (y_1^s, \ldots, y_{100}^s, y_1^o, \ldots, y_{100}^o), y_h^s \in Y_s \text{ and } y_h^o \in Y_o \qquad (1.17)$$

Generating candidate templates from the ensemble follows the same rule $$C_{so} = \{c \in Y_{so} | \mathcal{N}(c_h) \geq \mathcal{N}(c_{h+1})\} \qquad (1.18)$$

In an experimental setup, we employ the above equations to retrieve the list of candidates. We explore the following ensemble configurations: SIFT-SURF, SIFT-ORB and SURF-ORB. We use the same dataset and sample size used in prior experiments. We note that we do not consider the WORD classifier in the ensemble structure since unreported experiments indicated that its 27 vectors do not constitute an impactful vote.

Figure 16A:
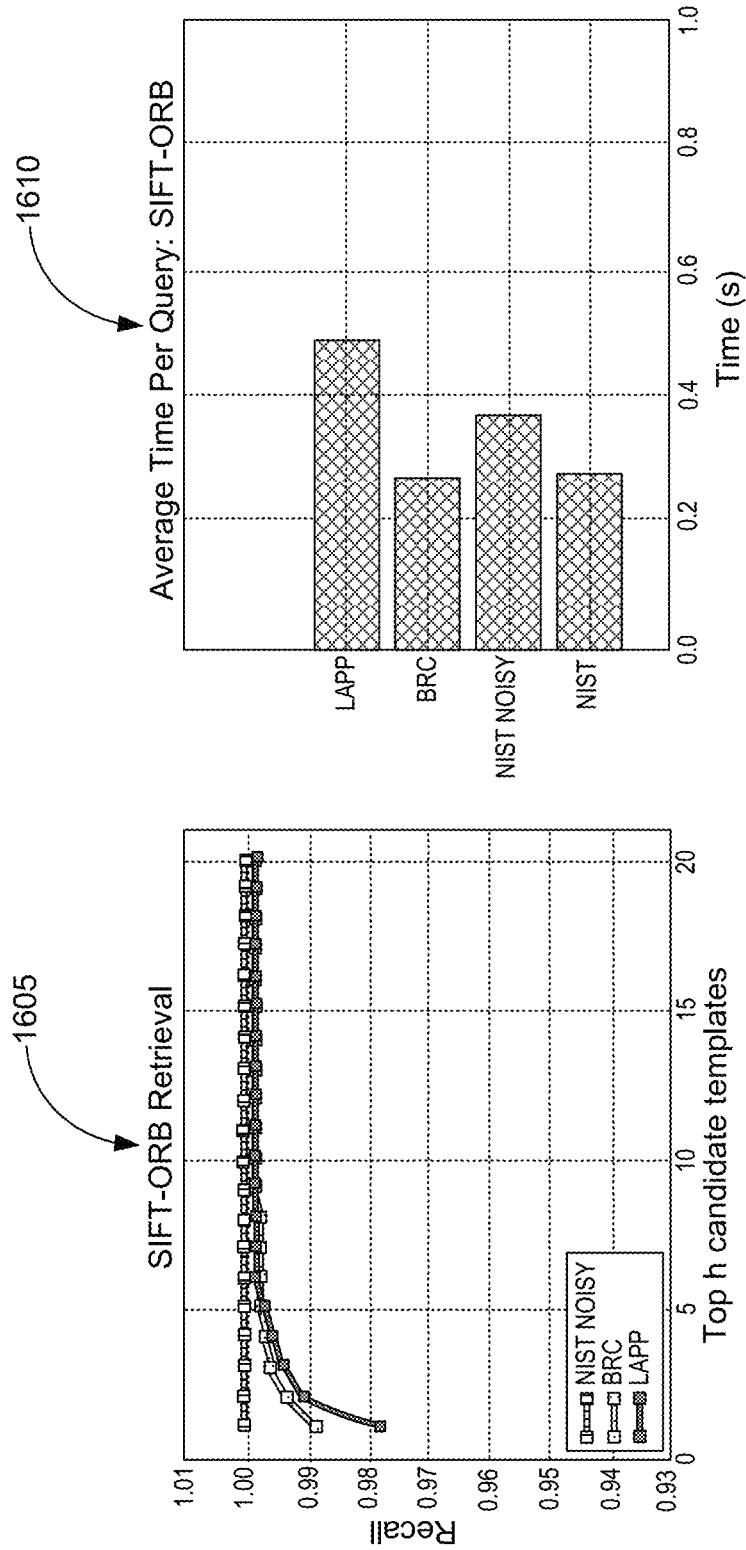
FIGS. 16A, B, and C are illustrations of three plots and three histograms that depict template retrieval performance results for ensemble predictions, consistent with various embodiments.
Figure 16B:
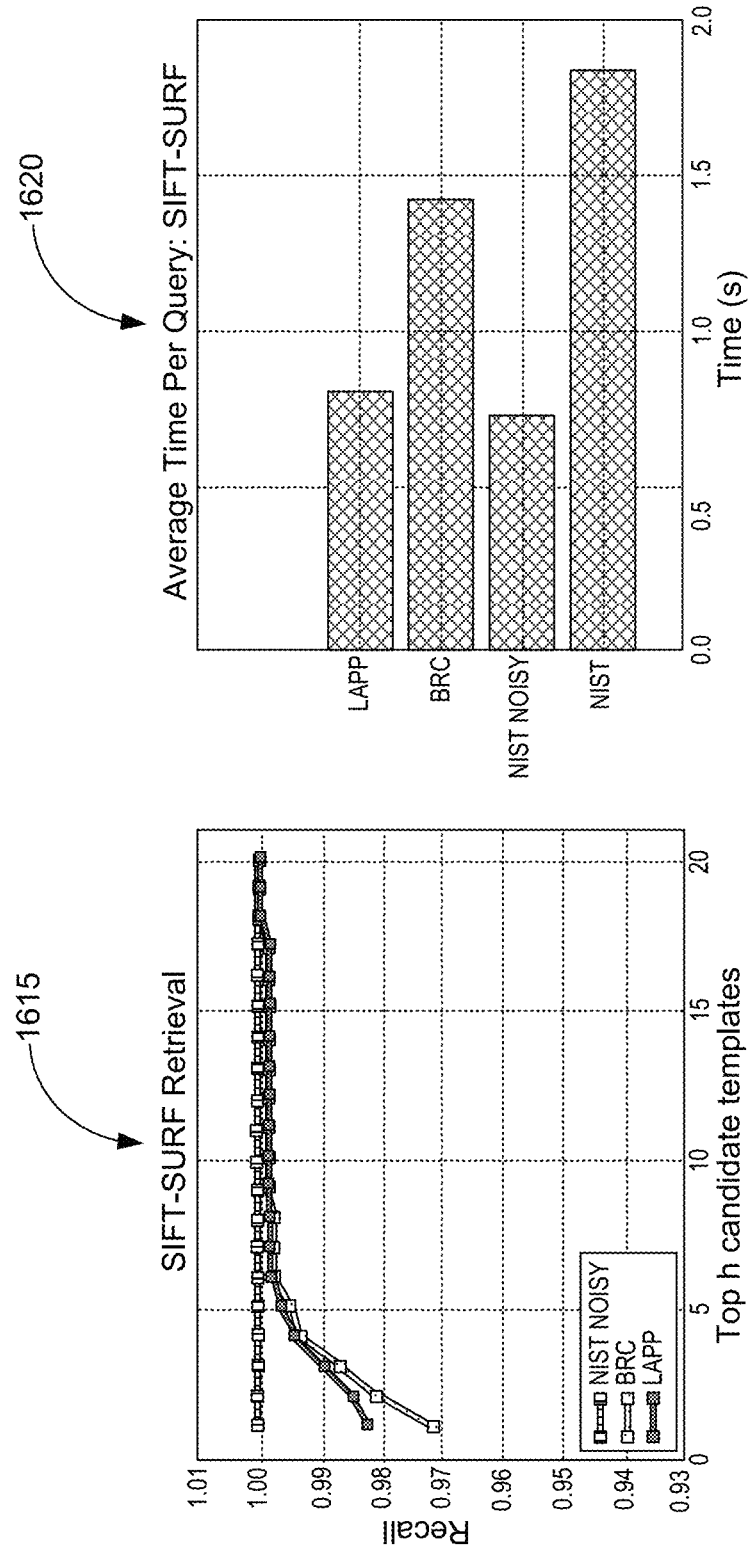
Figure 16C:
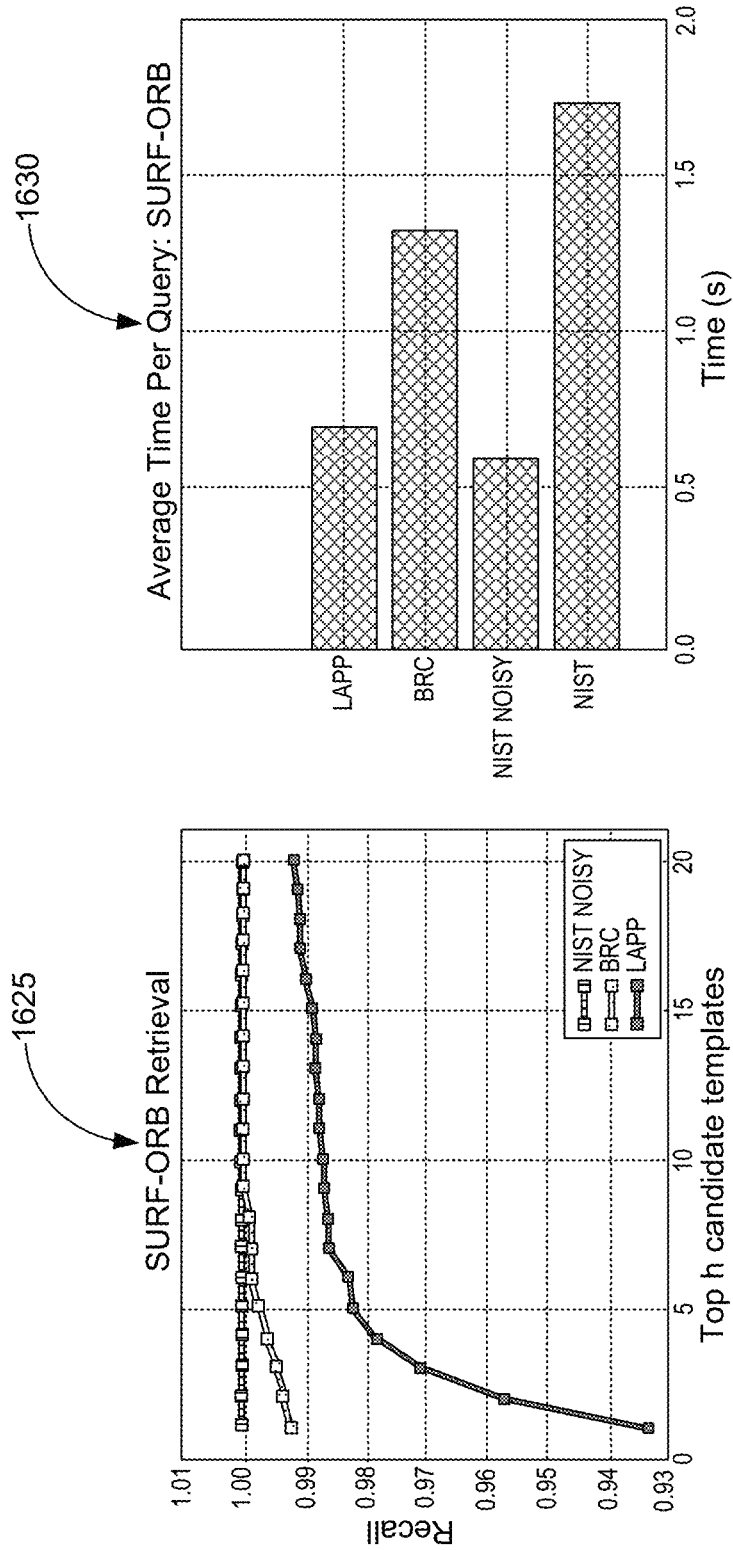

The performance of the ensembles is shown in FIGS. 16A-C, with SIFT-ORB retrieval plot 1605, SIFT-ORB average time per query histogram 1610, SIFT-SURF retrieval plot 1615, SIFT-SURF average time per query histogram 1620, SURF-ORB retrieval plot 1625, and SURF-ORB average time per query histogram 1630. On the two most challenging datasets, LAPP and BRC, SIFT-ORB achieves better recall than that of any of the single base predictors. This demonstrates an improvement in robustness. However, when we compare the SURF-related ensembles to SIFT-ORB, we observe a slight decrease in retrieval performance on the LAPP dataset. This can be explained due to, in addition to the majority descriptor misclassification problem we discussed in subsection 1.3.2, SURF also introducing a weighted voting problem in the ensemble classification framework. Below, we elaborate on this further.

In contrast to the SIFT and ORB feature detector algorithms, in which we can explicitly specify and reliably extract a fixed number of keypoints from an image, in SURF the number of keypoints detected can be non-deterministic for different images. Despite a fixed Hessian threshold value, the number of detected keypoints can fluctuate from image to image. As result, the number of SURF descriptor vectors for an image can be several times higher or lower than the fixed number of SIFT and ORB feature vectors. This, in turn, can cause SURF to have an adverse influence on ensemble classification in cases where the base SURF estimator is misclassifying majority descriptors. One additional concern with SURF is performance time. In all experiments, the average time per query for SURF significantly exceeds that of the other classifiers (see 1610, 1620, and 1630). Moving forward, we determined to retreat from using SURF as a base classifier for some embodiments, though it can continue to play a part in the construction of the multi-descriptor BoVW model in those embodiments.

Below, we experiment with an embodiment in which SIFT and ORB are considered for ensemble classification, but we harness the effect of classifier agreement and use the WORD classifier to shorten and extend the list of candidate templates.

Classifier Agreement.

In the previous experiment, we merged the feature classification of individual predictors into one ensemble. For example, in the case of SIFT-ORB, we used the classification response of 200 features from both descriptor classifiers (100 vectors per classifier) to generate an ordered list of candidate templates. Fusing feature classifiers increased the recall to levels higher than what each base predictor achieved alone. We return our attention to the individual classifiers that have been combined. Our objective is to establish a connection between classifier agreement and the improvement in recall caused by the classifier ensemble. We intend to experimentally verify that the degree of visual similarity in the topmost candidate templates depends on the level of agreement between the original classifiers. Therefore, in the following experiment, we assert this agreement and define a set of rules for recommending the top h candidate templates for matching.

Figure 20:
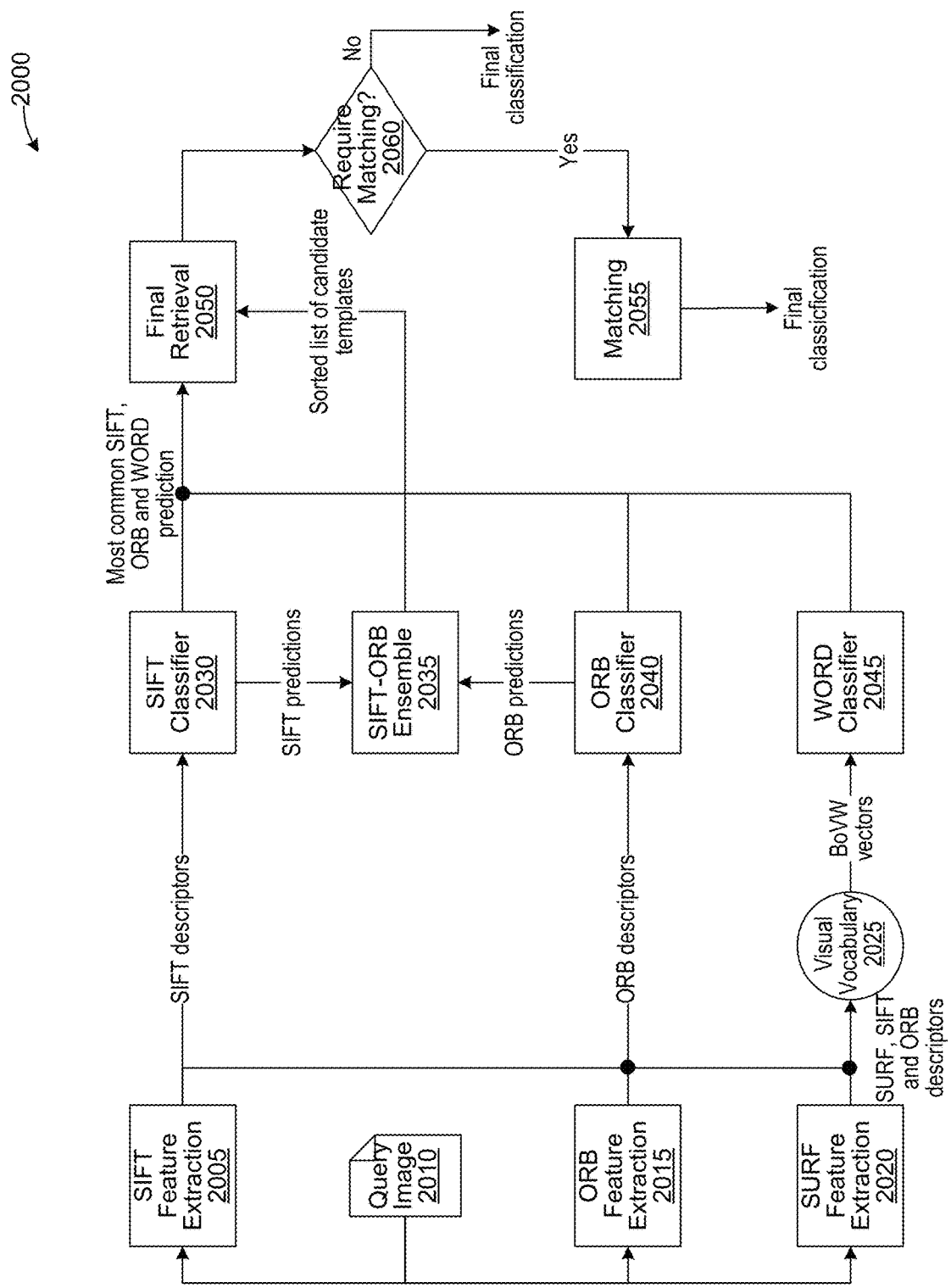
FIG. 20 is a flow diagram illustrating an example RLM classification process, consistent with various embodiments.

In an experimental setup, we consider a configuration in which we measure agreement amongst SIFT, ORB and WORD classifier. Prior to describing the algorithm, we first define the following singletons $$J_s = \{c_1 \in C_s\}$$

$$J_o = \{c_1 \in C_o\}$$

$$J_w = \{c_1 \in C_w\} \qquad (1.19)$$

where J is the unit set containing the most popular candidate predicted by each classifier, such as by SIFT classifier 2030, ORB classifier 2040, and WORD classifier 2045 of FIG. 20, which will be used in the description of this experimental setup. The subscript denotes classifier relationship. As in other experiments, we begin by generating the sequences of vectors, $X_s$, $X_o$, $X_w$, for the query image, such as via SIFT feature extraction 2005, ORB feature extraction 2015, and SURF feature extraction 2020. For each vector collection, we use their corresponding classifier to predict the set of class labels $Y_s$, $Y_o$, $Y_w$, such as SIFT classifier 2030, ORB classifier 2040, and WORD classifier 2045 At SIFT-ORB ensemble 2035 we merge the predictions of SIFT and ORB to obtain the sorted ensemble list of candidates, $C_{so}$. Within the respective group of predictions, we find the most common labels, $J_s$, $J_o$, $J_w$ and define the set $J_{sow} = J_s \cup J_o \cup J_w$. If $|J_{sow}|=1$, signifying total agreement among classifiers, at final retrieval 2050 we return $J_{sow}$. If at final retrieval 2050 there exists at least one agreement between classifiers ($|J_{sow}|=2$), we merge the top H SIFT-ORB ensemble choices with $J_{sow}$, and final retrieval 2050 returns the resulting list of distinct candidates, where H is an arbitrary threshold value for extending the list of candidates. In the case of total disagreement, at final retrieval 2050 we return the top $\mathcal{T}(H)$ ensemble candidates along with $J_{sow}$, where $\mathcal{T}(H): H \to 3H$. From our previous description, we derive the following conditional retrieval function.

$$\mathcal{R} = \begin{cases} J_{sow}, & \text{if } |J_{sow}| = 1 \\ \{c_h \in C_{so} | 1 \le h \le H\} \cup J_{sow}, & \text{if } |J_{sow}| = 2 \\ \{c_h \in C | 1 \le h \le \mathcal{T}(H)\} \cup J_{sow}, & \text{otherwise} \end{cases} \quad (1.20)$$

A summary of the algorithm is provided at 1700 of FIG. 17. The summary covers the prediction phase and assumes that all the necessary models have already been trained. Before discussing our results, we clarify further the choice of the topmost candidates selection function $\mathcal{R}$. The intuition behind classifier agreement stems from the notion that the accord gives us insight into the similarity levels of the topmost retrieved candidates. Therefore, when all the classifiers agree ($|J_{sow}|=1$), require matching? 2060 evaluates to "no" and we can bypass matching and use the unanimous prediction as the final classification. In the case of one or more disagreements amongst the classifiers, require matching? 2060 evaluates to "yes" and matching 2055 can be used. Additionally, $\mathcal{R}$ ensures that the list of templates recommended for matching never exceeds 3H+3. This means even when the number of templates increases, the maximum number of possible candidates per query remains unchanged. In the experiments discussed below, H=2.

In this experimental setup, we consider all the forms in each dataset. Here, our experimental goals are twofold: we want to measure the effect of classifier agreement on retrieval accuracy and measure the number of templates recommended for matching. For each query, we measure the number of candidates retrieved per Equation 1.20 and check if the retrieval was successful or not. Table 1.3 shows the performance of retrieval based on the classifier agreement protocol. Our results confirm our previous hypothesis that classifier agreement provides a reliable signal for restricting the list of candidate templates. In the NIST dataset, as in all other experiments, the execution was flawless. No templates were recommended for matching. However, in NIST NOISY, the average number of candidates per query rises to 2.0. This change is indicative of classifier disagreement between the region classifier (WORD) and the two feature classifiers. As was seen in previous experiments, BoVW is highly susceptible to noise and performs poorly on the noisy NIST dataset. However, we still achieve 100% recall by returning at most an average of 2 candidates per query due to SIFT and ORB agreement. In the BRC dataset, though agreement and accuracy are high, we failed to retrieve the right template for 24 instances. Many of these faulty retrievals were caused by poor image quality. At 505 and 510 of FIG. 5, we showed two examples of severely cropped instances. This type of deficiency provides a poor basis for formulating an adequate image query. Another cause of bad retrievals, even in the presence of full classifier agreement, is the situation where the relevant template is nearly identical to another template, so a problem of class substitution takes place. Finally, in the LAPP dataset, we also maintain a low number of candidates per query. Instances of the note sheet template shown in FIG. 6 caused many of the faulty candidates to occur. Discerning instances of this template is very difficult due to its possible levels of variability and lack of structure. Handwritten information substantially alters the form's visual appearance.

TABLE 1.3

Template retrieval performance for SIFT-ORB ensemble with BOW classifier agreement.

| Dataset | Total recomm. for matching | Average Candidates/ query | Faulty Retrieval | Recall |
|---|---|---|---|---|
| NIST | 0 | 1.0 | 0 | 1.00 |
| NIST NOISY | 7,602 | 2.0 | 0 | 1.00 |
| BRC | 2325 | 1.3 | 24 | 0.99 |
| LAPP | 16062 | 2.4 | 162 | 0.98 |

1.4 RLM Implementation

Figure 18:
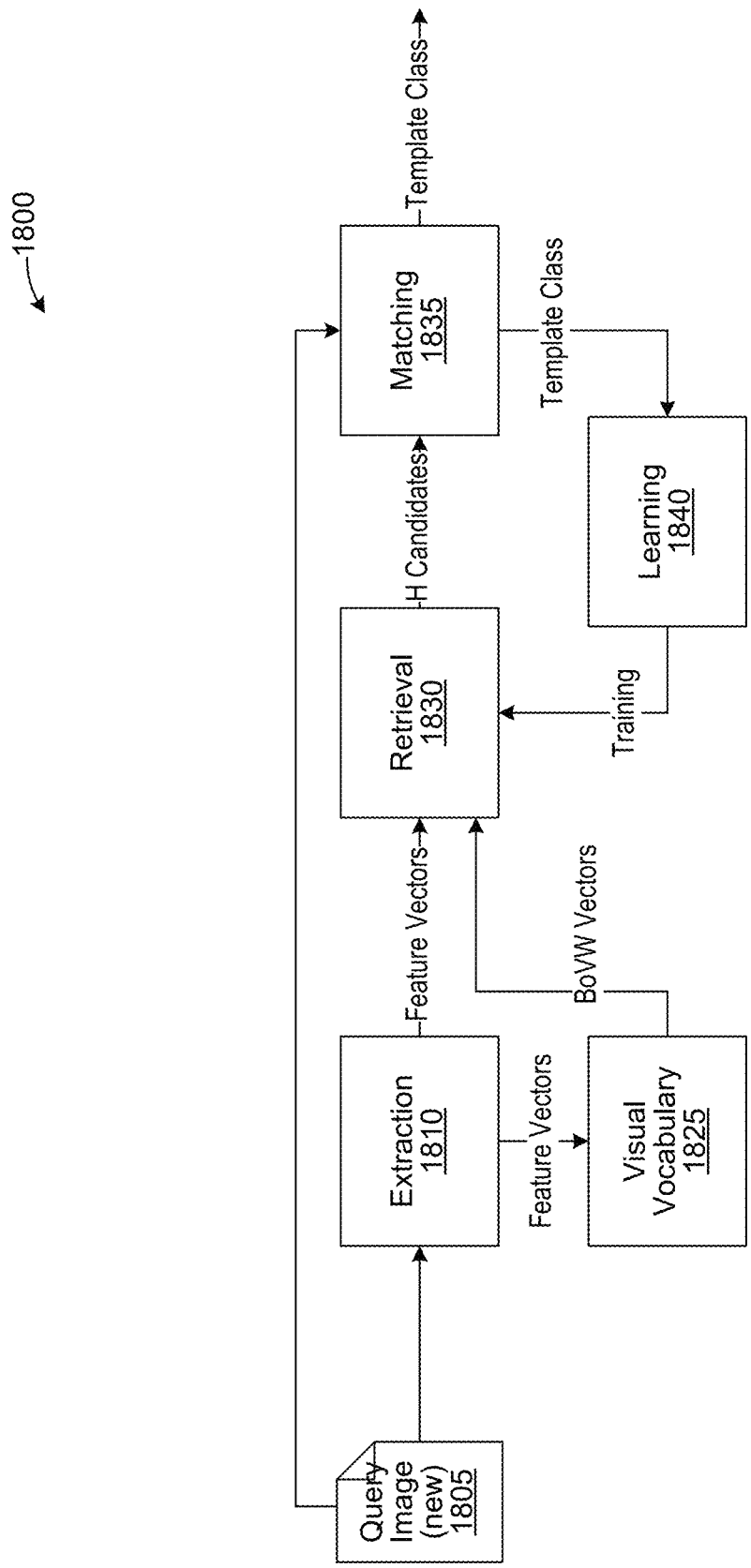
FIG. 18 is a flow diagram illustrating an example process for RLM template class detection, consistent with various embodiments.

FIG. 18 is a flow diagram illustrating an example process for RLM template class detection, consistent with various embodiments. By fusing together the individual components discussed in this application, we can implement an embodiment of an RLM algorithm for form type classification. Some embodiments our implementation can include all the components shown in FIG. 18, while other embodiments may not include some components, such as retrieval 1830. The classification process of this embodiment comprises three main stages: extraction 1810, retrieval 1830, and matching 1835. In the first stage, query image 1805 undergoes feature extraction via extraction 1810. This process generates the feature and BoVW vectors for subsequent classification. Visual vocabulary 1825 is trained beforehand using the process we have showing in section 1.2. In retrieval 1830, vectors are classified and a list of candidate templates, such as from a library or database of templates, is generated for matching 1835. Matching 1835 registers all candidate templates against the query instance and selects the candidate that achieves the best alignment score.

All tests of the full classification framework were conducted on Amazon EC2. Similarly to the first experiment, we employed the same cluster of 8 GPU powered computing instances for parallel processing.

Figure 19:
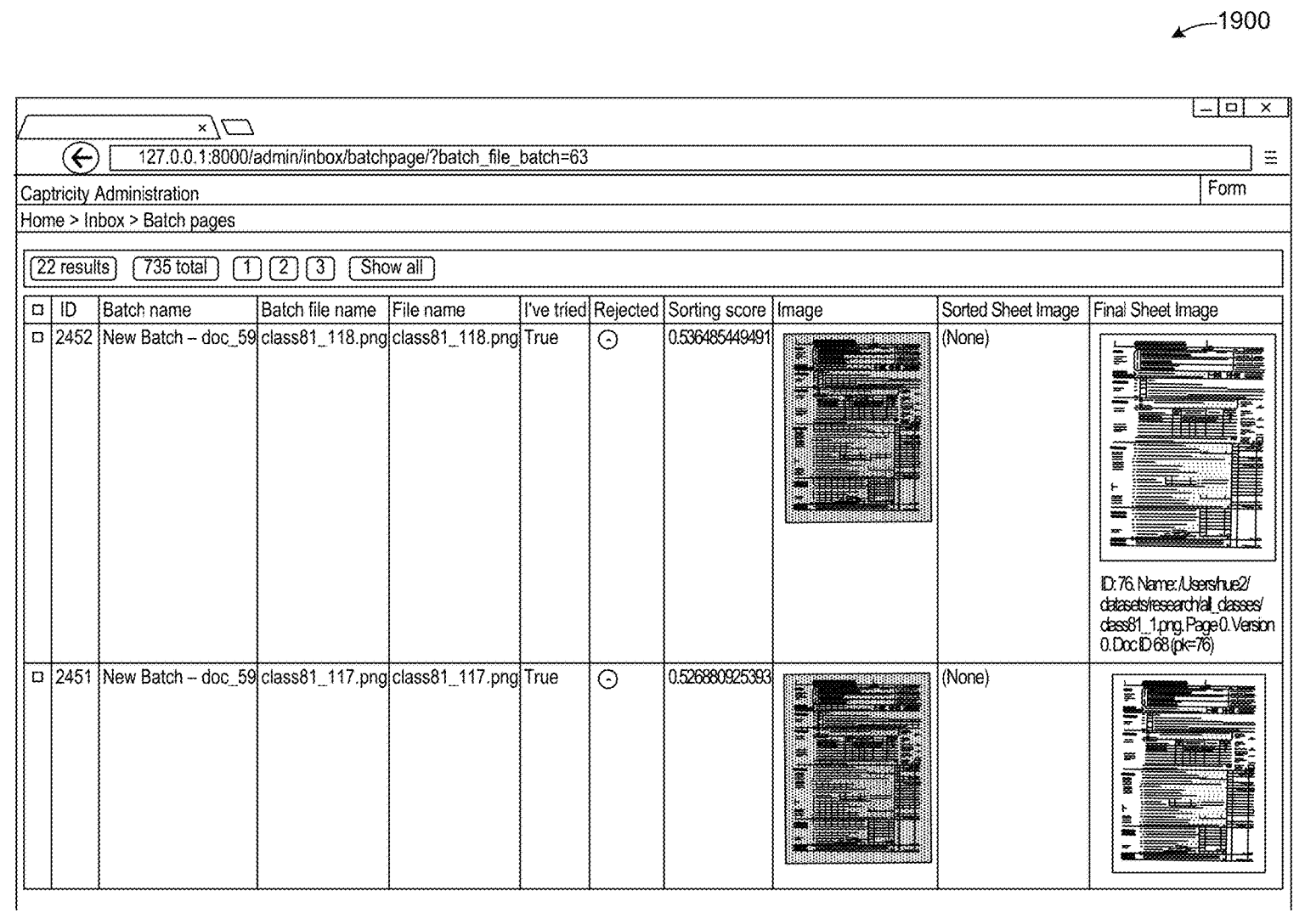

RLM system 1800 was implemented and tested with the Shreddr digitization pipeline as part of a pilot study. Screenshot 1900 of FIG. 19 illustrates a screenshot of the Shreddr document classification dashboard using RLM.

1.5 Performance Evaluation

In evaluating an embodiment of an RLM algorithm, the metrics, which we concentrate on this section, are precision and recall. The thematic emphasis in evaluating the components of RLM has been correctness. For each module, we provided a detailed inspection of their performance and limitations in terms of their ability to find the right template. Since an embodiment of an RLM algorithm is a sum of its parts, the overall performance of the system may suffer from some of the same limitations previously discussed.

In Table 1.4, we show the final classification performance of the system evaluated by precision, recall and F1-measure. The results represent four experiments in which each dataset was classified in its entirety without sampling. Each row shows an average of the performance weighted by its corresponding support value, which is the number of form instances in the dataset. Considering the overall performance assessed by F1 measure, the achieved results are consistent with what we have observed in smaller experiments. In both NIST and NIST NOISY, precision and recall maintain a score of 1.0. However, this value changes for the case of BRC and LAPP where we record an F1 of 0.99 and 0.98 respectively. In both cases, we achieved higher precision than recall.

TABLE 1.4

RLM template classification results

| Dataset | Support | Precision | Recall | F1-measure |
|---|---|---|---|---|
| NIST | 5590 | 1.00 | 1.00 | 1.00 |
| NIST NOISY | 5590 | 1.00 | 1.00 | 1.00 |
| BRC | 5300 | 0.99 | 0.99 | 0.99 |
| LAPP | 7957 | 0.99 | 0.98 | 0.98 |

For the purpose of the analysis, let us consider the LAPP dataset. We could increase our recall value by returning 100% of the templates. This would, in turn, generate 7957× 78=620,646 alignments. However, we saw in Table 1.3 that only 16,062 templates were recommended for matching, thereby making our approach 38 times faster and cheaper than the exhaustive search case. From a processing and business standpoint, this makes the LAPP recall score of 0.98 appear passable. However, in the realm of information digitization, higher recall may be preferable to higher precision. Finding the right template may cost a few additional alignments, but withholding it affects the system's ability to digitize information. In some applications, poor recall is linked to three problems: class substitution in datasets with nearly identical templates, templates with large dynamic regions, and possible defects in the query image. These limitations were discussed in the retrieval section.

High precision, on the other hand, can keep alignments at a minimum. In the context of RLM, high precision can be indicative of the retrieval's effectiveness at recommending the relevant template as one of its top candidates. Similarly to recall, it can also suffer in the case where templates are extremely similar. Despite the best efforts of matching, near duplicate templates can score acceptable alignments and classify the wrong form.

Learning in RLM

Above, we presented a learning based method for classifying form images according to their document templates. To recall, some embodiments of an RLM algorithm, such as RLM algorithm 2000 of FIG. 20, start by extracting multiple kinds of image descriptors from a query image, such as extracting image descriptors from query image 2010 via SIFT feature extraction 2005, SURF feature extraction 2020, and ORB feature extraction 2015. SIFT descriptors extracted at SIFT feature extraction 2005 and ORB descriptors extracted at ORB feature extraction 2015 can be directly classified using two corresponding nearest neighbor classifiers, such as using SIFT classifier 2030 and ORB classifier 2040. SURF, SIFT, and ORB descriptors can be used as input to visual vocabulary 2025, and can be transformed into a bag of visual words prior to being classified by a third nearest neighbor classifier, such as by WORD classifier 2045.

A task of each classifier (e.g., SIFT classifier 2030, ORB classifier 2040, and WORD classifier 2045) is to assign a template class label to each element in their corresponding set of feature vectors. This can include identifying a candidate template form of a library or database of template forms of which query image 2010 may be an instance. The library/database of template forms can have previously had SIFT, ORB, and SURF features extracted in preparation for future image queries. Final retrieval 2050 can use the most common label resulting from each classification to decide the number of candidate templates to recommend for matching. At 2060, if the multiple classifiers are in agreement, then no matching is required (e.g., require matching? 2060 evaluates to "no") and we can bypass matching and use their unanimous decision as the final classification. If agreement cannot be reached (e.g., require matching? 2060 evaluates to "yes"), then matching 2055 is required and final retrieval 2050 can retrieve a subset of the top predicted labels from SIFT-ORB ensemble 2035, and combine them with the top prediction of SIFT classifier 2030, ORB classifier 2040, and WORD classifier 2045 to form a final list of candidate templates. Matching 2055 then identifies the template class from the final list of candidate templates that achieves the best alignment score for the query form instance.

In some embodiments, such as RLM system 1800, we apply learning algorithms to an RLM algorithm, as occurs for RLM system 1800 via learning 1840. Examples of learning algorithms include kMeans and kNN, kMeans can generate a clustering of all the feature descriptors detected in a collection of templates as a means to define a visual vocabulary for representing image content. kNN can classify each descriptor based on the template category in which it was detected. Also, kNN can make subsequent use of BoVW vectors resulting from kMeans models to define a classifier for predicting partitions of form images.

In some embodiments, kMeans and kNN work harmoniously to achieve an improved accuracy retrieval for query instances, and they contain various knobs that can be tuned in order to improve their performance. In some embodiments, we use 128 clusters for kMeans (k=128) and a single neighbor for kNN (k=1). We will describe the process of model selection to explain the effectiveness of these choices. For each algorithm, we investigate different values of k and analyze their impact on training and prediction. We also examine feature extraction and locate the limits where the number of keypoints impairs performance time. Additionally, we explore the use of other classification algorithms and compare their results to those achieved by kNN. This analysis can be a useful tool for quickly avoiding unfavorable design choices during implementation of an embodiment of an RLM algorithm.

Thus far, we have not considered using the matcher's answer to improve the prediction of the individual classifiers comprising the retrieval component of RLM. We analyze the proper/optimal heuristics for training the classifier models without failing to address the system requirements previously outlined. A single image could generate thousands of local features, and in the case of datasets with numerous form types, the number of features could grow exponentially. Therefore, a classifier that can achieve high precision and recall on a relatively small number of examples per template is preferable. Moreover, training and prediction time should also be small to accommodate practical use cases and scalability. Lastly, learning should not degrade retrieval results in skewed training sets. These are training sets where one class contains significantly more examples than the other classes. In some embodiments, a "per use case" philosophy is adopted where separate models are trained to recognize only those forms that are relevant to a specific user.

We further disclose an embodiment of unsupervised method for classifying form images when template classes are unknown. Given one of our datasets, we can start by randomly selecting a small set of instances and clustering them according to their structural similarity. We can compute similarity based on levels of content and structure matching achieved by the trained trees of a random forest classifier. Using the implicit labeling obtained by clustering, we can train an embodiment of an RLM algorithm with a set of forms comprising an example from each cluster. To ensure training examples are from distinctive classes, the selected cluster examples can go through an intermediary duplicate elimination stage prior to being added to the RLM's training set. We can then classify the entire batch with the discovered labels and reject form instances with unknown templates according to a global alignment threshold. We can continue the process by repeating clustering on a subset of rejected instances in order to discover new labels. We can follow the same process of duplicate elimination to add the new examples to the training set and run another round of classification on the rejected batch. We can repeat the clustering plus classification procedure until all instances have been classified.

1.6 Model Selection

Some learning algorithms can be configured before training. These configurations parameters, also known as hyperparameters, can shape the behavior of the algorithm during training and prediction. This is the case for kMeans where the number clusters can be specified prior to clustering. Poor hyperparameter configuration can sometimes be a key differentiator between achieving state-of-the-art prediction performance and mediocre results. For this reason, some ML beginners and experts may spend a lot of time fine-tuning hyperparameters to discover algorithm specific settings favorable to their applications. Following this trend, we present a study of three key hyperparameters whose change in value can dramatically affect the performance accuracy and time of the RLM. The first parameter is the number of features extracted from images. This value can be important for finding a practical balance between accuracy and performance time. The second parameter is the number of visual words we choose for representing image content. This number governs the size of the feature vector used in the WORD classifier. Lastly, we examine how the neighborhood size in kNN affects prediction. Regarding classification, we also ask a larger question as we investigate the use of other algorithms for feature classification within an RLM framework. Below, we elaborate on these topics and discuss the experiments used to support them.

1.6.1 Feature Extraction

One strength in our approach for some embodiments is that we classify every feature detected in a query image. However, such a feature classification strategy can become a weakness when feature extraction produces very large sets of keypoints for individual images. This situation could have a negative impact on the training and prediction time of the classifiers and could cause high latency in template retrieval. To address this concern, we take a closer look at how training and prediction time change as we extract additional features from images. Recall that RLM can use multiple separate feature detectors to extract multiple different types of keypoints from images, such as SIFT, SURF and ORB. Each algorithm can follow its own set of rules for detecting keypoints. Though we can initially specify the desired number of SIFT and ORB keypoints to extract, there is no guarantee that the algorithms will actually return this exact number of keypoints for all images. Retrieving a consistent number of SURF keypoints is even harder since the amount of points detected depends on a threshold.

Figure 21:
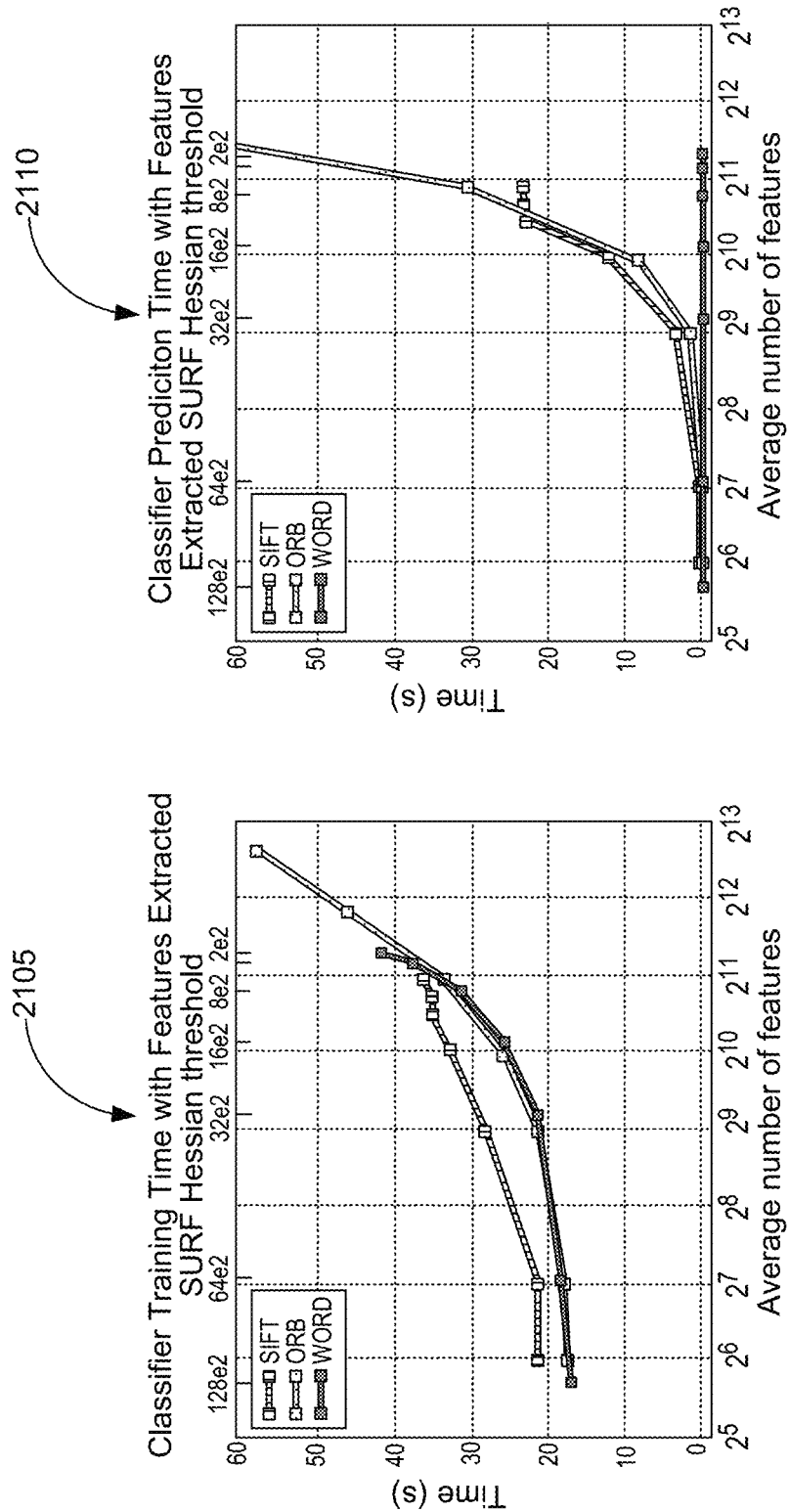
FIG. 21 is an illustration of two plots depicting classifier training and prediction times with features extracted, consistent with various embodiments.
Figure 22:
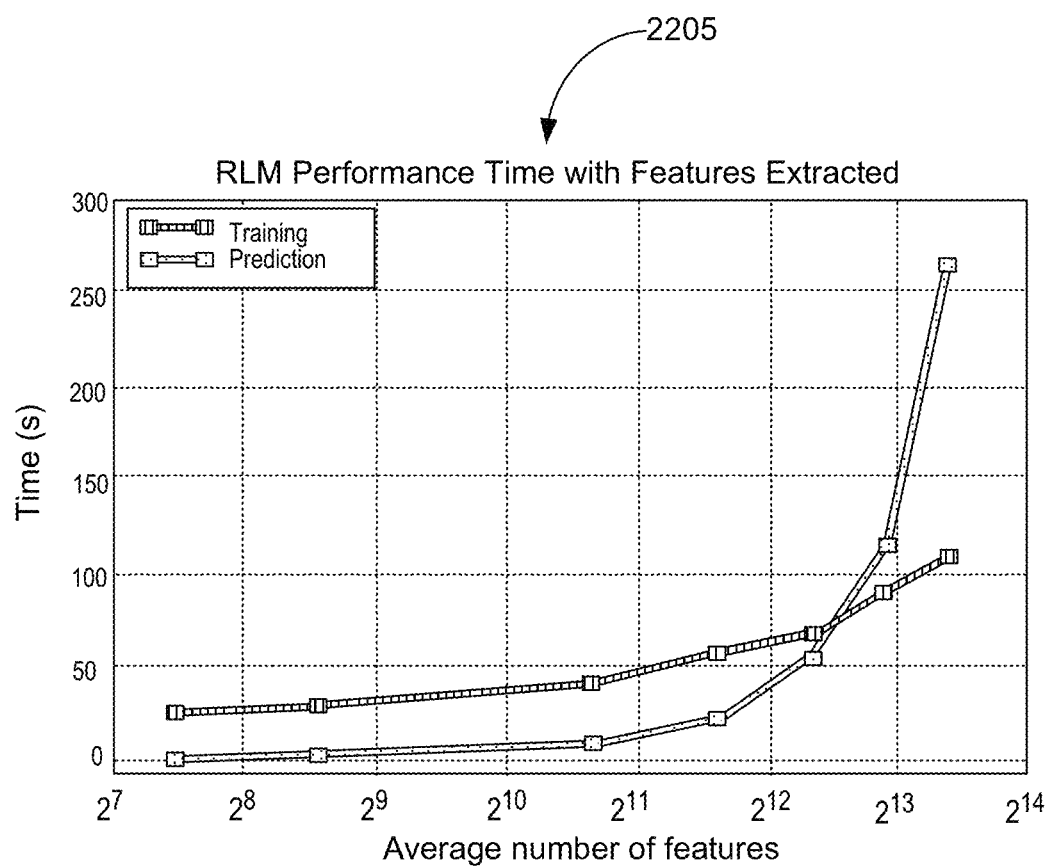
FIG. 22 is an illustration of a plot depicting RLM time performance with features extracted, consistent with various embodiments.

A desirable feature extraction approach should be time efficient. It should also generate a sufficient number of keypoints for capturing important details in images. Using an example of each of the 76 templates in our database, we train the SIFT and ORB feature classifiers independently and measure their time performance as we vary the number of features extracted per image. Since we do not classify SURF features directly, we use clustering and the WORD classifier to estimate the impact on performance time as we decrease the Hessian threshold for an increased number of SURF keypoints. FIG. 21 shows our results, with graph 2105 showing classifier training time and graph 2110 showing classifier prediction time. Although each graph contains three different curves, there are only two classification methods at play in this experiment. The SIFT and ORB curves depict the case of direct descriptor classification whereas the WORD curve illustrates the classification of SIFT, SURF, and ORB descriptors after vector quantization. A very noticeable fact can be seen in the graph on the right (graph 2110) where we can see a huge gap in prediction time performance between WORD and the descriptor classifiers at limits where the number of keypoints is high. This illustrates a primary reason why classifying the individual feature descriptors of an image could seem counterintuitive. Spending 20 seconds on a single classification may not be practical. However, if we focus our attention on the lower left side of the prediction curves, we can identify a range of values (up to 128, 256, or 512) where performance time is substantially identical or increases marginally. This identifies several ranges where we can operate feature extraction for an embodiment of an RLM algorithm. These ranges can also allow us to keep the number of keypoints across the detectors close enough so as not to introduce any significant bias from a particular type of descriptor. Graph 2205 of FIG. 22 shows the performance time of the classifiers working simultaneously. We can gain the added benefit of a larger keypoint set with very little impact on performance.

1.6.2 Selecting k in kMeans

Figure 23A:
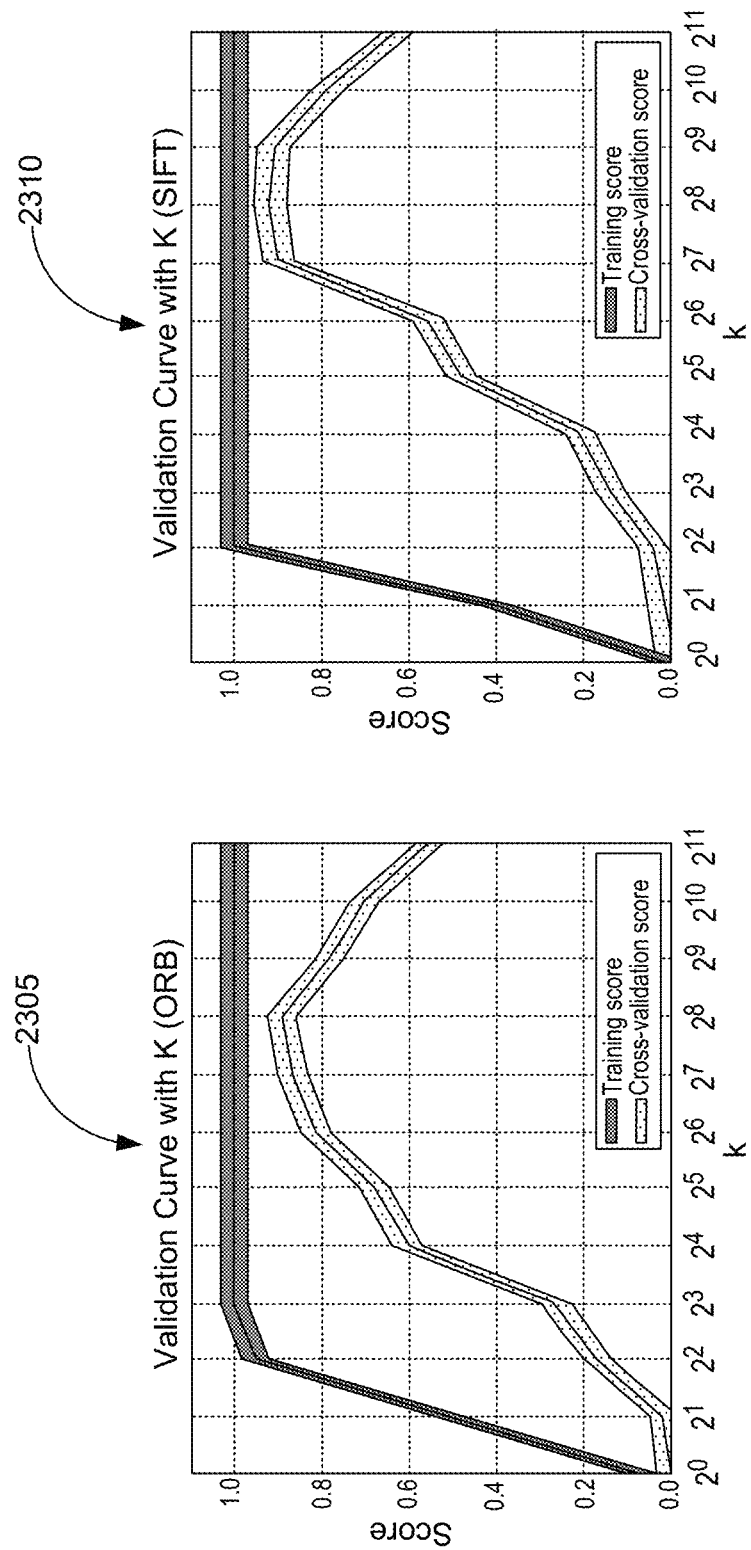
FIGS. 23A and B are illustrations of four plots depicting validation curves for k in kMeans, consistent with various embodiments.
Figure 23B:
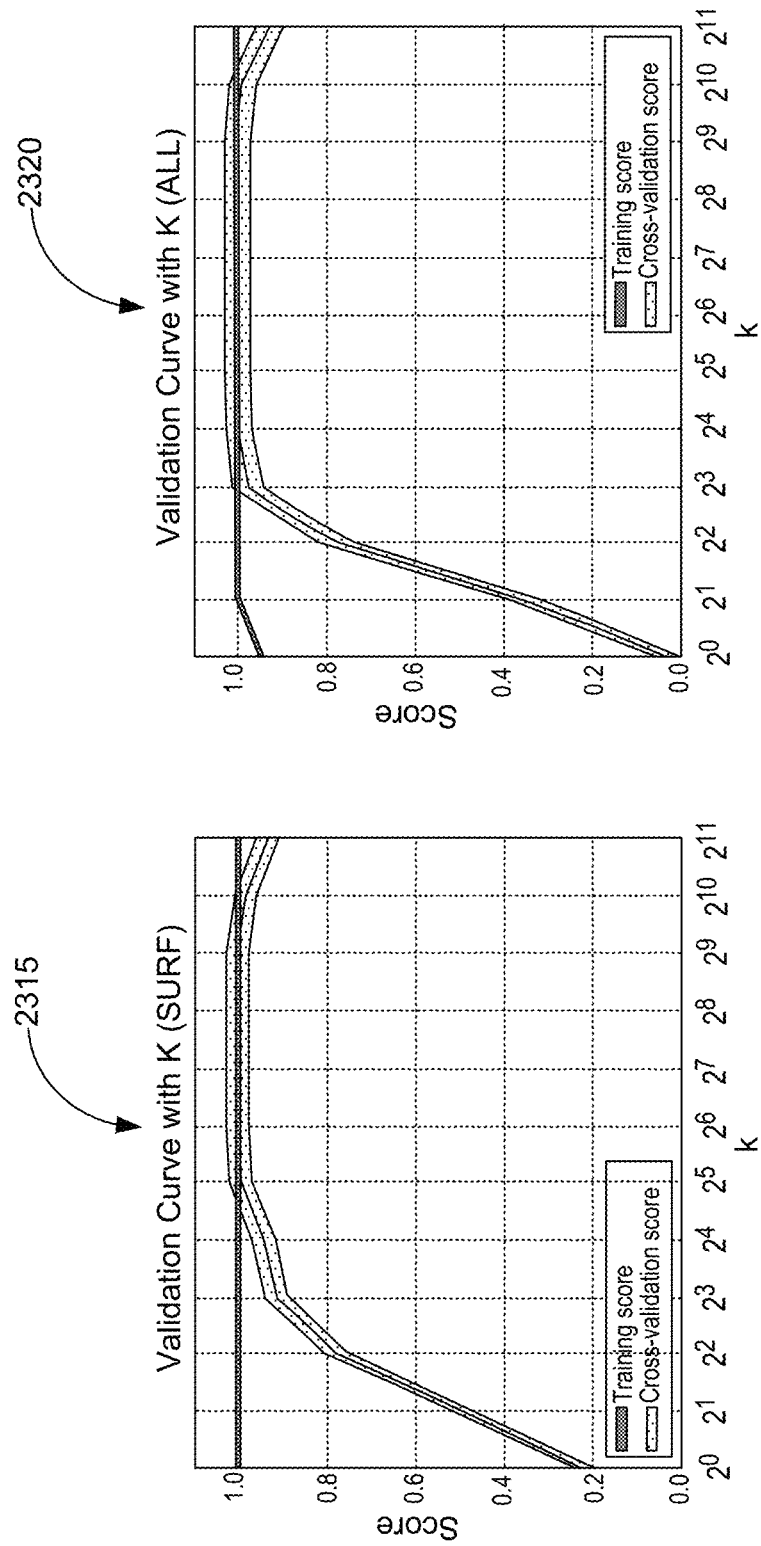

After feature extraction, such as SIFT feature extractor 2005, ORB feature extraction 2015, and SURF feature extraction 2020, each detector can return its own set of feature descriptors. As previously stated, in some embodiments a SIFT descriptor can be a 128-dimensional vector, and ORB and SURF vectors can have 32 and 64 dimensions respectively. Merging the three types of descriptors into a unified set of feature vectors for the WORD classifier can require three separate visual codebooks. In some embodiments, each codebook contains the same number of visual words so that the bags of visual words encoding the information of each descriptor group are of the same size. This means the respective kMeans clustering of SIFT, ORB and SURF keypoints can utilize the same number of k clusters. We find k through the process of model selection discussed above. For each descriptor type, we can look for k values that maximize the classification score of the WORD classifier. Graphs 2305-2320 of FIGS. 23A-B show the validation curves for each family of descriptors. From the experimental data graphed, we can see that good choices for k lie between 128 and 512.

1.6.3 kNN and Other Classification Algorithms

Figure 24:
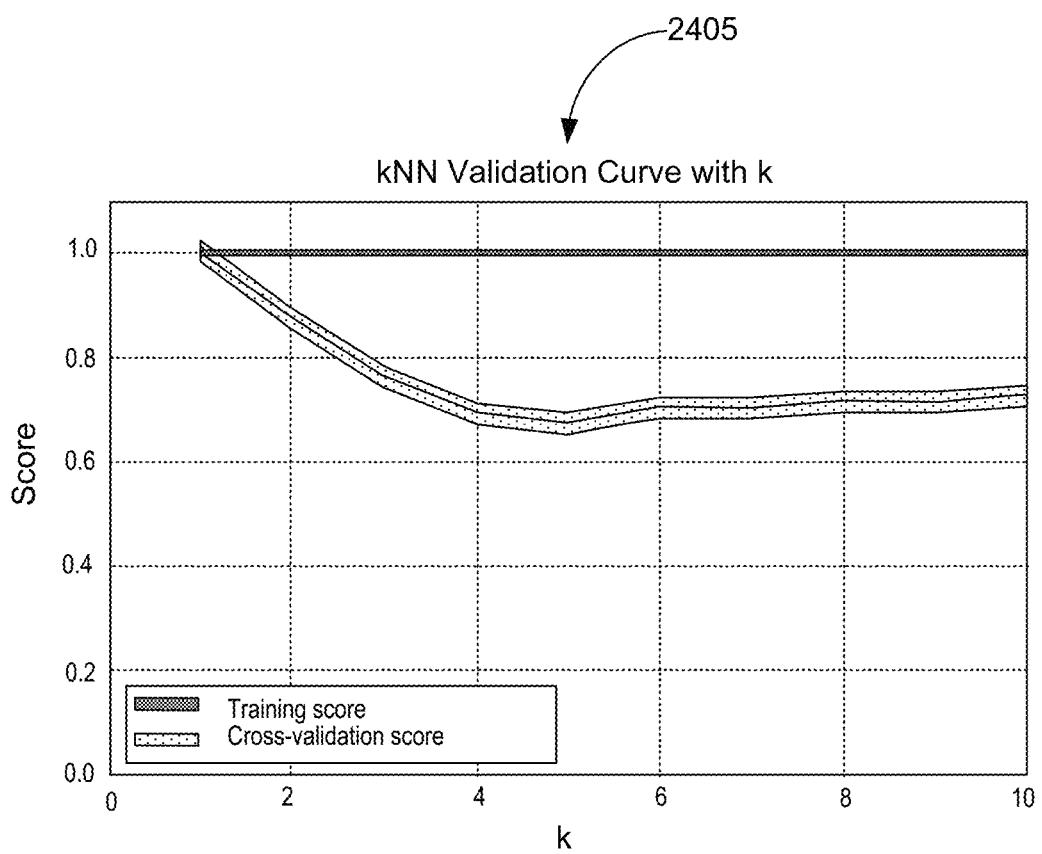
FIG. 24 is an illustration of a plot depicting a validation curve for k in kNN, consistent with various embodiments.

In some embodiments, setting k=1 in all three kNN classifiers yielded the best results. We show this in graph 2405 of FIG. 24 through the same process of model selection used for kMeans. As can be seen, accuracy degenerates as we increase the number of neighbors. It reaches its lowest score at k=5 and marginally changes beyond that point. We believe the reason why nearest neighbor outperformed configurations of kNN with more than a single neighbor is because of the near-duplicate nature of form instances. In other words, because form images of the same class vary with content, using a single neighbor restrains the change in content from having too much influence on the classification of features.

Figure 25:
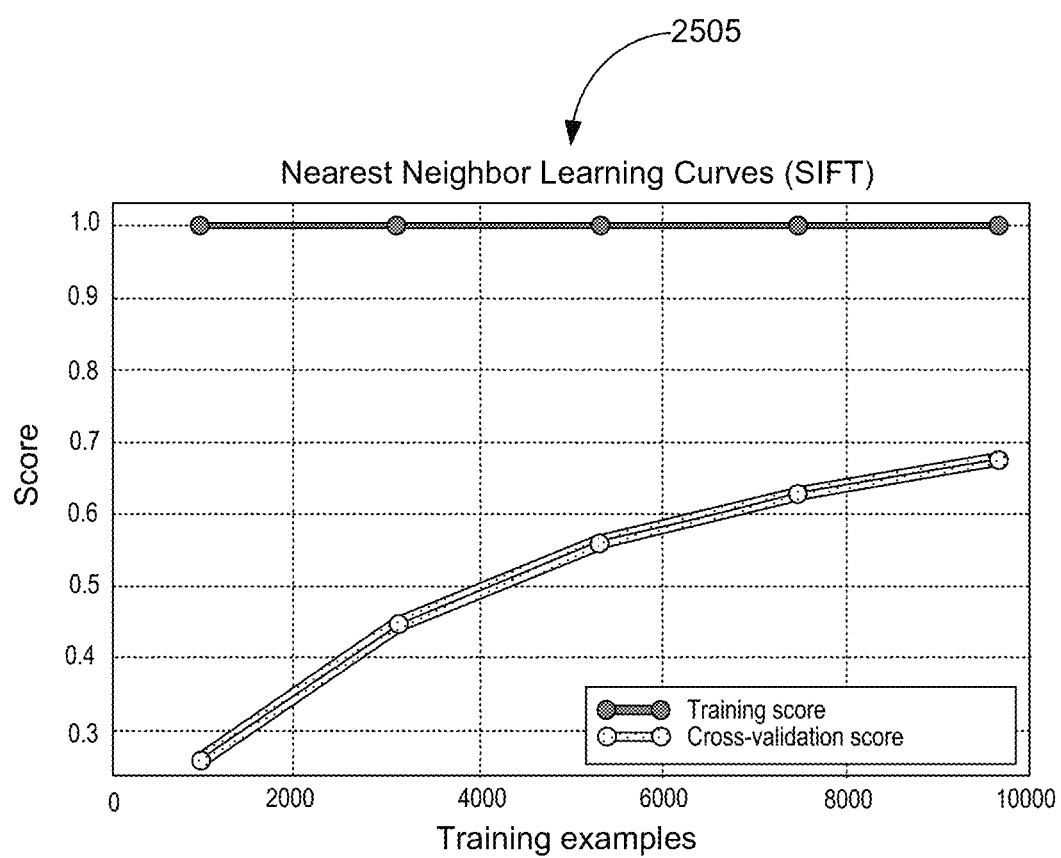
FIG. 25 is an illustration of a plot depicting learning curves for nearest neighbor classifier for SIFT descriptors, consistent with various embodiments.

We note that there is a danger of over-interpreting the classification configurations that we have chosen in our setup. To sanity check the nearest neighbor model and get stronger evidence of its ability to learn image descriptors, we plot its learning curves, as shown in graph 2505 of FIG. 25. We select six images for each template category in the NIST dataset. With 120 images at our disposal for this experiment, we extract 100 SIFT keypoints from each image to form a descriptor dataset comprising 12,000 vectors. We split the dataset into a training set and a validation set. 80% of the data is chosen at random for training and the remaining 20% is reserved for testing as part of the validation set. We repeat the cross validation 100 times to get smoother mean test and train score curves. From the graph, we can observe that as the training set size grows, the accuracy increases. In the case of SIFT descriptors, we reach an accuracy score of 68%, and the figure suggests that the curve might continue to grow with more training examples. It is worth repeating that, in some embodiments, for retrieval by feature classification to work, we primarily care that a majority of the descriptors is correctly classified as we employ majority voting to derive a list of similar templates with the remaining descriptors. A classifier scoring accuracy value well beyond the average point strongly suggests that a descriptor majority depicting the class label can be found at prediction time.

Figure 26:
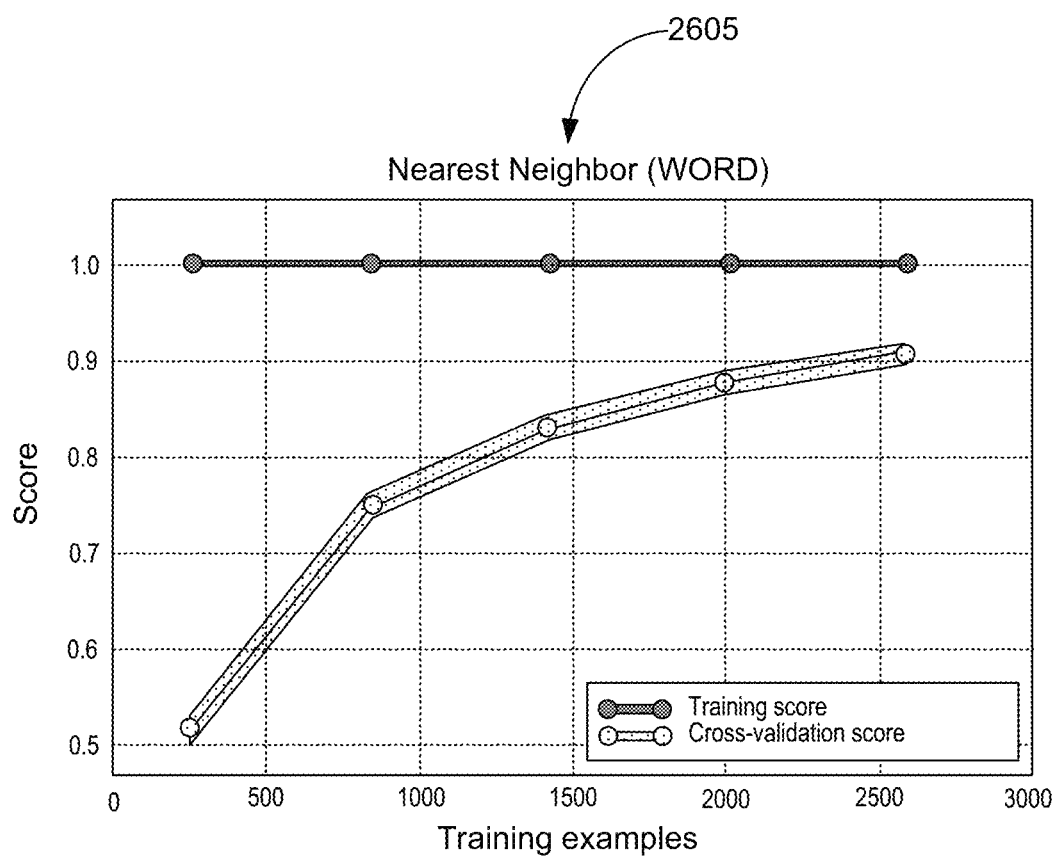
FIG. 26 is an illustration of a plot depicting learning curves for nearest neighbor classifier for BoVW, consistent with various embodiments.

In contrast to image descriptors, which can lack meaningful ordering and may only convey the visual information of a single keypoint, bag of visual words (BoVW) can provide a more holistic description of form images. BoVW can compound the descriptor information of all keypoints into a single representation that reveals local and global patterns characteristic to the entire image. For this reason, bag of visual words can perform better as feature vectors for image classification. We demonstrate this in graph 2605 of FIG. 26 where we show the learning curve of the nearest neighbor algorithm after quantizing SIFT, SURF and ORB descriptors. In this experiment, for each image in our previous set of 120 NIST forms, we use the 3 keypoint detectors for feature extraction and project each descriptor group to its corresponding visual vocabulary to obtain the 27 bags of visual words representing 9 image partitions. This creates an overall dataset of 2,592 vectors, and using the same 80/20 split, we randomly generate the training and validation sets. We can see in the graph that BoVW vectors achieve much higher levels of accuracy than image descriptors despite using a smaller training set.

Figure 27A:
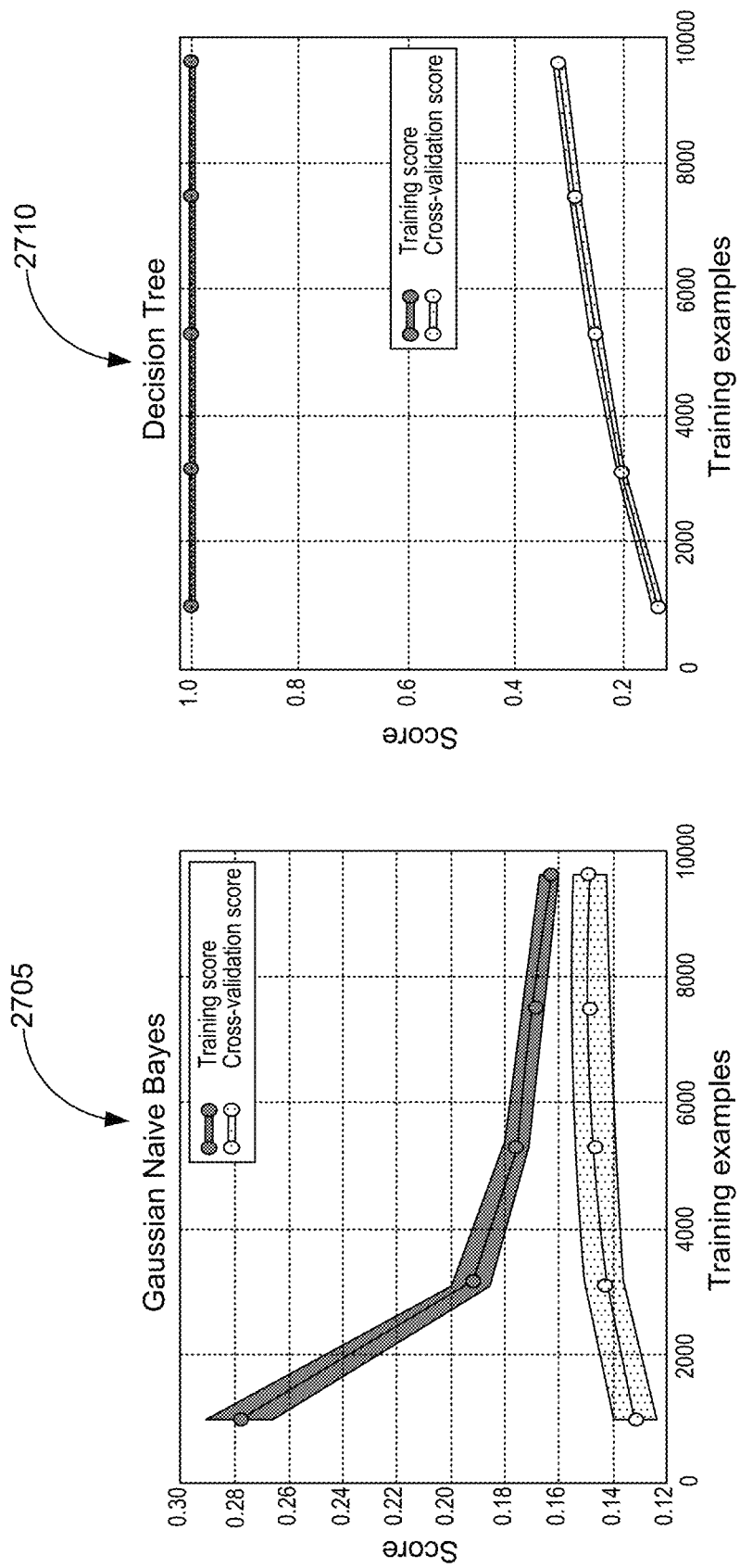
FIGS. 27A and B are illustrations of four plots depicting learning curves for Gaussian Naïve Bayes, decision tree, Support Vector Machines (SVM) with Radial Basis Function (RBF) kernel, and a random forest of 100 trees for descriptor classification, consistent with various embodiments.
Figure 27B:
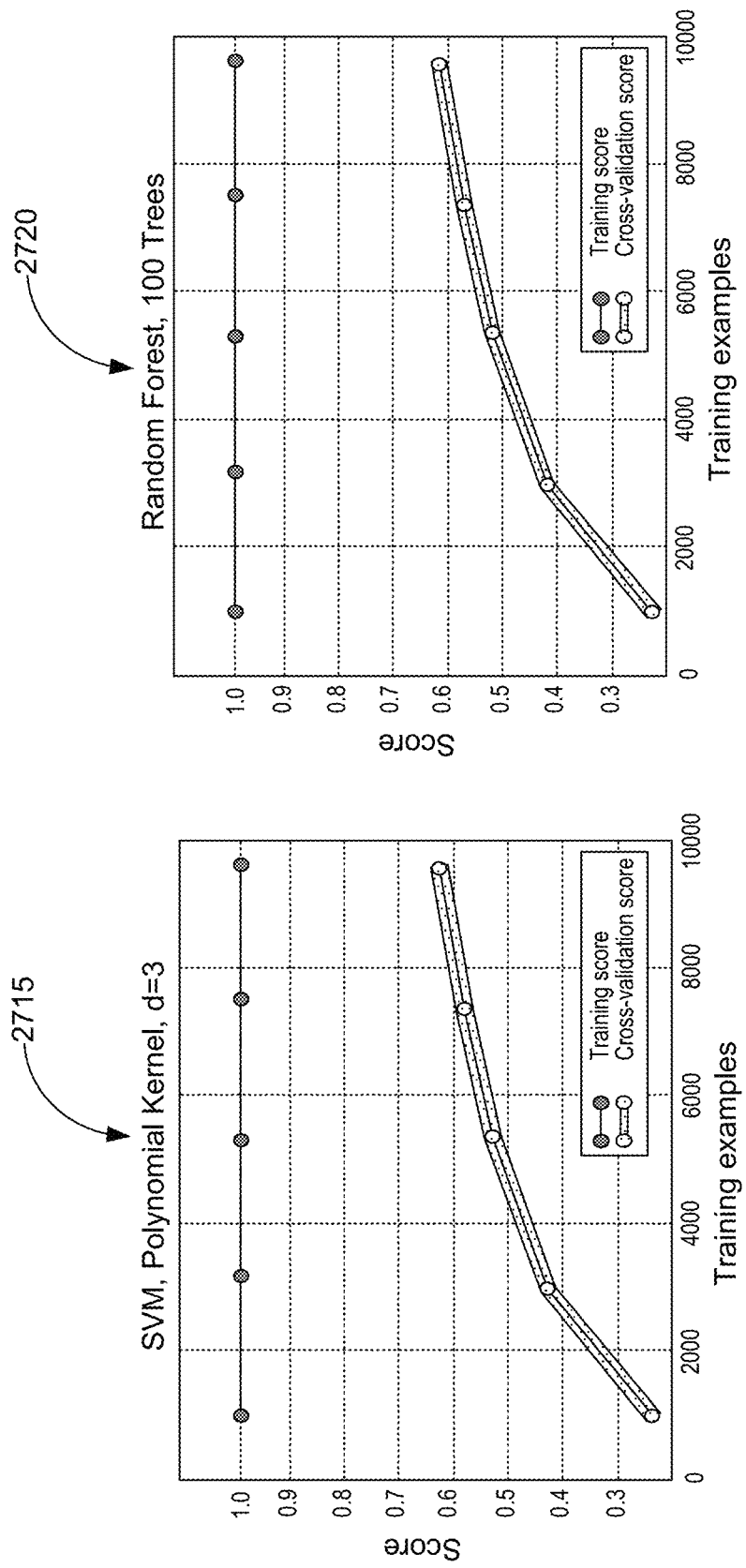

Our analysis next considers the performance of other classification techniques in an RLM framework. We begin by examining the case of feature classification. Using the same descriptor dataset from our previous experiment, we plot the learning curves of four different classification algorithms: Gaussian Naïve Bayes, decision tree, SVM and random forest. We can see in the graphs 2705 and 2710 of FIG. 27A that Gaussian Naïve Bayes and decision tree perform poorly for feature classification. They are very fast to train, but even with ample training, in this experiment they do not reach high enough accuracy for us to correctly infer visual similarity. Though SVM, in graph 2715 of FIG. 27B, shows an accuracy measure beyond 60%, we note that it took an extremely long time to train and therefore has been discounted for some applications. Moreover, SVMs come with the added complexity of numerous hyperparameters. Finding the right blend of values for generalizing multiple datasets can be challenging. Lastly, in graph 2720, we use a random forest of 100 trees to classify the descriptor vectors. A random forest is an ensemble learning technique that makes use of multiple weak decision tree estimators for achieving stronger predictive power. The random forest classifier shows accuracy and time performance comparable to those observed for nearest neighbor, however it requires a much larger memory footprint to store its model.

Figure 28A:
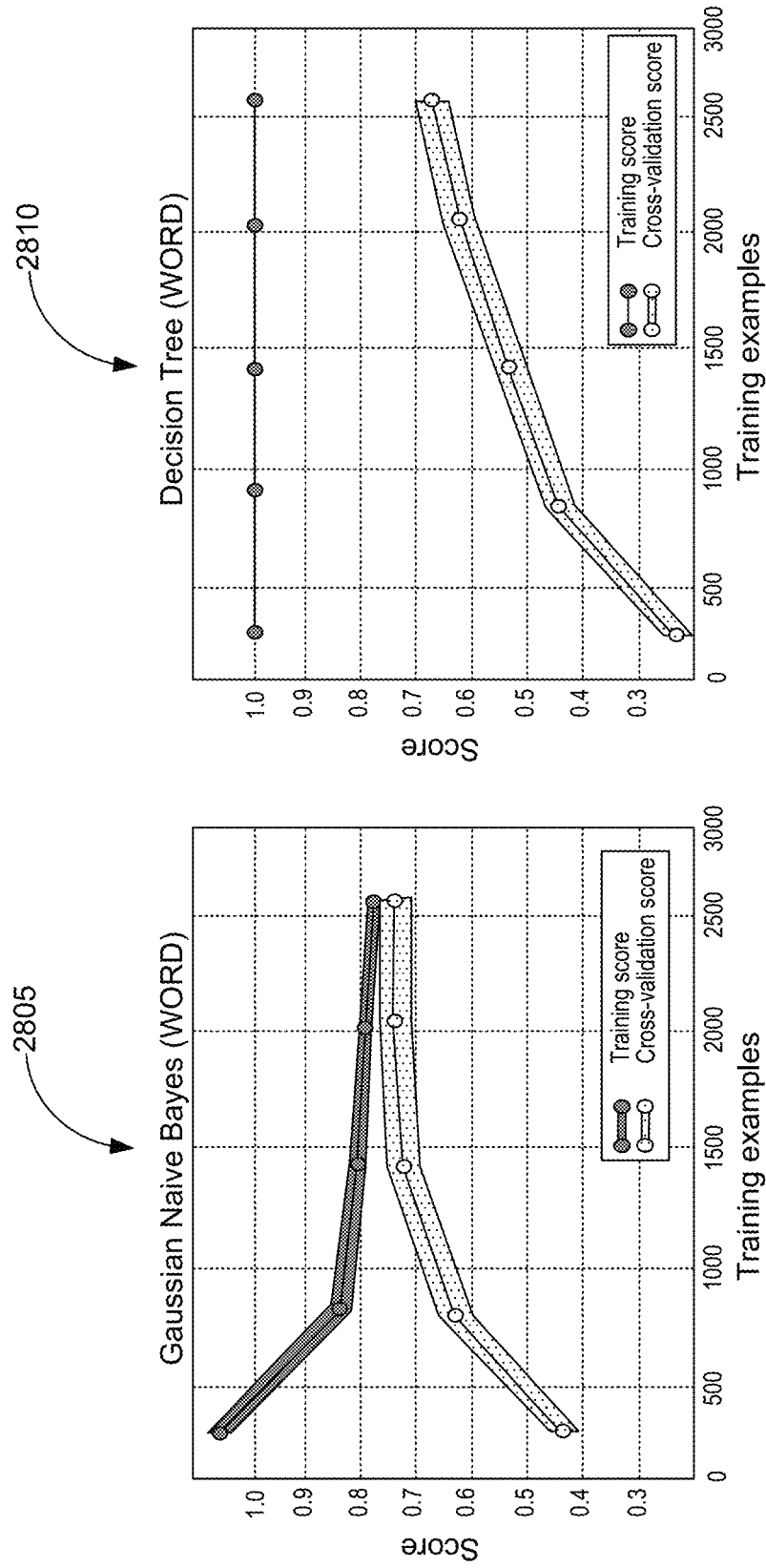
FIGS. 28A and B are illustrations of four plots depicting learning curves for Gaussian Naïve Bayes, decision tree, SVM with RBF kernel, and a random forest of 100 trees for BoVW classification, consistent with various embodiments.
Figure 28B:
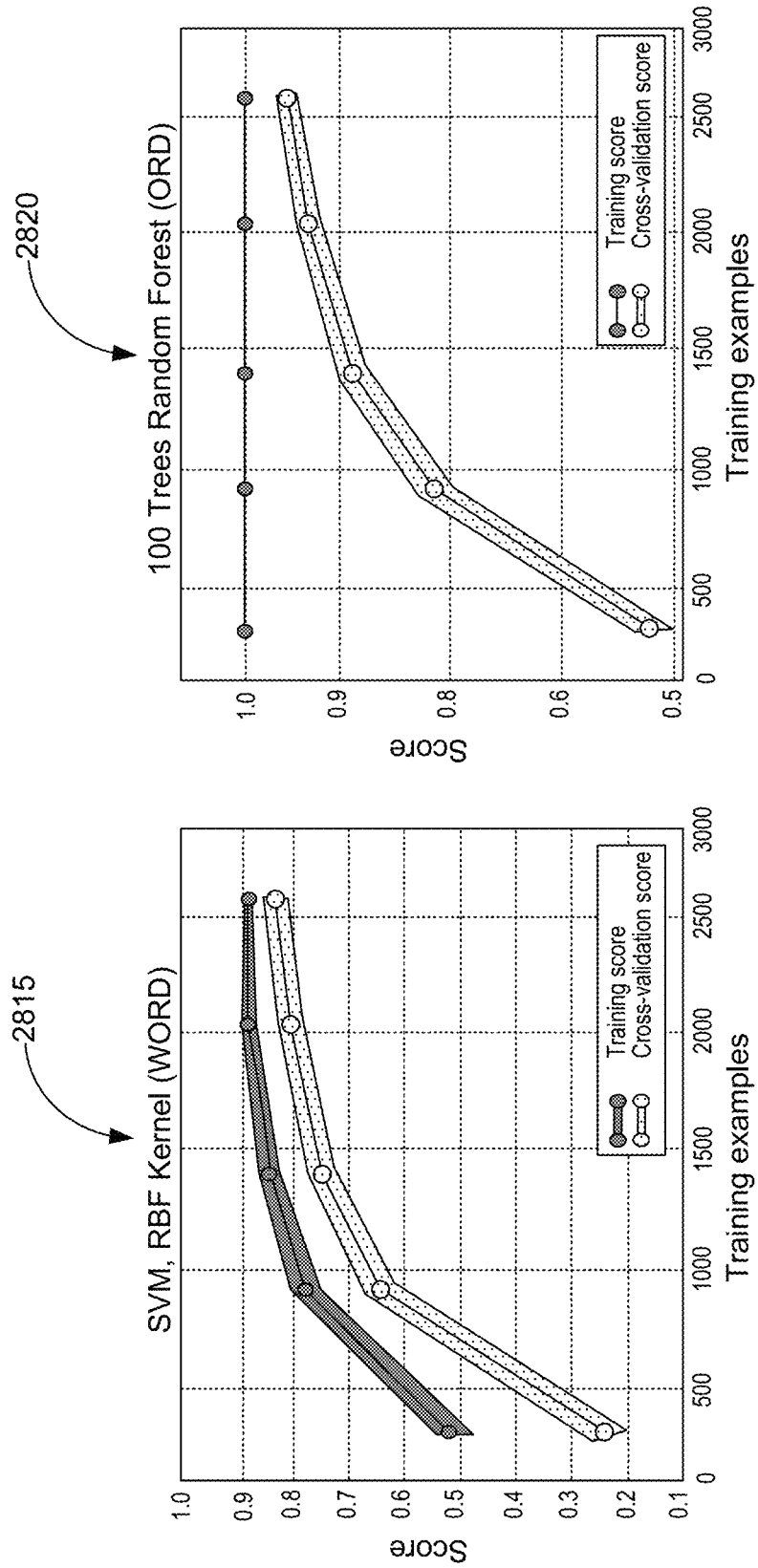

Graphs 2805-2820 of FIGS. 28A-B show the learning curves of each algorithm for bag of visual words classification. Among all the different classification methods, random forest (graph 2820) is the top performer reaching an accuracy score of 96%. This suggests that using a random forest for the WORD classifier can potentially increase classifier agreement and further improve the overall performance of the RLM.

1.7 Training with Matching

The classifier models thus far have been initialized with a preliminary set of user provided templates. We next explore updating the models using the final classification decided by matching, such as the classification decided by matching 210 of FIG. 2, matching 1835 of FIG. 18, or matching 2055 of FIG. 20. A high alignment score is a strong indicator of a correct classification, and in some embodiments, we only employ alignment to resolve disagreements between the two feature classifiers and the WORD classifier. This means that there exists a straightforward opportunity to train whichever classifier disagreed with the matcher's answer. Notice that learning, in this context, may not be aimed at improving the accuracy of RLM. The algorithm stands to benefit from improved time performance if classifiers can agree more often since full classifier agreement can translate into fewer alignments.

To demonstrate this idea, we can construct a variant of one the earlier retrieval experiments. In the initial setup, we used the NIST NOISY dataset to measure the retrieval performance of the RLM on a noisy dataset. We achieved a recall score of 1.0 but primarily because we employed matching most of the time to detect the right template after classifier conflict. As we have previously shown, the WORD classifier performs poorly on the noisy NIST forms and constitutes a weak link in properly identifying their templates. Our goal in this current experiment is to measure the prediction accuracy of the WORD classifier after training it with a subset of the matcher's answers between classification runs.

We select at random 1000 images from the NIST NOISY dataset and split them into 10 separate batches with each batch comprising 100 images. In the first part of the experiment, we use an embodiment of an RLM algorithm to classify each batch and then measure the average accuracy of the WORD classifier after classifying the full sub-batch. In the second part, we repeat the same batch classification tasks, but this time, we pick a random 20% of the instances originating from the matcher's final set of answers to train the WORD classifier between each run. We only consider form instances that the WORD classifier failed to detect from the previous run as training examples. Again, we measure the average accuracy of the WORD classifier after each run. For improved performance, we apply the insight revealed above and use a random forest of 100 trees for WORD classification.

Figure 29:
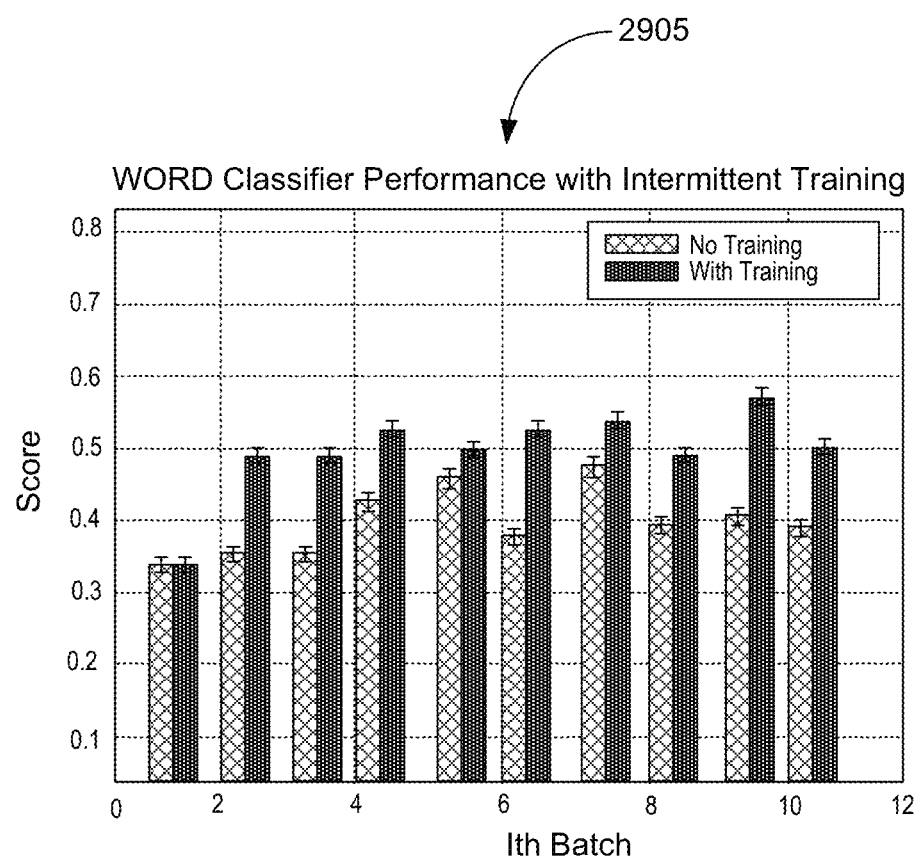
FIG. 29 is an illustration of a histogram depicting WORD classifier performance with intermittent training of the RLM, consistent with various embodiments.

Graph 2905 of FIG. 29 shows our results. The scores of the initial classification with no training are shown with the cross hatch bars. One set of bars show the accuracy scores with training (e.g., after intermittent training). In all iterations of the experiment following the initial run, we observed a consistent gain in accuracy. From the chart it can be inferred that using matching to train the classifiers is an effective strategy for improving the performance of an RLM algorithm. To put our results in perspective, consider the 9th iteration. We record an accuracy difference of 16%. Given that the WORD classifier caused all the classifier conflicts in the initial experiment, this accuracy gain translates to a 16% or more speedup in overall time performance.

1.8 RLM with Template Discovery

Taking an objective approach to classifying images according to some predefined criterion is not only difficult for machines, but also challenging for humans. The evidence of this can be seen in a study where experimenters used frontal views of human faces to compare the performance between humans and machine learning algorithms on a gender classification task. Subjects were presented with human faces with some high level features such as hair, beards or glasses removed. The learning algorithms were trained with the true gender labels of the face database whereas humans were asked to use the internal representations of the gender space they have learned throughout their lifetime to form their decision. It was found that the longer human subjects took to complete the task, the more errors they committed. Furthermore, from a statistical point of view, the way humans solve the problem was not as optimal as the SVM classifiers used in the study.

Our point is not to say that machines make better visual classifiers. We simply want to draw a parallel between the difficulties encountered by humans in the gender classification experiment and the inevitable challenge of deciphering form template discrepancies in filled-in form instances. Plus, unlike gender classification, which contains some biological relevance, template class identification is a more synthetic task, and even in the case of predefined templates, there is no guarantee that all classes have been properly identified. In situations where template categories are unknown, the task can become immensely difficult. For this reason, we investigate a method in which we train the RLM with examples of template classes that the machine has discovered on its own. To enable the automatic discovery of new templates, in some embodiments we implement a predictive model for grouping structurally similar forms, but our implementation includes some key distinctions. We measure the accuracy of our method on our three datasets.

1.8.1 Feature Extraction

In some embodiments, instead of using SURF descriptors and kMedoids to build a visual codebook, we build a visual vocabulary based on SIFT, SURF and ORB features and kMeans clustering. The kMedoids algorithm is a clustering algorithm related to the kMeans algorithm (as well as to the medoidshift algorithm). To capture additional structural information, we can employ a partitioning scheme, such as the one discussed earlier, and compute a normalized bag of visual words of each partition.

1.8.2 Random Forest based Similarity Metric

A key insight of an embodiment of a random forest approach is that decision nodes, also known as leaves, in trees of a random forest can help reveal levels of similarity between images. Counting the number of occurrences of two documents being assigned to the same terminal nodes in the trained trees of a random forest can be an effective method for computing pairwise similarities. The first step in applying such an idea is to train a binary random forest classifier so that the singularities and relationship between feature vectors are learned during tree formation. Given that a second class may be required to train the random forest classifier, we can create an auxiliary set of feature vectors from the bags of visual words representing the images in the sub-batch of documents to be clustered. This auxiliary set of vectors can be a synthetic group of feature vectors obtained by randomly rearranging the values in the matrix comprising the true set of bag of visual words feature vectors. As the binary classifier tries to separate the auxiliary from the observed data, the rules learned for decision splitting in trees can exploit and expose features that are of the same class and highly similar. In that process, when two documents land in the same leaf nodes, the measure of similarity between them can be incremented by 1.

1.8.4 Document Clustering

In some embodiments that use a random forest based similarity metric, we can build a similarity matrix from the documents of the sub-batch and use clustering to separate the different segments of the data with highly similar elements. To do this, we can feed the affinity matrix to a spectral clustering algorithm, which can find the normalized graph cuts. The normalized graph cut is a global criterion that measures the goodness of a partition with respect to the similarity of its elements and their dissimilarity to the rest of the data. An optimal number of groups can be estimated by using a cluster validation measure called silhouette. We can run clustering for a range of possible dimensions of the projection subspace, and for each dimension we can calculate the average silhouette coefficient. In some embodiments, the labels that achieve the highest silhouette score approximate the most probable grouping.

1.8.5 Finding a Global Alignment Threshold

In some embodiments, in order for RLM to fully work in an unsupervised mode, we need to determine a global alignment threshold for matching. Without this parameter, an RLM system may not be able to reject unknown instances and the overall approach may not work. In the supervised setting, this parameter could be treated as a hyperparameter, and we could use a cross-validation set to adjust the parameter's value. However, this may not be applicable to the current unsupervised mode as we do not want to accidentally peek at the data and report over-fitted results. Fortunately, the previous clustering step provides an easy way to determine this value. Since clustered sub-batches already contain forms of the template, in some embodiments we can choose two different instances in the batch and register them against each other. This can effectively return an alignment value signifying registration between instances of the same template. We can continue adjusting this value by repeating registration between two other instances in the other sub-batches. The average alignment score of each pair of instances can be computed. We can relax this alignment score average by, e.g., 10% to determine the final global alignment threshold, which we designate as F. For example, if the registration of N pairs of instances from N sub-batches returned the following sequence of alignment scores, $$S = a_1, \ldots, a_N$$

we compute $\Gamma$ as follows, $$\Gamma = \left( \frac{0.9}{N} \sum_{i=1}^{N} a_i \right) \quad (1.18)$$

1.8.6 Duplicate Elimination

One of the caveats with using filled-in form instances as training examples is that forms of similar classes are near duplicate. This condition can present a problem for document clustering when dealing with skewed classes. Through analysis of our implementation of the previously described clustering method, we observed that though the approach generated homogenous groups, it also created clusters of duplicate classes when the sample sub-batch contained a relatively larger number of instances for one particular template. For example, in a subset of 100 forms, if 80 of those instances were of template class A, clustering would generate multiple groups containing only class A instances. Since we can use the implicit labeling of clustering to train the RLM, we can avoid classifying the same template under two different labels. For this reason, we filter for unique templates prior to adding examples to the RLM's training set. To achieve this, we can use the global alignment threshold, F, to determine if two instances are of the same class. After clustering, we can use matching to create an affinity matrix with each cluster example. In such a case, if an instance registers against multiple instances with a threshold≥Γ, they are of the same class. That instance can then be moved to the batch of classified forms.

1.8.7 Unknown Class Rejection

As already mentioned, we can use F to also reject instances with unknown templates and provisionally return them to the master batch for another round of classification after subsequent training of the RLM. Intuitively, when all items from a subset of templates are classified and removed from the master batch, the next clustering should only provide new labels to continue classifying and emptying the master batch.

We take this incremental classification approach because attempting to cluster a batch of N forms, where N could be greater than 7,000, is a computationally expensive undertaking and, as previously explained, we may not be able to trust that the final grouping represents an accurate classification of the batch. Subsequent classification may still be required. In the next sub-section, we evaluate our approach and comment on our results.

1.8.8 Experiments

Objective.

We use precision and recall to evaluate the classification performance of the RLM with template discovery on the NIST, BRC and LAPP datasets.

Setup.

Figure 30:
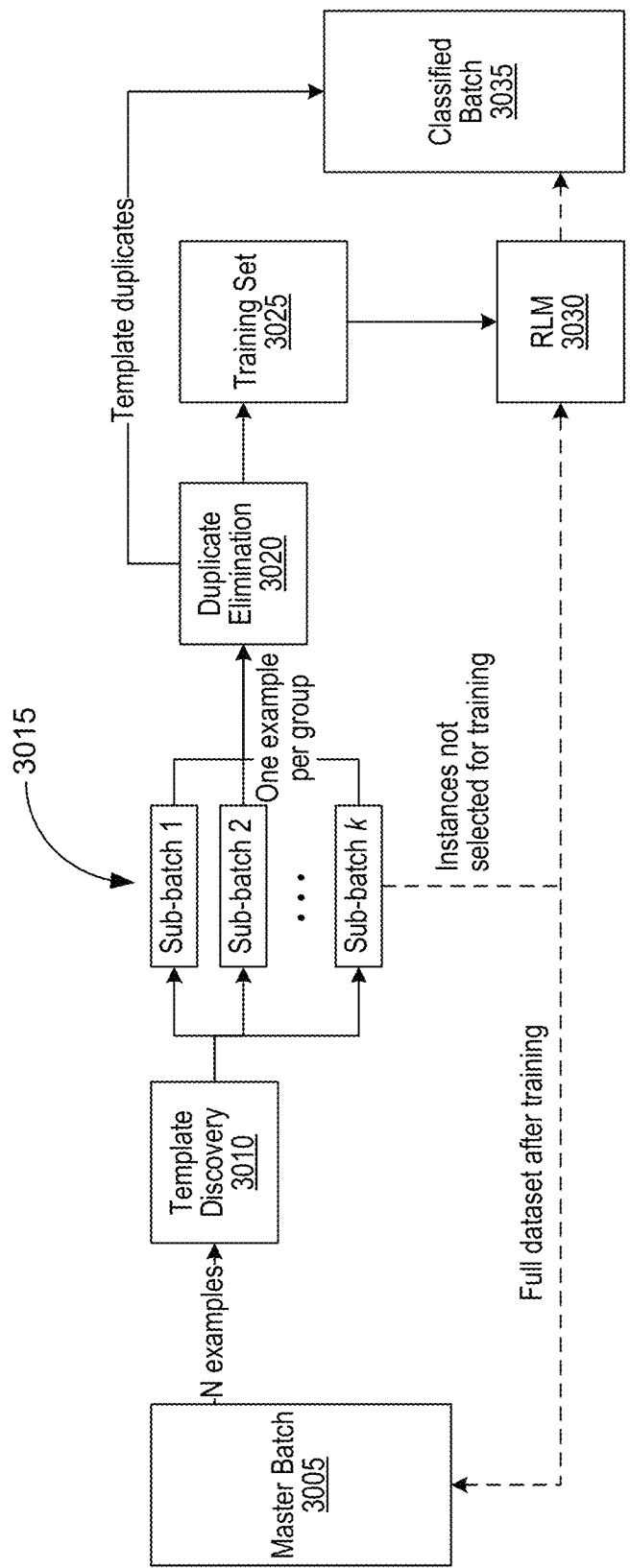
FIG. 30 is a flow diagram illustrating an example of an RLM process with template discovery, consistent with various embodiments.

We consider each dataset independently. This means we run three separate experiments only dealing with one specific template set. Consider the NIST dataset. We start the experiment by randomly selecting N instances from a master batch, as illustrated in FIG. 30 where N examples are randomly selected from master batch 3005, and running template discovery 3010 on the N instances. In all three experiments, N=100. We then apply the random forest based image clustering algorithm to generate a set of sub-batches (sub-batches 1–k 3015) supposedly containing instances from different template categories. In the first iteration, we select one pair of instances from each sub-batch in order to compute F. From each sub-batch, we also select one example form and match them against all others as part of duplicate elimination 3020. Instances with multiple alignment scores≥Γ are considered as duplicates and only one example is kept for training and added to training set 3025, and the rest are added to classified batch 3035. We proceed by training RLM 3030 with training set 3025 and, after the training, running classification RLM 3030 on all forms remaining in sub-batches 1–k 3015 and master batch 3005 (e.g., the forms that are not part of training set 3025 or classified batch 3035). In this process we apply matching even in case of full classifier agreement in order to reject any instance that does not satisfy the alignment threshold criterion. Rejected instances are returned to master batch 3005 for another round of clustering plus classification. The process ends when all instances in master batch 3005 have been classified, or all the remaining instances in master batch 3005 have been rejected due to poor alignment score.

Results and Discussion.

Table 1.5 shows our results. The rejected column indicates the number of instances that did not satisfy the alignment threshold criterion. The support column shows the number of instances classified. For NIST, we achieved an F1 score of 1.0. Recall NIST forms are very clean and visually consistent in texture and structure. Their template classes are highly dissimilar and have proven to be easily differentiable in the supervised setting. On the BRC dataset, we score an F1 of 0.90. The visual appearance of BRC instances is not as consistent as those in NIST. F was not as effective since this dataset contains partially occluded images and two near-duplicate templates. In LAPP, we reached our lowest F1 score of 0.74. This dataset contains four pairs of templates that are nearly identical. Most of the rejected instances came from a template with only a single line of text on its page.

TABLE 1.5

Results of the classification with template discovery experiment.

| Dataset | Rejected | Support | Precision | Recall | F1-measure |
|---------|----------|---------|-----------|--------|------------|
| NIST    | 0        | 5590    | 1.00      | 1.00   | 1.00       |
| BRC     | 144      | 5156    | 0.90      | 0.92   | 0.90       |
| LAPP    | 552      | 7405    | 0.74      | 0.76   | 0.74       |

Summary.

In this application, we presented some embodiments of an RLM, a method for classifying paper form images into their template constituents. An RLM decomposes the task of form classification into three sub-tasks: retrieving, learning and matching. The approach stemmed from the assumption that standard image classification and retrieval and duplicate image matching alone could not fulfill the requirements of template detection. We therefore fused ideas from various methods and designed a framework in which matching cooperates with retrieval for achieving a more robust and time efficient classification. Given a query form instance, some embodiments of an RLM retrieves the topmost h similar templates. If h>1, we use full image alignment (matching) to assess the similarity between the instance and the candidate templates. The retrieved image with which the query image scores the highest alignment denotes the form's template. Based on the matcher's answer, the learning component updates the retriever so that it can provide better rankings in the future. If h=1, we bypass matching and use the retrieved template as the final classification.

We further dissected the learning component of the RLM. We exposed the model selection processing by which we adjusted the key hyperparameters affecting the performance of an embodiment of the algorithm. We explored other classification algorithms and compared them to the nearest neighbor classifiers used for descriptor and bag of visual words classification. We found that, for some purposes, nearest neighbor performed the best in classifying features for some embodiments, and that classification results for bag of visual words can be optimized by using a random forest classifier. We then demonstrated that we could significantly improve the time performance of the RLM by intermittently training the retrieval classifiers with training data coming from matching. By increasing the chance for classifier agreement, we effectively decreased the number of alignments. Finally, we introduced and evaluated an unsupervised mode in which templates automatically discovered by the machine are used to train the RLM. We showed that high level of classification accuracy could be achieved without user provided templates.

In addition to being used to detect different types of forms or form templates, techniques similar to those discussed above can be used to detect different versions of a form template. The following is a discussion of one such technique.

Figure 31:
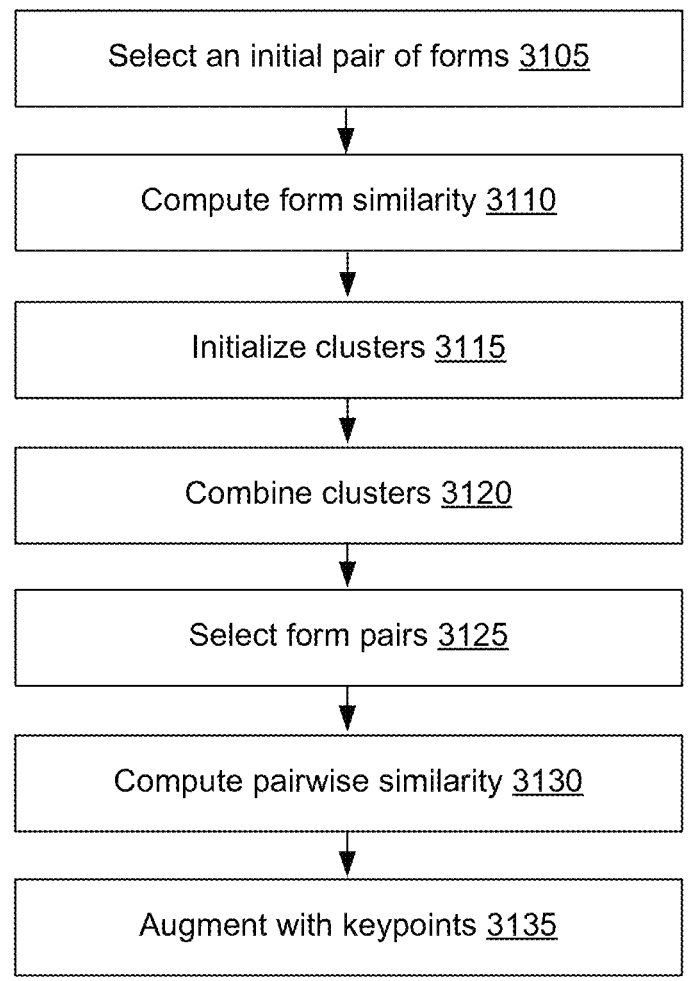
FIG. 31 is a flow diagram illustrating a first example process for detecting versions of a form template, consistent with various embodiments.

FIG. 31 is a flow diagram illustrating a first example process for detecting versions of a form template, consistent with various embodiments. The method of the example of FIG. 31 utilizes an iterative grouping method, such as a method that computes pairwise similarities and iteratively groups similar form images together. Such a technique can significantly reduce the total number of computations necessary to detect versions of a form template.

At block 3105, a computer system selects an initial number of form pair images. The form pair images can be selected randomly among a set of images of forms. The number of form pair images selected can be random, and can be proportional to the number of pages (e.g., ten percent of the images of forms), etc. At block 3110, for each pair of form pair images, the computer system computes pairwise similarity, such as by aligning the images of the two form and computing a form similarity score. The form similarity score can be based on any method that determines similarity between images of forms. For example, the form similarity score can be based on techniques discussed above, can be based on an alignment score, etc., such as by being set to the same value as the alignment score, among others.

An alignment score can be determined based on any of various methods that evaluates alignment of features of two images. In an example, computing an alignment score includes, can result from, can be derived from, etc., calculating a cross-correlation of a first image with a second image, and the cross-correlation can be used in a determination of an alignment score. The cross-correlation can be calculated in any of various ways. For example, the value of a pixel of the first image can be multiplied by the value of a pixel of the second image at a same location when the aligned first image and second image are overlaid. When a grid line of the aligned first image (e.g., aligned with the second image by, e.g., scaling, shifting, etc. the first image as appropriate) aligns with a grid line of the second image, a dot product of pixels of the two images will show a peak where the pixels of the grid lines align. When the two grid lines do not align, a dot product of pixels of the two images will show smaller values at the locations of the two grid lines.

An alignment can be performed based on any method that can align images of a form. For example, the alignment can be performed based on image keypoints or descriptors, such as based on Oriented FAST Rotated BRIEF (ORB), Accelerated Segment Test (FAST), Learned Arrangements of Three Patch Codes (LATCH). As another example, the alignment can be performed based on techniques similar to or derived from those described in U.S. patent application Ser. No. 15/354,881, filed on Nov. 17, 2016, the entire content of which is expressly incorporated by reference in its entirety. The Ser. No. 15/354,881 patent application includes an example of an alignment score. In some embodiments, a form similarity score above a first threshold indicates that the form pair images are from a same version of a form template. A form similarity score below the second threshold indicates that the form pair images are from different form templates altogether. In some embodiments, the first threshold and the second threshold are the same.

At block 3115, the computer system initializes a number of clusters. In an example, each image of the set of images of forms is assigned to a different one of the clusters, with each of the clusters including a different one of the set of images such that each image is assigned to one cluster. An exemplar image for each cluster can be initialized to the image of the single filled-in form for that cluster.

At block 3120, the computer system combines all pairs of clusters whose similarity score indicates that the images of the clusters are images of a same version of a form template (e.g., when the similarity score of a comparison of images of two clusters exceeds the first threshold of block 3110, the two clusters are merged). At block 3125, the computer system selects a number of form pair images. The number of form pair images selected can be random, can be proportional to the number of clusters, etc. At block 3130, the computer system computes the pairwise similarity between the images. The pairwise similarity can be computed similar to the computation of block 3110.

At block 3135, for each cluster, the exemplary image is augmented with data derived from other images of that cluster, such as keypoints, pixel values, average pixel values or other values derived from a set of images, etc. For example, if a new cluster results from block 3120, such as by the merging clusters A, B, and C in an example, then an image of a form associated with cluster A could be chosen as the new exemplar image for the new cluster. The selection of A as the new exemplar can be random. Keypoints or other data derived from images of B and C can then be used to augment the exemplar image, which can impact subsequent alignments computed using this image.

Blocks 3120-3135 can be repeated until all pairs of available clusters have been sampled. As clusters are merged together, the number of available clusters decreases. For every pair of clusters that is not merged, one fewer pairwise alignment remains to be computed. Thus, progress can be made at every iteration toward identifying the versions of a form template.

Once the method of FIG. 31 completes, each cluster represents a different particular version of a form template, and the computer system can perform any of various post-processing steps to help ensure that there are no duplicates, to create blank form templates (e.g., a template form prior to being filled out), etc. For example, for each remaining cluster, the computer system can examine all augmented keypoints. Keypoints with the same or with a very similar descriptor, but different spatial locations, are indicative that multiple versions having been grouped together, as these indicate similar areas of the form whose location varies from version to version. Forms with groups of keypoints that vary consistently are indicative of separate versions.

A blank form template can be computed for each cluster by, e.g., using a pixelwise median across all images of the cluster. Experiments have empirically shown this to produce a sufficiently blank template absent of any filled-in information.

Figure 32:
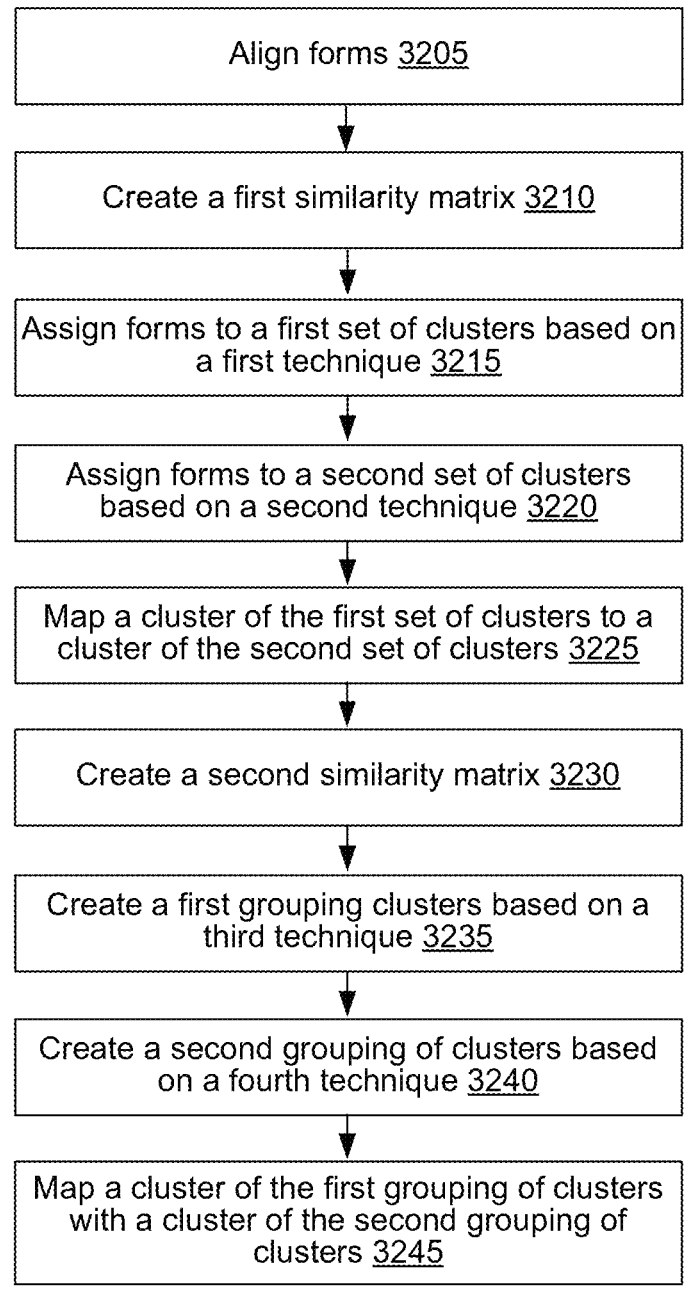
FIG. 32 is a flow diagram illustrating a second example process for detecting versions of a form template, consistent with various embodiments.

FIG. 32 is a flow diagram illustrating a second example process for detecting versions of a form template, consistent with various embodiments. FIGS. 31 and 32 are each embodiments of a process for detecting versions of a form template, and portions of the two embodiments, among others, can be combined to create other embodiments of a process for detecting versions of a form template.

At block 3205, a computer system aligns images of forms. The alignment can be performed based on any of various methods. For example, the alignment can be performed based on keypoints or descriptors derived from the images, such as based on Oriented FAST Rotated BRIEF (ORB), Accelerated Segment Test (FAST), Learned Arrangements of Three Patch Codes (LATCH). As another example, the alignment can be performed based on techniques similar to or derived from those described in U.S. patent application Ser. No. 15/354,881.

At block 3210, the computer system creates a first similarity matrix. In an example where there are n images of forms, a similarity matrix can be n by n in size, with each image being represented by one row and one column of the matrix. For example, a first image can be represented by the first row and the first column of the matrix, the second image can be represented by the second row and the second column of the matrix, etc. Each entry in the matrix can represent a similarity score between the image represented by the row and the image represented by the column. In some embodiments, the matrix is a sparse matrix, and only some of the similarity scores are calculated.

In an example with 1000 images, similarity scores are calculated for all combinations of the first 100 images, resulting in similarity scores being calculated for each matrix entry from 0 to 99, except for the diagonal representing similarity of an image with itself. In this example the similarity score is calculated for: (row 0, col. 1), (row 0, col. 2), . . . (row 0, col. 99); for (row 1, col. 0), (row 1, col. 2), (row 1, col. 3) . . . (row 1, col. 99); . . . (row 99, col 0), (row 99, col. 1), . . . (row 99, col. 98). The similarity scores of the diagonal can be set to a value that represents perfect similarity, or any other appropriate value. Remaining entries of the matrix can be chosen, calculated, determined, etc. in any of various ways. For example, similarity scores can be calculated for matrix entries that correspond to a comparison between one of the 900 remaining images and one of the first 100 images, can be calculated for randomly selected remaining matrix entries, such as by randomly choosing 10% of the remaining matrix entries, can be calculated for matrix entries chosen in a regular fashion, such as by choosing every seventh entry of the remaining entries of the matrix, etc. A combination of such methods can similarly be chosen, such as calculating similarity scores for matrix entries that correspond to a comparison between one of the 900 remaining images and one of the first 100 images, and also calculating similarity scored for randomly selected remaining matrix entries, etc.

A similarity score can be calculated based on any of various techniques that evaluate similarity between images. In an example, a similarity score between the first and second thresholds indicates that the image represented by the row and the image represented by the column are both images of a same version of a form, and a similarity score below a second threshold indicates that the two images are not images of the same version of a form. In some embodiments, the first threshold and the second threshold are a same value. A similarity score can be based on any method that determines similarity between images of forms. For example, a similarity score can be based on techniques discussed above, can be based on an alignment score, etc. An alignment score can be determined based on any of various methods that evaluates alignment of two images.

In an example, computing an alignment score includes, can result from, can be derived from, etc., calculating a cross-correlation of a first image with a second image, and the cross-correlation can be used in a determination of an alignment score. The cross-correlation can be calculated in any of various ways. For example, the value of a pixel of the first image at a certain location can be multiplied by the value of a pixel of the second image at the same location when the first image and second image are aligned and overlaid. When a grid line of the first image aligns with a grid line of the second image, a dot product of pixels of the two images will show a peak where the pixels of the grid lines align. When the two grid lines do not align, a dot product of pixels of the two images will show smaller values at the locations of the two grid lines.

At blocks 3215 and 3220, the computer system assigns images of forms to a first set of clusters based on a first technique, and to a second set of clusters based on a second technique. The first and second techniques are different techniques, and can be any technique that facilitates identification of images of forms that are images of a same version of the form template. An example of such a technique is a spectral clustering method, such as the technique disclosed in the following: Ulrike von Luxburg, A Tutorial on Spectral Clustering, 17 Statistics & Computing 395 (2007), which is hereby incorporated by reference in its entirety, and which is available at https://web.archive.org/web/20161025092026/http://www.kyb.mpg.de/fileadmin/user_upload/files/publications/attachments/Luxburg07_tutorial_4488[0]. pdf. Another example of such a technique is a spectral clustering method that works on a sparse matrix, such as the technique disclosed in the following: Charless Fowlkes, Serge Belongie, Fan Chung & Jitendra Malik, Spectral Grouping Using the Nystrom Method, 26 IEEE Transactions on Pattern Analysis & Machine Intelligence (2004), which is hereby incorporated by reference in its entirety, and which is available at https://web.archive.org/web/20110917104900/http://www-.math.ucsd.edu/~fan/wp/nystrom.pdf. Yet another example of such a technique is an iterative grouping technique, such as the technique disclosed in FIG. 31 and its associated description. In some embodiments, multiple techniques are used and the results combined.

At block 3225, the computer system maps a cluster of the first set of clusters to a cluster of the second set of clusters. Blocks 3215 and 3220 each applied different techniques for identifying images of a same version of a form template, and attempted to assign the images of the same version of the form template to a same cluster. Block 3225 facilitates mapping a cluster of images that indicate a particular version of a form template with a cluster of images that indicate the same particular version of the form template. Mapping of clusters can be accomplished by, e.g., linking, grouping (e.g., by merging the clusters, or some other means), or otherwise associating the clusters. In an example where an initial set of images of forms include images of 10 different versions of various forms, the first set of clusters of block 3215 and the second set of clusters of block 3220 may each include 10 clusters, and each of the 10 clusters may indicate a different one of the 10 different versions of the various forms. Block 3225 performs a technique that evaluates similarity between the clusters of images, and facilitates identifying which cluster of the first set of clusters facilitates identification of a same particular version of a form template as a corresponding cluster of the second set of clusters. When a cluster of the first set of clusters is mapped to a cluster of the second set of clusters, and if the two clusters contain a same or nearly a same set of images, a high probability conclusion can be made that the two clusters include images of a same version of a particular form template.

Block 3225 can perform any technique that evaluates similarity between clusters of images to facilitate identification of clusters that include images of a same version of a form template. An example of such a technique is a Hungarian method, such as the method disclosed in the following: James Munkres, Algorithms for the Assignment and Transportation Problems, 5 J. of Soc'y for Indus. &

Applied Mathematics 32 (1957), which is hereby incorporated by reference in its entirety, and which is available at https://web.archive.org/web/20150402202436/https://www.math.ucdavis.edu/~saito/data/emd/munkres.pdf.

At block 3230, the computer system creates a second similarity matrix. In an example where there are n clusters of images of forms, a similarity matrix can be n by n in size, with each cluster being represented by one row and one column of the matrix. For example, a first cluster can be represented by the first row and the first column of the matrix, a second cluster can be represented by the second row and the second column of the matrix, etc. Each entry in the matrix can represent a similarity score that represents a measure of similarity between the images of the cluster represented by the row and the images of the cluster represented by the column. In some embodiments, the matrix is a sparse matrix, and only some of the similarity scores are calculated. Just as with the first similarity matrix, similarity scores can be calculated, determined, etc. for all entries of the similarity matrix, or can be calculated, determined, etc. for a portion of the matrix entries, resulting in a sparse matrix. Matrix entries for the diagonal that represents similarity between a cluster and itself can be set to a value that represents perfect similarity, or can be set to some other appropriate value.

At blocks 3235 and 3240, the computer system creates a first grouping of clusters based on a third technique, and creates a second grouping of clusters based on a fourth technique, where each cluster of both of the first and second grouping of clusters is intended to include images of the various versions of a form template, and ideally would include all images of all versions of a form template that exist in the set of images. The third and fourth techniques are different techniques, and can be any technique that facilitates identification of a first and a second cluster of images of forms where the first cluster includes images of a first version of a particular form template, and the second cluster includes images of a second version of the same particular form template. In other words, the third and fourth techniques can be any technique that facilitates identification of clusters of images of forms where the identified clusters include images of different versions of a same form template. After blocks 3235 and 3240, each cluster of the first and second grouping of clusters is intended to include all the images of all of the various versions of a same form template, though some post-processing cleanup may be needed to eliminate errors (e.g., where a cluster includes images of multiple different form templates).

An example of such a technique is an exemplary image technique. An exemplary image technique is any technique that evaluates similarity between clusters of images based on exemplary images associated with the clusters. In an example, each cluster of a group of clusters has an exemplary image associated with the cluster, and the exemplary image can be used to determine similarity between clusters of images. The exemplary image can be generated in any of various ways. In one case, an exemplary image of a cluster is generated based on an averaging of images associated with the cluster. For example, each pixel of the exemplary image can be generated by determining an average pixel of the images associated with the cluster. When the images are aligned, a pixel from each image that each correspond to a same location of the aligned images can be determined for each of the images, and the pixel values of these corresponding pixels can be used to determine an average pixel value, which can be used as the pixel value of the pixel of the exemplary image at the same location. This process can be repeated to determine an average pixel value for each pixel of the exemplary image.

As another example, each pixel of the exemplary image can be generated by determining a median pixel of the images associated with the cluster. When the images are aligned, a pixel from each image that each correspond to a same location of the aligned images can be determined for each of the images, and the pixel values of these corresponding pixels can be used to determine a median pixel value. This process can be repeated to determine a median pixel value for each pixel of the exemplary image. As yet another example, an exemplary image can be generated by randomly selecting one of the images associated with the cluster, and augmenting the image based on keypoints derived from the images associated with the cluster. As one more example, an exemplary image can be generated based on keypoints derived from the images associated with the cluster.

Another example of such a technique is a inter-cluster image similarity evaluation technique. An inter-cluster image similarity evaluation technique is any technique that evaluates similarity between clusters of images by evaluating similarity of individual images of the two clusters. In a first example, a cluster similarity technique that evaluates similarity between all pairs of images between two clusters is used. In this first example, a first cluster has three images, image1, image2, and image3, and a second cluster has two images, image4, and image5. A set of similarity scores that represent all image pair similarities is determined, such as a set of similarity scores that includes similarity scores between image1 and image4, image1 and image5, image2 and image4, image2 and image5, image3 and image4, and image3 and image5. The set of similarity scores can be used to determine an inter-cluster similarity score that represents similarity between the images of the two clusters. For example, the inter-cluster similarity score can be set to the average of the set of similarity scores, to the median of the set of similarity scores, etc.

In a second example, a cluster similarity technique that evaluates similarity between a portion of the pairs of images between two clusters is used. In the second example, a portion of the images associated with the first cluster are evaluated for similarity with a portion of the images associated with the second cluster. The portion of images can be selected based on any of various techniques, such as based on a random sampling, based on a regular sampling, etc. In one case, a first cluster has 1000 images, and the second cluster also has 1000 images. A similarity score is determined for comparisons between each of the first 100 images of the first cluster and each of the first 100 images of the second cluster. A similarity score is determined for comparisons between each of the remaining 900 images of the first cluster and each of the first 100 images of the second cluster, and is determined for comparisons between each of the remaining 900 images of the second cluster and each of the first 100 images of the first cluster. An inter-cluster similarity score that represents similarity between the images of the two clusters is determined based on all of the determine similarity scores. For example, the inter cluster similarity score can be set to the average of the determined similarity scores, to the median of the determine similarity scores, etc.

At block 3245, the computer system maps a cluster of the first grouping of clusters to a cluster of the second grouping of clusters. Blocks 3235 and 3240 each apply different techniques for identifying, associating, etc. clusters that contain versions of a particular form template. Block 3245 attempts to map a cluster of images that indicate a first version of a particular form template with a cluster of images that indicate a second version of the particular form template to facilitate identifying, associating, etc. the various versions of the particular form template. Mapping of clusters can be accomplished by, e.g., linking, grouping, or otherwise associating the clusters. Some post-processing clean up may be needed, such as when a cluster has images of multiple different form templates. When a cluster of the first grouping of clusters is mapped to a cluster of the second grouping of clusters at block 3245, and if the two clusters contain a same or nearly a same set of images, a high probability conclusion can be made that the two clusters include images of versions of a particular form template.

Block 3245 can perform any technique that evaluates similarity between clusters of images to facilitate, accomplish, etc. identification of clusters that include images of versions of a same form template. Techniques similar to those used at block 3225, such as a Hungarian method, can be utilized at block 3245.

Figure 33:
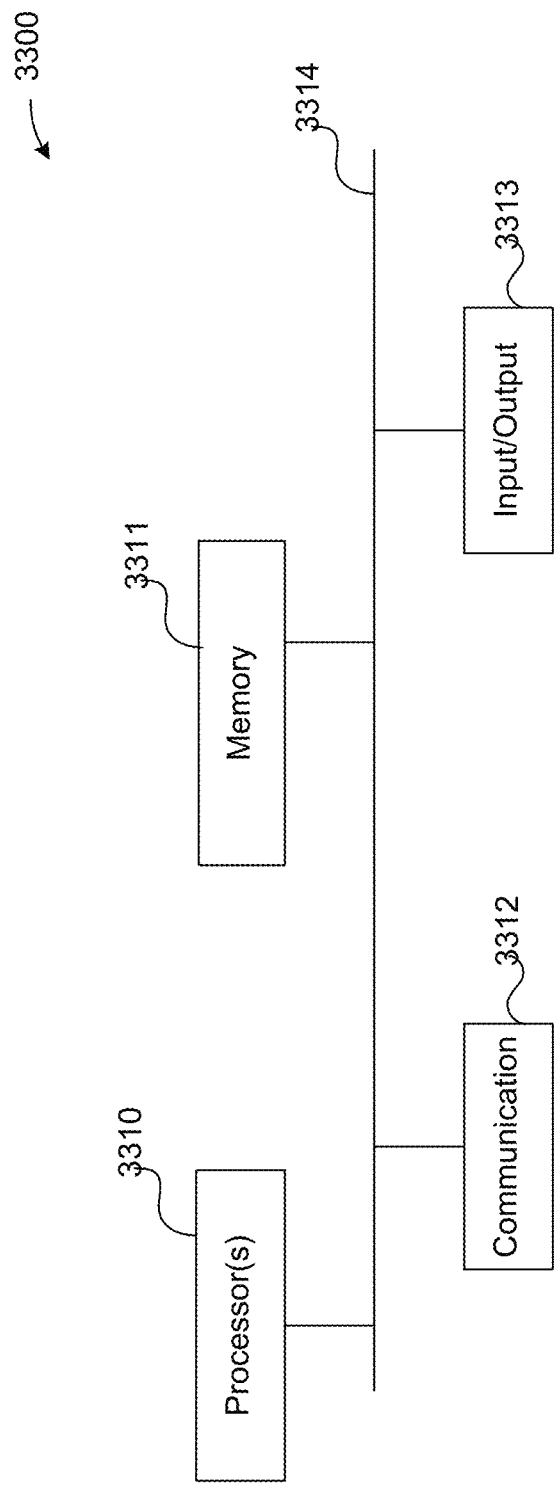
FIG. 33 is a block diagram illustrating an example of a processing system in which at least some operations described herein can be implemented, consistent with various embodiments.

FIG. 33 is a high-level block diagram showing an example of a processing device 3300 that can represent a system to run any of the methods/algorithms described above, such as embodiments of an RLM algorithm or system, and can represent the systems on which the above discussed experiments were run. A system may include two or more processing devices such as represented in FIG. 33, which may be coupled to each other via a network or multiple networks. A network can be referred to as a communication network.

In the illustrated embodiment, the processing device 3300 includes one or more processors 3310, memory 3311, a communication device 3312, and one or more input/output (I/O) devices 3313, all coupled to each other through an interconnect 3314. The interconnect 3314 may be or include one or more conductive traces, buses, point-to-point connections, controllers, adapters and/or other conventional connection devices. Each processor 3310 may be or include, for example, one or more general-purpose programmable microprocessors or microprocessor cores, microcontrollers, application specific integrated circuits (ASICs), programmable gate arrays, or the like, or a combination of such devices. The processor(s) 3310 control the overall operation of the processing device 3300. Memory 3311 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 3311 may store data and instructions that configure the processor(s) 3310 to execute operations in accordance with the techniques described above. The communication device 3312 may be or include, for example, an Ethernet adapter, cable modem, Wi-Fi adapter, cellular transceiver, Bluetooth transceiver, or the like, or a combination thereof. Depending on the specific nature and purpose of the processing device 3300, the I/O devices 3313 can include devices such as a display (which may be a touch screen display), audio speaker, keyboard, mouse or other pointing device, microphone, camera, etc.

Unless contrary to physical possibility, it is envisioned that (i) the methods/steps described above may be performed in any sequence and/or in any combination, and that (ii) the components of respective embodiments may be combined in any manner.

The techniques introduced above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method performed by a computer system comprising:
receiving a plurality of images of filled-in forms;
creating a first similarity matrix based on the plurality of images, wherein each image of the plurality of images corresponds to a row and a column of the first similarity matrix to enable comparisons of the images of filled-in forms;
performing a spectral clustering based on the first similarity matrix to identify images to associate with a first plurality of clusters based on similarities between the plurality of images, wherein each image of the plurality of images is associated with one of the first plurality of clusters;
performing an iterative grouping based on the first similarity matrix to identify images to associate with a second plurality of clusters based on similarities between the plurality of images, wherein each image of the plurality of images is associated with one of the second plurality of clusters;
performing a Hungarian method to facilitate identification of a same version of a form by mapping one or more clusters of the first plurality of clusters to one or more clusters of the second plurality of clusters, wherein a mapping of a cluster of the first plurality of clusters to a cluster of the second plurality of clusters indicates that the cluster of the first plurality of clusters and the cluster of the second plurality of clusters each include an image of a same version of a form;
creating a second similarity matrix based on the first plurality of clusters and the second plurality of clusters to facilitate comparisons of the first and the second plurality of clusters, wherein each cluster of the first and the second plurality of clusters corresponds to a row and a column of the second similarity matrix;

performing an exemplary image method to identify clusters to associate with a third plurality of clusters based on similarities between the first and the second plurality of clusters, wherein each cluster of the first and the second plurality of clusters is associated with one of the third plurality of clusters;

performing an inter-cluster image similarity evaluation to identify clusters to associate with a fourth plurality of clusters based on similarities between the first and the second plurality of clusters, wherein each cluster of the first and the second plurality of clusters is associated with one of the fourth plurality of clusters; and performing a Hungarian method to facilitate identification of related versions of forms by mapping one or more clusters of the third plurality of clusters to one or more clusters of the fourth plurality of clusters, wherein a mapping of a cluster of the third plurality of clusters to a cluster of the fourth plurality of clusters indicates that the cluster of the third plurality of clusters includes an image of a first version of a particular form and that the cluster of the fourth plurality of clusters includes an image of a second version of the particular form.

2. The method of claim 1, wherein the first threshold and the second threshold are a same threshold.

3. The method of claim 1, wherein the selecting of the first two clusters is random.

4. The method of claim 1, further comprising:
for a particular cluster of the plurality of clusters:
augmenting the exemplar image of the particular cluster with keypoints of remaining images of the particular cluster.

5. The method of claim 4, further comprising:
selecting a third two clusters of the plurality of clusters, wherein each exemplar image of each cluster of the third two clusters is augmented with keypoints of remaining images of said each cluster of the third two clusters; and
for each exemplar image of the third two clusters, aligning said each exemplar image of the third two clusters based on a plurality of keypoints that includes the keypoints of the remaining images;
computing the first form similarity score based on the alignment of said each exemplar image of the third two clusters; and
when the first form similarity score is above the first threshold, merging the third two clusters into a same cluster of the plurality of clusters.

6. A method performed by a computer system comprising:
receiving a plurality of images of filled-in forms;
associating each image of the plurality of images with a cluster of a first plurality of clusters based on a first technique that evaluates similarity between images;
associating each image of the plurality of images with a cluster of a second plurality of clusters based on a second technique that evaluates similarity between images, wherein the first technique and the second technique are different techniques;
evaluating similarity of images associated with the first plurality of clusters and the second plurality of clusters to determine a mapping of one or more clusters of the first plurality of clusters to one or more clusters of the second plurality of clusters to facilitate identification of a same version of a form;
associating each cluster of the first and the second plurality of clusters with a cluster of a third plurality of clusters based on a third technique that evaluates similarity between clusters of images;

associating each cluster of the first and the second plurality of clusters with a cluster of a fourth plurality of clusters based on a fourth technique that evaluates similarity between clusters of images, wherein the third technique and the fourth technique are different techniques; and evaluating similarity of clusters of images to determine a mapping of one or more clusters of the third plurality of clusters to one or more clusters of the fourth plurality of clusters to enable an association of a version of a particular form with the particular form.

7. The method of claim 6, wherein the first technique is a spectral clustering method.

8. The method of claim 6, wherein the second technique is an iterative grouping method.

9. The method of claim 6, wherein the evaluating similarity of images associated with the first plurality of clusters and the second plurality of clusters is based on a Hungarian method.

10. The method of claim 6, wherein the third technique is an exemplary image method.

11. The method of claim 10, further comprising:
generating a generated image for each cluster of the first and the second plurality of clusters based on images that are associated with said each cluster, wherein the third technique evaluates similarity between clusters of images based on similarity between the generated images.

12. The method of claim 11, wherein the generated image is generated based on an averaging of images that are associated with said each cluster.

13. The method of claim 12, wherein the averaging of the images includes calculating an average pixel value for a corresponding pixel of each of the images that are associated with said each cluster.

14. The method of claim 6, wherein the fourth technique is an inter-cluster image similarity evaluation method.

15. The method of claim 14, wherein the inter-cluster image similarity evaluation method includes performing a similarity evaluation between each image of a cluster of the first plurality of clusters and each image of a cluster of the second plurality of clusters.

16. The method of claim 15, wherein the performing the similarity evaluation includes determining a similarity score.

17. A computing system comprising:
a processor;
a networking interface coupled to the processor; and
a memory coupled to the processor and storing instructions which, when executed by the processor, cause the computing system to perform operations including:
receiving, via the networking interface, a plurality of images of filled-in forms;
associating each image of the plurality of images with a cluster of a first plurality of clusters based on a first technique that evaluates similarity between images;
associating each image of the plurality of images with a cluster of a second plurality of clusters based on a second technique that evaluates similarity between images, wherein the first technique and the second technique are different techniques;
evaluating similarity of images associated with the first plurality of clusters and the second plurality of clusters to determine a mapping of one or more clusters of the first plurality of clusters to one or more clusters of the second plurality of clusters;

associating each cluster of the first and the second plurality of clusters with a cluster of a third plurality of clusters based on a third technique that evaluates similarity between clusters of images;

associating each cluster of the first and the second plurality of clusters with a cluster of a fourth plurality of clusters based on a fourth technique that evaluates similarity between clusters of images, wherein the third technique and the fourth technique are different techniques; and evaluating similarity of clusters of images to determine a mapping of one or more clusters of the third plurality of clusters to one or more clusters of the fourth plurality of clusters to enable an association of a version of a particular form with the particular form.

18. The computing system of claim 17, wherein the first technique is a spectral clustering method, wherein the second technique is an iterative grouping method, wherein the third technique is an exemplary image method, wherein the fourth technique is an inter-cluster image similarity evaluation method, and wherein the evaluating similarity of images and the evaluating similarity of clusters of images are based on a Hungarian method.

* * * * *